United States Patent
Akao

(12) 
(10) Patent No.: US 6,312,828 B1
(45) Date of Patent: Nov. 6, 2001

(54) PACKAGING MATERIAL FOR PHOTOGRAPHIC PHOTOSENSITIVE MATERIAL

(75) Inventor: Mutsuo Akao, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/087,904

(22) Filed: Jun. 1, 1998

(30) Foreign Application Priority Data

May 30, 1997 (JP) .................................................. 9-142321
Jun. 10, 1997 (JP) .................................................. 9-152626

(51) Int. Cl.$^7$ ............................. B32B 27/32; C08F 6/08; C08F 210/00
(52) U.S. Cl. .................... 428/516; 428/35.2; 524/395; 524/424; 524/450; 526/348; 526/943
(58) Field of Search ................... 428/516, 35.2; 526/943, 348; 206/578; 524/424, 450, 394

(56) References Cited

U.S. PATENT DOCUMENTS

| | | | |
|---|---|---|---|
| 5,491,208 | * | 2/1996 | Tanaglia et al. .................. 221/256 |
| 5,492,741 | * | 2/1996 | Akao et al. ...................... 428/35.2 |
| 5,543,270 | * | 8/1996 | Akao et al. ...................... 430/347 |
| 5,679,420 | * | 10/1997 | Taguchi et al. ................... 428/34.1 |
| 5,777,050 | * | 7/1998 | Friederichs et al. .............. 526/123.1 |
| 5,981,048 | * | 11/1999 | Sugimoto et al. ................. 428/216 |

OTHER PUBLICATIONS

Metallocene Catalysis: A Revolution In Olefin Polymerization, USPTO Seminar, Nov. 1995.*
JP408179473–A, English Abstract, Jul. 1996.*

* cited by examiner

Primary Examiner—Paul Thibodeau
Assistant Examiner—D. Lawrence Tarazano
(74) Attorney, Agent, or Firm—Sughrue, Mion, Zinn, Macpeak & Seas, PLLC

(57) ABSTRACT

The packaging material for a photographic photosensitive material of the invention is formed of a thermoplastic resin composition containing 50 wt. % or more of a thermoplastic resin manufactured using a catalyst capable of producing 10,000 g or more of the thermoplastic resin per 1 g of solid catalyst component. The catalyst includes a single site catalyst, such as zirconium based metallocene, hafnium based metallocene, titanium based metallocene and vanadium based metallocene and aluminoxane. By using the thermoplastic resin composition, adverse effects on photographic properties can be removed, and rusting of manufacturing apparatus can be decreased.

16 Claims, 18 Drawing Sheets

PACKAGING MATERIAL FOR PHOTOGRAPHIC PHOTOSENSITIVE MATERIAL

BACKGROUND OF THE INVENTION

This invention relates to a packaging material for a photographic photosensitive material which improves photographic properties with keeping good dimensional stability, physical strength, moldability and so on.

Packaging materials for photographic photosensitive material are required to have good properties about dimensional stability, physical strength, moldability and so on, as well as not to affect photographic properties adversely.

For example, a packaging film disclosed in Japanese Patent KOKOKU 2–2700 comprises a light-shielding film containing 50 wt. % or more of L-LDPE resin and 1 wt % or more of a light-shielding material.

A molded article for a photographic photosensitive material disclosed in Japanese Patent KOKAI 7–237958 is made of a resin composition comprising 50 to 99.98 wt. % of thermoplastic resin having a small molecular weight distribution of 1.1 to 10.0 and a MFR of 0.1 to 100 g/ 10 minutes and 0.01 to 15 wt. % of lubricant for the improvement in moldability, and improved in dimensional stability, moldability, lubricating properties, etc.

A thermoplastic resin packaging material for a photographic photosensitive material disclosed in Japanese Patent KOKAl 8–179473 improves photographic properties by descending melting point by using a polymer material having a low molecular weight polymer content of 3 wt. % or less manufactured using a metallocene catalyst.

However, in the above packaging materials for a photographic photosensitive material, in order to remove adverse effects upon photographic properties entirely, resin used becomes expensive. Moreover, rust generates upon using a molding machine or a mold which contains iron.

Furthermore, in the case of the packaging film disclosed in Japanese Patent KOKOKU 2–2700, film moldability of thick film having a thickness of 50 $\mu$m or more is inferior due to great melt viscosity, although the film is very excellent in physical strength, which can make the film thinner, and in heat sealing properties.

The thermoplastic resin packaging material for a is photographic photosensitive material disclosed in Japanese Patent KOKAI 8–179473 is also inferior in film moldability, such as the occurrence of melt fracture, due to great melt viscosity compared with the L-LDPE; resin having the same MFR and density manufactured using a conventional Ziegler catalyst, although the resin has a narrow molecular weight distribution, excellent physical strength and excellent antiblocking ability.

SUMMARY OF THE INVENTION

An object of the invention is to provide a packaging material for a photographic photosensitive material capable of removing adverse effects upon photographic properties and of preventing rust generation even using a cheap resin Another object of the invention is to provide a packaging material for a photographic photosensitive material of which film moldability is improved while keeping excellent physical strength and heat scaling properties without adverse effects on photographic properties.

The inventor investigated as to the cause of degrading photographic properties of photographic properties of photographic photosensitive properties, such as fogging, sensitivity deviation, abnormal tone, abnormal coloring, uneven density, spot formation, etc., and found that catalyst is a causative agent. Then, he further investigated as to the influences of catalyst on photographic properties of photographic photosensitive materials, and found that the influences on photographic properties can be reduced to practical degrees by limiting type of catalyst, type of additives, mixing amount of additives and so on.

By the constitution, the used amount of catalyst, which adversely affects photographic properties of photographic photosensitive materials, can be decreased. As a result, adverse affects on photographic properties become no problem. Moreover, in the case of film molded articles, physical strength is improved, and thickness variation, longitudinal streaks, lumps and foaming troubles are sharply decreased. In the case of injection molded articles, dimensional stability and appearance are improved, and short shot and weld lines are decreased.

Figure 1:
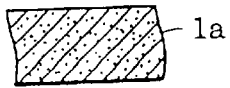
FIGS. 1 through 8 are partial sections of light-shielding films for photographic photosensitive materials embodying the invention, respectively.

1a. Light-shielding thermoplastic resin film layer (packaging material for photographic photosensitive material)
2,2a. Thermoplastic resin film layer
3. Adhesive layer
4. Flexible sheet layer
5. Metal membrane flexible sheet layer
6. Metallized flexible sheet layer
10. Metal foil
a. indicating to contain a light-shielding material
B. Blocking

DETAILED DESCRIPTION OF THE INVENTION

The resin composition forming the packaging material for photographic photosensitive material of the invention contains 50 wt. % or more, perferably 60 wt. % or more, more preferably 70 wt. % or more, further more preferably 80 wt. % or more of a thermoplastic resin manufactured by using a high active catalyst capable of producing 10,000 g or more, preferably 20,000 g or more., more preferably 30,000 g or more, further more preferably 45,000 g or more per 1 g of solid catalyst component. When the production of the thermoplastic resin per 1 g of solid catalyst component is less than 10,000 g, it is necessary to use a large amount of a polymerization catalyst which adversely affects photographic properties of photographic photosensitive materials. As a result, the polymerization catalyst residue in the thermoplastic increases to degrade photographic properties of photographic photosensitive materials, and residual halogen component content increases to generate rust or corrosion on a molding machine or a pelletizer or to degrade photographic properties.

The solid catalyst component is the solid matter having the catalyst activity for the polymerization, such as metallocene, but carrier and cocatalyst, such as aluminoxane are not included.

The high active catalyst is, in principle, a composite catalyst composed of a IV–VI family transition metal compound and a I–III family alkyl compound, and for example, is a stereoregular polymerization catalyst of polyolefin resin and a representative coordination anionic polymerization catalyst. Although there are soluble homogeneous catalysts, most of the catalysts are solvent-insoluble heterogeneous catalysts. Most of the catalysts are combinations of titanium and vanadium compound and alkyl aluminum. As the type of polymerzation, there are suspension polymerization, bulk polymerization, vapor phase polymerization, etc. In order to further raise polymerization activity, it is preferable that the catalyst is carried by a carrier, such as $MgCl_2$. For example, when a titanium compound capable of acting as an active species is carried by $MgCl_2$, the number of active sites and growth reaction rate are remarkably increased.

It is possible to produce only isotactic structure polymer selectively, by adding monoester, diester (internal donor), etc. upon preparation of the catalyst carried by the carrier, and by adding monoester or organic silicon compound (external donor), and unnecessary atactic structure polymer is not by-produced. In this method, a separation or removal precess of unnecessary or harmful atactic polymer and polymerization catalyst from polymer product is not necessary, and further more, it is possible to make the residual halogen component content of the thermoplastic resin 60 ppm or less.

The high active catalyst is called, in general, Ziegler-Natta catalyst. The above Ziegler-Natta catalyst is very useful for polymerization of diene, and recently highlighened as a high active single site catalyst also called Kaminsky catalyst.

The ethylene-α-olefin copolymer resin produced by using metallocene catalyst which is a single site catalyst is excellent in flexibility, physical strength, heat sealing properties, etc., compared with the ethylene-α-olefin copolymer resin produced by using is Ziegler catalyst, solid catalyst, etc. which are multisite catalysts.

As the high active catalyst of the invention, the single site catalyst is the most preferable. A representative (catalyst is called, in general, metallocene catalyst composed of zirconocene dichloride and methylaluminoxane found by German Professor Kaminsky in 1980. The metallocene catalyst has homogeneous active site (single site), and by using the catalyst, thermoplastic resins having an extremely narrow molecular weight distribution and composition distribution, which cannot be obtained by the conventional titanium catalyst or chromium catalyst having heterogeneous active site (multisite), can be obtained. She catalyst has an extremely high activity against ethylene.

The single site catalysts (represented by metallocene catalysts) are known, and introduced by many patents and references, such as Japanese Patent KOKAI 60-35007, 60-35008, 60-35009, 3-207703, 3-234711, 3-234717, 3-234718, 4-300887, Japanese Patent KOHYO 3-502710, etc. They arc composed of a solid catalyst component, such as zirconium based metallocene, hafnium based metallocene, titanium based metallocene and vanadium based metallocene, and various aluminoxane, preferably methylaluminoxane. By using the single site Catalyst, residual amount of solid metal catalyst component, such as zirconium, titanium, hafnium and vanadium, which adversely affects photographic properties of photographic photosensitive materials, in thermoplastic resin can be decreased to 50 ppm or less. Furthermore, halogen component content, which not only adversely affects photographic properties but also generates rust and corrosion on a molding machine can be made 4 to 60 ppm (as halogen weight. Particularly, it is possible to produce thermoplastic resins by polymerization through the vapor phase process without solvent at a polymerization temperature of 40 to 100° C. at a polymerization pressure of 5 to 50 $kg/cm^2$, and to decrease manufacturing cost sharply is possible due to energy conservation and low pressure equipment.

Preferable metallocene catalysts are composed of a transfer metal metallocene compound and an organic aluminum compound, such as disclosed in Japanese Patent KOKAI Nos. 7-118431, 7-25 148895, and some of them are carried on a carrier. Exemplary transition metal metallocene compounds are a transition metal selected from 4B to 6B families, preferably 4B family, in periodic table, such as titanium, zirconium and hafnium, having cyclopentadienyl group, a substituted cyclopentadienyl group, dicyclopentadienyl group, a substituted dicyclopentadienyl group, etc.

The organic aluminum compound is alkyl aluminum, linear or cyclic aluminoxane, etc. The alkyl aluminum is triethyl aluminum, dimethyl aluminum chloride, diethyl aluminum chloride, methyl aluminum dichloride, ethyl aluminum dichloride, diethyl aluminum halide, etc. The linear or cyclic aluminoxane can be produced by contacting the above alkyl aluminum with water.

As the carrier for carrying the metallocene catalyst, there are zeolite, silica, alumina, diatomaceous earth, etc. Zeolite, silica and alumina are preferable in view of their function to render harmful substances adversely affecting photographic properties harmless by adsorption, and zeolite is particularly preferred.

The thermoplastic resins suitable for the invention are polyolefin resins, acid-modified polyolefin resins, noncrystalline polystyrene resins, noncrystalline rubber-containing polystyrene resins, crystalline syndiotactic polystyrene resins (to use metallocene catalyst is preferable because of less catalyst residues.), polyacetal resins, acrylic resins, polyamide resins (nylon 6 resins, nylon 66 resins, nylon 12 resins, etc.), thermoplastic resin elastomers, polyester resins (polybutylene terephthalate resins, polyethylene terephthalate resins, polyethylene-2,6-naphthalate resins, etc.), polycarbonate resins, styrene group resins (GPPS resins, HIPS resins, ABS resins, AS resins, AAS resins, AES resins, etc. disclosed in Japanese Patent KOKAI 8-118394), polyphenyl sulfide resins, and mixtures of two to more of the above resins. Particularly, ethylene-α-olefin copolymer resins are preferable, and the most preferable resin is ethylene-hexene-1 copolymer resin manufactured by the vapor phase method in view of high quality and low manufacturing cost.

The ethylene-α-olefin copolymer (L-LDPE) resin is called third polyethylene resin, and it is a low cost high strength resin, having the advantages of both low, medium density polyethylene resin and high density polyethylene resin, which meets the requirements, i.e. resource conservation and energy conservation, of the time. The L-LDPE resin is a copolymer of ethylene and α-olefin, and it has a linear structure having short branches. The number of carbon atoms of the α-olefin is 3 to 20, preferably 4 to 15, more preferably 5 to 10, the most preferably 6 to 8. Various α-olefins are usable, such as linear or branched aliphatic ones, and alicyclic ones. Aliphatic α-olefins are preferable in terms of physical strength and cost, and examples of the α-olefin are propene-1, butene-1, 4-methylpentene-1, hexene-1, heptene-1, octene-1, decene-1, undecene-1, dodecene-1, etc. Two or more α-olefins may be combined. The density (ASTM D-1505) is usually in the degree of low, medium polyethylene resin, and preferable resins for the invention are in the range of 0.86 to 0.98 g/cm$_3$, particularly preferably 0.88 to 0.93 g/cm$^3$. Preferable melt flow rate (ASRM D-1238, Condition E) is mostly in the range of 0.1 to 80 g/10 minutes, particularly 0.3 to 5 g/ 10 minutes.

As the polymerization process of L-LDPE resin, there are the vapor process and the liquid slurry process using a medium, low pressure apparatus and the Ion polymerization process using an apparatus for the high pressure modified method.

Examples of commercial L-LDPE resin are "G-Resin" and "TUFLIN" (UCC), "NUC Polyethylene-LL" and Moretec (Idemitsu Petrochemical), "Dowlex" (Dow chemical), "Sucleare " (Dupont de Nemour, Canada), "Marlex" (Phillips), "Neozex" and "Ultzex" (Mitsui Petrochemical Industries), "Nisseki Linirex" (Nippon Petrochemicals), "Stamilex" IDSM) "Mitsubishi Polyethy-LL" Mitsubishi Petrochemical), and the like. Very low density L-LDPE resins having a density of less than 0.910 g/cm$^3$ are also preferred, such as "NUC-FLX" (UCC) and "Excelene VLU" (Sumitomo Chemical).

Preferable L-LDPE resins for film molded articles in view of physical strength, heat seal strength and inflation film moldability are copolymers of ethylene and α-olefin, of which the number of carbon atoms is 3 to 20, preferably 4 to 15, more preferably 5 to 10, the most preferably 6 to 8, having a melt flow rate (MFR) of 0.1 to 80 g/10 minutes, preferably 0.2 to 20 g/10 minutes, particularly preferably 0.3 to 5 g/ 10 minutes (ASTM D-1238, Condition E) and a density of 0.860 to 0.980 g/cm$^3$, preferably 0.870 to 0.940 g/cm$^3$, particularly preferably 0.880 to 0.930 g/cm$^3$ (ASTM D-1505) manufactured by the liquid slurry process or the vapor phase process.

A preferable resin for a packaging film is copolymer resin of ethylene and one or more of 3 to 15 carbon atoms α-olefins, i.e. ethylene- α-olefin resin , manufactured by using the metallocene catalyst. A suitable content of α-olefin is 1 to 50 wt. %, preferably 2 to 40 wt. %, particularly preferably 3 to 30 wt % Concerning properties, a suitable melt flow rate (ASTM D-1238, at 190° C., load of 2.16 kg f) is 0.1 to 15 g/10 minutes, preferably 0.2 to 10 g/10 minutes, particularly preferably 0.5 to 6 g/ 10 minutes, and a suitable density (ASTM D-1505) is 0.870 to 0.915 g/cm$^3$, preferably 0.880 to 0.940 g/cm$^3$, particularly preferably 0.890 to 0.935 g/cm$^3$. A suitable molecular weight distribution measured by GPC, i.e. the ratio of weight average molecular weight (Mw) to number average molecular weight (Mn), is 1.2 to 6.0, preferably 1.3 to 5.0, particularly preferably 1.5 to 4.0. The polymerization process may be the vapor phase process, the liquid phase process in a state of slurry or solution. Particularly preferred copolymer resins are of ethylene and 3 to 8 carbon atoms α-olefin manufactured by the vapor phase method in terms of low manufacturing cost and low adverse effects on photographic properties.

In addition, as a high activity stereoregular polymerization catalyst for polypropylene resin, representative one is a Natta catalyst composed of trialkyl aluminum and titanium trichloride, although it is a multisite catalyst.

In the packaging material for a photographic photosensitive material of the invention, the thermoplastic resin containing metal component manufactured by using a catalyst of which the principal components are a transition metal component and an organic metal component has a residual halogen component content of 4 ppm or more, preferably 5 ppm or more, and 60 ppm or less, preferably 30 ppm or less, more preferably 20 ppm or less, the most preferably 15 ppm or less, as halogen weight. When the residual halogen component content is less than 4 ppm, it is necessary to extract catalyst residues by using a large amount of a catalyst deactivator to increase cost. On the other hand, when the residual halogen component content exceeds 60 ppm, not only photographic photosensitive properties are adversely affected, but also the thermoplastic resin containing the halogen components is contacted in a melted state at a temperature of 150° C. or higher with a pelletizer, a molding machine or a mold for a long period to generate rust or corrosion. By using the thermoplastic resin composition containing 50 wt. % or more of the above thermoplastic resin, rusting of the pelletizer, molding machine, mold, etc. can be prevented, and adverse effects on photographic properties can also be prevented. Moreover, in the case of film molded articles, thickness variation, longitudinal streaks, lumps and foaming troubles are sharply decreased. In the case of injection molded articles, dimensional stability and appearance are improved, and short shot and weld lines troubles are decreased.

The catalysts, of which the principal components are a transition metal component and an organic metal component, are mainly the aforementioned high active catalysts.

In an aspect of the invention, it is provided a pacing material for a photographic photosensitive material comprising a coextruded multilayer film which comprises a single site L-LDPE resin layer of which the principal component is an ethylene-α-olefin copolymer resin manufactured by using a single site catalyst located on one side of the multilayer film, and a multisite L-LDPE resin layer of which the principal component is an ethylene-α-olefin copolymer resin manufactured by using a multisite catalyst located on the other side of the multilayer film In the multilayer film, the single site L-LDPE resin layer is excellent in antiblocking ability, heat scaling properties and physical strength, and contains a small amount of catalyst residues and low molecular weight resin components which adversely affects photographic properties of photographic photosensitive materials, although it has disadvantages in expensiveness, inferior film moldability and inferior appearance due to the occurrence of melt fracture. The multisite catalyst L-LDPE resin layer is excellent in film moldability, rare occurrence of melt fracture, appearance, easy availability of catalyst, although it is inferior to the single site L-LDPE resin in heat sealing properties and physical strength and contains a greater amount of catalyst residues and low molecular weight resin components which adversely affects photographic properties of photographic photosensitive materials. By employing the above constitution, the packaging material of this aspect is improved in film moldability with ensuring heat sealing properties, physical strength and no adverse effects on photographic properties.

As the multisite catalyst, there are Ziegler catalysts, Phillips catalyst, and the like. Representative Ziegler catalysts comprise a mixture of a transition metal compound and an organic compound, such as triethyl aluminum and titanium tetrachloride, as the principal component and representative Phillips catalysts comprise chromium oxide as the principal component.

The surface layers of the coextruded multilayer film are the single site L-LDPE resin layer and the multisite L-LDPE resin layer.

The multilayer film may be composed of two layers, i.e. the single site L-LDPE resin layer and the multisite L-LDPE resin layer, or other layer(s) may be interposed therebetween.

The residual metal components in the single site L-LDPE resin layer and the multisite L-LDPE resin layer of the coextruded multilayer film are preferably 300 ppm or less, more preferably 150 ppm or less. Thereby, photographic properties are improved, and rusting of a molding machine is decreased. The residual metal components are simplex, compound or mixture of zirconium, titanium, hafnium, vanadium, and the like.

A preferable single site L-LDPE resin layer is formed of a copolymer of ethylene and α-olefin of 3 to 12 carbon atoms having a molecular weight distribution of 1.5 to 10 manufactured by using a single site catalyst containing one or more of zirconium-based, titanium-based, hafnium-based and vanadium-based metallocene complex. By comprising the single site L-LDPE resin layer, the packaging material for a photographic photosensitive material is made excellent in physical strength, small amount of residual metal component and residual halogen compound component, rare adverse effects on photographic properties, and excellent heat sealing properties (heat seal strength, low temperature heat sealability, hot tack properties, sealability with other materials, heat seal strength after a long period, etc.). Rusting and corrosion of a molding machine is also prevented.

Another preferable single site L-LDPE resin layer is formed of a polymer manufactured by Using a metallocene catalyst, and polymerizing by the vapor phase polymerization at a polymerization temperature of 40 to 100° C. at a polymerization pressure of 5 to 50 kg/cm$^2$. Thereby, the polymer has a residual metal component and residual halogen compound component less than two multisite L-LDPE resin layers described below.

A preferable multisite L-LDPE resin layer is formed of a polymer manufactured by using a Ziegler type catalyst containing a transition metal component and an organic compound as the principal components, and polymerizing by the solution polymerization in an inactive hydrocarbon solvent at a polymerization temperature of 125 to 230° C. at a polymerization pressure of 30 to 200 kg/cm$^2$. By comprising the multisite L-LDPE resin layer, the packaging material for a photographic photosensitive material is made cheap, excellent in moldability, small amount of residual metal component and residual halogen compound component, rare adverse effects on photographic properties, and excellent heat sealing properties.

Another preferable multisite L-LDPE resin layer is formed of a polymer manufactured by using a Ziegler type catalyst containing a transition metal component and an organic compound as the principal components, and polymerizing by the vapor phase polymerization at a polymerization temperature of 60 to 100 ° C. at a polymerization pressure of 15 to 50 kg/cm$^2$. Thereby, the packaging material for a photographic photosensitive material is made cheaper, smaller residual metal component and residual halogen compound component, and less adverse affects on photographic properties than the above polymer manufactured by the solution polymerization.

It is preferable that the single site L-LDPE resin layer and the multisite L-LDPE resin layer have a residual halogen compound component content of 400 ppm or less, and thereby adverse effects on photographic properties can be removed.

Illustrative of the halogen compound component are titanium halides, silicon halides, vanadium halides, aluminum halides, and boron halides, and examples are silicon tetrachloride, aluminum trichloride, aluminum tribromide, titanium trichloride, boron trichloride, titanium tetrabromide, etc.

The single site L-LDPE resin layer is preferably located on the inner surface, and preferably contains carbon black, antiblocking agent, lubricant, antioxidant, florine-containing compound and nonionic surfactant.

The single site L-LDPE resin layer is preferably located on the outer surface, and preferably contains 0.01 to 5 wt % of hindered amine compound and 0.01 to 5 wt. % of fatty acid metal salt. The constitution provides prevention of discoloration, the improvement in anticorrosion to prevent rusting and corrosion of a molding machine, removal of adverse effects on photographic properties by neutralizing halogen compounds, and the improvement in uniform dispersibility of light-shielding material, dye and pigment to improve light-shielding ability and appearance.

The multisite L-LDPE resin layer is preferably located on the inner surface, and preferably contains carbon black, antiblocking agent, lubricant, oxidation inhibition material, fluorine-containing compound, and nonionic surfactant. The constitution provides the prevention of static marks on photographic photosensitive materials, the improvement in dripproofing ability at low temperature, the improvement in dripproofing persistence, excellent light-shielding ability, moldability and physical strength, and the improvement in dust-proofing ability.

The multisite L-LDPE resin layer is preferably located on the outer surface, and preferably contains 0.01 to 5 wt. % of a hindered amine compound and 0.01 to 5 wt. % of a fatty acid metal salt. The constitution provides the prevention of discoloration, the improvement in anticorrosion, no adverse affects on photographic properties, the improvement in uniform dispersibility of pigment and in appearance.

In the packaging material for a photographic photosensitive material of the invention, it is preferable to incorporate one or more of hydrotalcite compounds into the thermoplastic resin having a residual halogen content of 4 to 75 ppm. Thereby, photographic properties and rust prevention to equipment containing iron, such as a mold, a molding machine or an extruder, can be improved by one rank. Moldability is also improved. In the case of film molded articles, thickness variation, longitudinal streaks, lumps and foaming troubles are sharply decreased. In the case of injection molded articles, dimensional stability and appearance are improved, and the occurrence of short shot and weldlines are decreased.

A suitable content of the hydrotalcite compound is 0.001 wt. % or more, preferably 0.005 wt. % or more, more preferably 0.01 wt. % or more, furthermore preferably 0.02 wt. % or more, and 10 wt. % or less, preferably 5 wt. % or less, more preferably 4 wt. % or less, furthermore preferably 3 wt. % or less, still further preferably 2 wt. % or less. The content of less than 0.001 wt. % results in insufficient blending effects. On the other hand, when the content exceeds 5 wt. %, blending effects by the excess amount is small, and nevertheless lumps tends to generate.

Hydrotalite compound has a general formula of

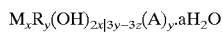

In the formula, M represents Mg, Ca or Zn, R represents Al, Cr of Fe, A represents $CO_3$ or $HPO_4$, and x, y, z and a are positive numbers, respectively.

, and examples are $Mg_6Al_2(OH)_{16}CO_3 \cdot 4H_2O$, $Mg_3Al_2(OH)CO_3 \cdot 5H_2O$, $Mg_5Al_2(OH)_{14}CO_3 \cdot Mg_{10}Al_2(OH)_{22}(CO_3)_2 \cdot 4H_2O$, $Mg_5Al_2(OH)_{16}HPO_4 \cdot 4H_2O$, $Ca_6Al_2(OH)_{16}CO_3 \cdot 4H_2O$, $Zn_6Al_3(OH)_{16}CO_3 \cdot 4H_2O$, $Mg_{4.5}Al_2(OH)13CO_3 \cdot 3.5H_2O$, etc.

Other preferable hydrous double salt compounds include hydrotalcite compounds having a refractive index (Larsen Oil Immersion method) of 1.40 to 1.60, preferably 1.45 to 1.55, and having a general formula of

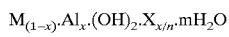

In the formula, M represents an alkaline earth metal or Zn, X represents n valent anion, and x and m satisfy 0<x<0.5 and 0≦m≦z and n=1–4 (integral number)

, wherein examples of the n valent anion are $Cl^-$, $Br^{31}$, $I^-$, $NOs_9^{31}$, $ClO_4^{31}$, $SO_4^{2-}$, $CO_3^{2-}$, $SiO_3^{2-}$, $HPO_4^{2}$, $HBO_3^{2-}$, $PO_4^{3-}$, $Fe(CN)_6^{3-}$, $Fe(CN)_4^{4-}$, $CH_3COC^-$, $C_6H_4(OH)COO^-$, and examples are

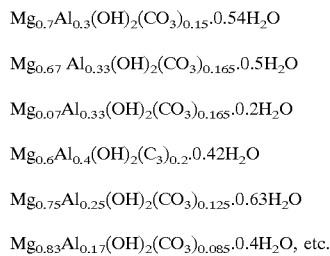

$Mg_{0.7}Al_{0.3}(OH)_2(CO_3)_{0.15} \cdot 0.54H_2O$ $Mg_{0.67}Al_{0.33}(OH)_2(CO_3)_{0.165} \cdot 0.5H_2O$ $Mg_{0.07}Al_{0.33}(OH)_2(CO_3)_{0.165} \cdot 0.2H_2O$ $Mg_{0.6}Al_{0.4}(OH)_2(C_3)_{0.2} \cdot 0.42H_2O$ $Mg_{0.75}Al_{0.25}(OH)_2(CO_3)_{0.125} \cdot 0.63H_2O$ $Mg_{0.83}Al_{0.17}(OH)_2(CO_3)_{0.085} \cdot 0.4H_2O$, etc.

The hydrotalcite compound may be natural or synthetic. The main components of the hydrotalcite compounds are magnesium, aluminum, etc., and are excellent in the ability of adsorbing to render harmless halogen ions such as chloride ion which are causative agent of adverse effects on photographic photosensitive materials or of rust generation of metal used in a molding machine. Moreover, it is presumed to adsorb various materials which adversely affect photographic properties, such as monomers and volatile components of various additives in the resin composition. The synthetic methods disclosed in Japanese Patent KOKOKU 46–2280 and 50–30039 can be used therefore. Particularly preferred are the above hydrotalcite compounds, and crystal structure and crystal size are not limited.

As natural hydrotalcite compounds, there are hydrotalcite, stichtite, pyroauritc, etc. The hydrotalcite compound may be use as a single material or combined two or more. Particularly, it is preferable to use together with the antioxidant or the fatty acid metal salt. The particle size of the hydrotalcite compound is not limited, but in view of proccessability, such as injection moldability, properties, etc., a suitable mean secondary particle size is 20 μm or less, preferably 10 μm or less, particularly preferably 5 μm or less, and as to BET specific surface area, suitably 50 $m^2$/g or less, preferably 40 $m^2$/g or less, particularly preferably 30 $m^2$/g or less.

It is preferable to treat the hydrotalcite compound by a surface coating material. By coating with the surface, dispersibility and miscibility against resin are further improved, injection moldability film processibility physical strength, and the like are also improved.

As examples of the surface coating material, the surface-coating materials (1) to (20) for light-shielding described later and the like are usable. Particularly preferred ones are higher fatty acid metal salts, such as sodium laurate, potassium laurate, sodium oleate, potassium oleate, calcium oleate, magnesium stearate, sodium stearate, potassium stearate, sodium palmitate, potassium palmitate, sodium caprate, potassium caprate, sodium myristate, potassium myristate, sodium linolate and potassium linolate, higher fatty acids, such as lauric acid, palmitic acid, oleic acid, stearic acid, capric acid, myristic acid and linolic acid, organic sulfonic acid metal salts, such as calcium dodecylbenzene sulfonate and sodium dodecylbenzene sulfonate, coupling agents, such as isopropyltriisostearoyl titanate, isopropyltris(dioctylpyrophosphate) titanate, tetraisopropylbis(dioctylphosphite) titanate, vinyltriethoxysilane, gamma-methacryloxypropyltrimethoxysilane and gamma-glycidoxypropyltrimethoxysilane, and various lubricants, such as higher fatty acid amides, higher fatty acid esters, silicones and waxes.

The surface-coating using the surface-coating material can be conducted, for example, by adding an aqueous solution of a higher fatty acid alkali metal salt to the hydrotalcite compound suspended in hot water with stirring, or by adding a melted higher acid or a coupling agent solution dropwise to a hydrotalcite compound stirred by a Henschel mixer. A suitable amount of the surface-coating material is, in general, 0.01 to 50 parts by weight, preferably 0.05 to 35 parts by weight, more preferably 0.1 to 20 parts by weight, the most preferably 0.5 to 10 parts by weight, per 100 parts by weight of hydrotalcite compound. Moreover, a small amount of impurities, such as other metal oxides, may contain so far as not degrading the effects of the invention.

Moreover, in order to improve dispersibility of the hydrotalcite compound, one or more of a higher fatty acid, a fatty acid amide lubricant, a silicone oil, a sorbitan fatty acid ester, such as sorbitan monostearate, and a glycerine fatty acid ester, such as glycerine monostearate may be added to the resin composition as dispersing agent in an amount as the total of 0.01 to 10 wt. %, preferably 0.05 to 8 wt. %, more preferably 0.08 to 5 wt. %, the most preferably 0.1 to 3 wt. % By combining with the hydrotalcite compound, synergistic effects are exhibited, such as prevention against degradation of photographic properties, molding and processing stability, rust prevention of a molding machine, and anticorrosion are improved. In the case of transparent injection molded articles (e.g. unpigmented containers for a photographic film), coloring and resin degradation of injection molded articles are prevented, transparency is improved decrease of physical strength is prevented, and lump generation and coloring troubles caused by resin yellowing is prevented. It is particularly preferable to combine one or more stabilizers selected from the group consisting of phenolic antioxidants, phosphorous-containing (phosphite) antioxidants and fatty acid metal salts, because of rare degradation of acid metal salts photographic properties of photographic photosensitive materials and increase of antioxidation effect.

In this case, in order not to affect adversely photographic performance of photographic photosensitive materials, ① to blend 0.0005 to 0.5 wt. %, preferably 0.001 to 0.4 wt. %, particularly preferably 0.002 to 0.3 wt. %, of a phenolic antioxidant, ② to blend 0.0005 to 0.5 wt. %, preferably 0.001 to 0.4 wt. %, particularly preferably 0.002 to 0.1 wt. %, of a phosphorus-containing antioxidant, ③ to blend 0.001 to 5 wt. %, preferably 0.005 to 4 wt. % particularly preferably 0.01 to 3 wit. %, of a hydrotalcite compound and/or a fatty acid metal salt (metallic soap), and the total blending amount of ①+②+③ becomes 0.0015 to 6 wt. %, preferably 0.002 to 5 wt. %, more preferably 0.003 to 4 wt. %, the most preferably 0.005 to 3 wt. % of the packaging material for a photographic photosensitive material. In any event, it is preferable to blend a minimum amount capable of preventing resin degradation in view of not degrading photographic performance and inhibiting increase of cost.

It is preferable to combine the fatty acid metal salt (metallic soap) described later with the hydrotalcite compound. The fatty acid metal salt not only exhibits excellent effects similar to the hydrotalcite compound, but also exhibits as lubricant and the dispersing agent of light-shielding material.

The packaging material for a photographic photosensitive material of the invention preferably contains one or more of zeolite, silica and alumina Thereby, deodorant effect, improvement in photographic properties and anticorrosion of equipment containing iron, such as a mold and an extruder, can be improved by a half rank.

Preferable zeolite has a mean particle size of 0.5 to 15 $\mu$m, preferably 0.8 to 12 $\mu$m, particularly preferably 1.1 to 9 $\mu$m, a specific surface area measured by the BET method of 25 $m^2/g$ or less, preferably 22 $m^2/g$ or less, particularly preferably 20 $m^2/g$ or less, a DBP oil absorption value of 80 ml/100 g or less, preferably 60 ml/100 g or less, particularly preferably 40 ml/100 g or less, in terms of prevention of pinholes and lumps, prevention of pressure marks and abrasion on photographic photosensitive material, prevention of adverse effect on photographic properties by halogen components, prevention of bleedout by adsorption of materials liable to bleed out and improvement in the prevention of blocking. Preferable form is sphere and similar forms in terms of dispersibility and prevention of pressure marks and abrasion on photographic photosensitive materials. Both of natural zeolite and synthetic zeolite are usable, and preferred one, is synthetic zeolite because of improving photographic properties.

A suitable content of one or more of zeolite, silica and alumina is 0.01 to 5 wt. %, preferably 0.05 to 4 wt. %, more preferably 0.1 to 3 wt. % the most preferably 0.2 to 2 wt. %. In the case of less than 0.01 wt. %, blending effect is insufficient, and in the case of more than 5 wt. %, blending effect by the excess amount is small and nevertheless, lumps occur.

To incorporate fatty acid metal salt into the packaging material for a photographic photosensitive material of the invention is preferable. By the incorporation., photographic properties and anticorrosion of equipment containing iron, such as a mold and an extruder, can be improved by one rank. Moreover, fatty acid metal salt functions as a preferable lubricant, to render materials adversely effecting photographic properties of photographic photosensitive materials (catalyst residues, halogen compounds, etc.) harmless by neutralization, as a dispersant of carbon black having a particular oil absorption value.

Representative examples of the fatty acid metal salt are combination of a fatty acid, such as lauric acid, stearic acid, lactic acid, succinic acid, caproic acid, caprylic acid, capric acid, myristic acid, behenic acid, linolic acid, steel lactic acid, phthalic acid, benzoic acid, hydroxystearic acid, ricinoleic acid, naphthenic acid, oleic acid, montanic acid, erucic acid, palmitic acid or the like and Li, Na, Mg, Ca, Sr, Ba, Zn, Cd, Al, Sn, Pb or the like. Preferable fatty acid metal salts arc magnesium stearate, calcium stearate, odium stearate, zinc stearate, zinc oleate, magnesium oleate, calcium oleate, and the like.

A suitable blending amount of the fatty acid metal salt is 0.001 to 5 wt. %, preferably 0.005 to 4 wt. %, more preferably 0.01 to 3 wt. %, particularly preferably 0.02 to 2 wt. %. When the blending amount is 0.001 wt. %, the blending effect is insufficient. When the blending amount exceeds 5 wt. %, blending effect by the excess amount is small, and lumps occur Commercial fatty acid metal salts are, e.g. as follows:

TABLE 1

|  | Molecular Formula | State | Melting Point (° C.) |
|---|---|---|---|
| Ba stearate | $Ba(C_{17}H_{35}COO)_2$ | White fine powder | 225~ |
| Ba laurate | $Ba(C_{17}H_{33}COO)_2$ | White fine powder | 230~ |
| Ba ricinolate | $Ba(C_{17}H_{32}(OH)COO)_2$ | Light yellow white powder | 116~124 |
| Ba naphthenate | $Ba(C_nH_{2n-1}O_2)_2$ | Light yellow viscous solid | — |
| Ba 2-ethyl hexoate | $Ba(C_7H_{15}COO)_2$ | Light yellow viscous solid |  |
| Ca stearate | $Ca(C_{17}H_{35}COO)_2$ | White fine powder | 148~155 |
| Ca laurate | $Ca(C_{11}H_{23}COO)_2$ | White fine powder | 150~158 |
| Ca ricinolate | $Ca(C_{17}H_{32}(OH)COO)_2$ | Light yellow powder | 74~82 |
| Zn stearate | $Zn(C_{17}H_{35}COO)_2$ | White fine powder | 117~125 |
| Zn laurate | $Zn(C_{11}H_{23}COO)_2$ | White fine powder | 110~120 |
| Zn ricinolate | $Zn(C_{17}H_{15}(OH)COO)_2$ | Light yellow white powder | 94~102 |
| Zn 2-ethyl hexoate | $Zn(C_7H_{15}COO)_2$ | Colorless viscous liquid | — |
| Pb stearate | $Pb(C_{17}H_{35}COO)_2$ | White fine powder | 105~112 |
| Pb dibusic | $2PbO\text{-}Pb(C_{17}H_{35}COO)_2$ | White fine powder | 280~300 (decomposition) |
| Pb naphthenate | $Pb(C_nH_{2n-1}O_2)_2$ | Brown Syrup | — |
| Sn stearate | $Sn(C_{17}H_{35}COO)_2$ | White fine powder | 103~108 |
| Mg stearate | $Mg(C_{17}H_{35}COO)_2$ | White fine powder | 108~115 |

Among the above fatty acid metal salts, calcium stearate, magnesium stearate and zinc stearate are preferable, because of the improvement in dispersibility of carbon black, inhibition of hygroscopicity, great improvement in photographic properties and inexpensiveness, Zinc stearate is particularly preferred.

To add one or more of oxidation inhibition materials to the packaging material for a photographic photosensitive material is preferable for the purpose of the improvement in photographic properties by the prevention of thermal degradation and thermal decomposition of the thermoplastic resin, such as polystyrene resin, polyacetal resin, polyolefin resin, olefin-based thermoplastic elastomer, which is the principal component of the resin composition of the invention. Blending of at least one of oxidation inhibition materials prevents thermal degradation and thermal decomposition of thermoplastic resin and additives, such as fatty acid, lubricant, organic nucleating agent and surfactant, and prevents the great variation of fluidity and the occurrence of lumps of the resin composition of the invention, furthermore, it is also possible to prevent the generation of thermal decomposition products (aldehydes, etc.) which adversely affect photographic photosensitive materials. It is preferable to add various known compounds (e.g. hydantoin compounds, hydrazine compounds, area compounds) which stabilize thermal decomposition products (aldehydes, etc.) by decrease, reaction or adsorption to the degree not to affect adversely photographic photosensitive materials. The photographic properties can be maintained by decreasing the formaldehyde content, measured by the acetylacetone method, of the packaging material for a photographic photosensitive material to 500 ppm or less, preferably 300 ppm or less, more preferably 150 ppm or less, the most preferably 75 ppm or less.

A suitable blending amount of one or more of the oxidation inhibition materials in the packaging material for a photographic photosensitive material is 0.001 to 1 wt. %, preferably 0.005 to 0.7 wt. %, more preferably 0.01 to 0.45 wt. %. When the blending amount is less than 0.001 wt. %, blending affect is insufficient. When the blending amount is more than 1 wt. %, fuming and offensive odor increases. Moreover, the oxidation inhibition materials affect adversely photographic properties of photographic photosensitive materials which utilize oxidation-reduction reaction, and bleed out of the surface of molded articles to degrade appearance. In the case of film molded articles they degrade heat sealing properties, and are transferred to photographic photosensitive materials to induce uneven development.

As the oxidation inhibition materials, there are antioxidant, radical scavenger and antioxidant synergyst.

Examples of the antioxidant are as follows:

Phenolic Antioxidants:

vitamin E (tocopherol), tocopherol dimer (α-tocopherol, β-tocopherol, 5,7-dimethyl tocopherol), 6-t-butyl-3-methylphenol derivatives, 2,6-di-t-butyl-p-cresol, 2,6-di-t-butyl-phenol, 2,6-di-t-butyl-β-dimethylamino-p-cresol, 2,6-di-t-butyl-p-ethylphenol, 2,6-di-t-butyl-p-cresol (BHT), 2,2'-methylenebis-(4-ethyl-6t-butylphenol), 4,4'-butylidenebis(6-t-butyl-m-cresol), 4,4'-thiobis(6-t-butyl-m-cresol), 4,4-dihydroxydiphenylcyclohexane, butylated hydroxyanisole, alkyl group-induced bisphenol, styrene group-induced phenol, 2,6-di-t-butyl-4-methylphenol, n-octadecyl-3-(3'5'-di-t-butyl-4'-hydroxyphenyl) propionate, 2,2'-methylenebis(4-methyl-6-t-butylphenol), 4,4'-thiobis(3-methyl-6-t-butylphenol, 4,4'-butylidenebis (3-methyl-6-t-butylphenol), stearyl-β-(3, 5-di4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis [methylene-3-(3',5'-di-t -butyl-4'-hydroxyphenyl) propionate]methane, etc.

Ketone-Amine Condensate Antioxidants:
6-ethoxy-2,2,4 -trimethyl-1,2-dihydroquinoline, polymer of 2,2,4-trimethyl-1,2-dihydroquinoline, trimethyldihydroquinoline derivatives, etc.

Arylamine Antioxidants:
Phenyl-α-naphthylamine, N-phenyl-β-naphthylamine, N-phenyl-N'-isopropyl-p-phenylenediamine, N,N'-diphenyl-p-phenylenediamine, N,N'-di-β-naphthyl-p-phenylenediamine, N-(3'-hydroxybutylidene)-1-naphthylamine, etc.

Imidazole Antioxidants:
2-mercaptobenzothiazole, zinc salt of 2-mercaptobenzomidazole, 2-mercaptomethylbenzoimidazole, etc.

Phosphite Antioxidants:
Alkyl-induced arylphosphite, tris (mono and/or dinonylphenyl) phosphite, cyclic neopentanetetraylbis (2,6-di-t-butyl-4-methylphenyl) phosphite, diphenylisodecylphosphite, sodium phosphite salt of tris (nonylphenyl)phosphite, 2,7-methylenebis (4,6-di-t-butylphenyl) octylphosphite, tris (2,4-di-t-butylphenyl) phosphite, trinonylphenylphosphite, triphenylphosphite, etc.

Thiourea Antioxidants
Thiourea derivatives, 1,3-bis(dimethylaminopropyl)-2-thiourea, etc.

Other Antioxidants:
Those useful for air oxidation, such as dilauryl thiodipropionate, metal deactivators, etc.

Particularly preferable antioxidants are hindered phenolic antioxidants because of rare adverse affect upon photographic properties of photographic photosensitive materials. The hindered phenolic antioxidants are 1,3,5-trimethyl-2,4, 6-tris(3,5-di-tert-butyl-4-hydroxybenzyl)benzene, tetrakis [methylene(3,5-di-tert-butyl-4-hydroxy-hydrocinnamate) methane], octadecyl3,5-di-tert-butyl-4-hydroxy-hydrocinnamate, 2,2',2'-tris (3,5-di-tert-butyl-4-hydroxyphenyl)propionyloxy ethylisocyanulate, 1,3,5-tris (4-tert-butyl-3-hydroxy-2,6-di-methylbenzyl) isocyanulate, tetrakis(2,4-di-tert-butylphenyl)-4,4,'-biphenylene diphosphite ester, tetrakis[methylene-3-(3,5-di-tert-butyl-4-hydroxyphenyl)propionate]methane, 4,4'-triobis-(6-tert-butyl-o-cresol), 2,2 '-thiobis-(6-tert-butyl-4-methylphenol), tris-(2-methyl-4-hydroxy-5-tert-btuylphenyl)butane, 2,2'-methylene-bis-(4-methyl-6-tert-butylphenol), 4,4'-methylene-bis2,6-di-tert-butylphenol), 4,4'-butylidenebis-(3-methyl-6-tert-butylphenol), 2,6-di-tert-butyl-4-methylphenol, 4-hydroxymethyl-2,6 -di-tert-butylphenol, 2,6-di-tert4-n-butylphenol, 2,6-bis(2'-hydroxy 3'-tert-butyl-5'-methylbenzyl)-4-methylphenol, 4,4'methylene-bis-(6-tert-butyl-o-cresol), 4,4'-butylidene-bis-(6tert-butyl-m-cresol), 3•9-bis 1•1-dimethyl -2[β-(3-t-butyl-4-hydrox-5-methylphenyl)propionyloxy]ethyl) 2,4.•8,10-tetraoxospiro, [5,5]undecane, and the like. Preferable antioxidants have a melting point of 100° C. or more, particularly preferably 120° C. or more, in view of small bleeding out, small thermal decomposition, and small adverse affect upon photographic photosensitive materials. Moreover, it is effective to combine a phosphorous-containing antioxidant with the hindered phenolic antioxidant. To combine a phosphorous-containing antioxidant and a hydrotalcite compound with the hindered phenolic antioxidant is particularly preferable. It is the most preferable to combine 5 additives, i.e. organic nucleating agent, phosphorus-containing antioxidant, hindered phenolic antioxidant, hydrotalcite compound and lubricant, In the case of containing at least one type of phosphorus-containing antioxidant, since phosphorous acid produced by thermal decomposition greatly affects adversely photographic photosensitive materials to generate fog, it is preferable to add hydrotalcite compound in a content of 0.01 to 5 wt. %, preferably 0.05 to 3 wt. % which neutralizes phosphorous acid.

Preferable antioxidants are phenolic antioxidants, and particularly effective antioxidants are BHT, low volatile high molecular weight phenolic antioxidants ("Irganox 1010", "Irganox 1076", trade names of Ciba-Geigy A. G., "Jonox 330", trade name of Shell, "Good-Rite 3114" trade name of Good rich, "Topanol CA", trade name of I.C.I., etc.), dilaurylthiodipropionate, distearylthiodipropionate, tris(2,4-di-tert-butylphenyl) phosphite ("Phosphite 168", trade name of Ciba-Geigy A. G. dialkylphosphate, etc. Two or more antioxidants may be combined.

The above vitamin E (tocopherol) and tocopherol dimers color molded articles yellow, as well as exhibit excellent oxidation inhibition. When they are combined with a light-shielding material, such as carbon black, light-shielding ability of the light-shielding material is improved due to their color and improvement in dispensability of the light-shielding material. As a result, molded articles having equivalent light-shielding ability can be obtained, even if the blending amount of the light-shielding material is decreased by 10% or more. Thereupon, various advantages can be obtained, such as prevention of photographic properties degradation, improvement in physical strength, improvement in appearance, and reduction of manufacturing cost due to the decrease of material cost.

Particularly, it is preferable to combine at least one of the above hindered phenolic antioxidants having a melting point of 100° C. or more, preferably 120° C. or more which are representative radical chain terminator, and at least one of phosphorus-containing antioxidants which are peroxide decomposer, because of improving prevention of thermal degradation of resin and additives without degrading photographic properties The must preferable combination is 0.01 to 1.5 wt. % in the total of one or more of phosphorus-containing antioxidants and one or more of hindered phenolic antioxidants and 0.01 to 5 wt. % of hydrotalcite compound.

A preferable molecular weight of the antioxidant is 200 or more, preferably 300 or more, more preferably 400 or more, the most preferably 500 or more, because of exhibiting various excellent properties, such as small adverse effects on photographic properties of photographic photosensitive materials, small thermal decomposition at a melting temperature of resin (130 to 400° C) and small bleedout with time.

The most preferable antioxidants for the packaging material for a photographic photosensitive material of the invention are tetrakis[methylene-3-(3,5-di-t-butyl-4-hydroxyphenyl)propionate]methan, n-octadecyl-3-(4'-hydroxy-3',5'-d-t-butylphenol)propionate and tris-(2,4-di-t-butylphenyl)phosphite.

As the radical scavenger suitable for the invention, there are hydroquinone, 1,1 -diphenyl-2-picrylhydrazyl, 1•3•5-triphenyl -ferudazyl, 2•2 ,6•6-tetramethyl-4-piperidone-1-oxyl, N-(3-N-oxyanilino-1 3-dimethylbytylidene)

anilinoxide, high valency metal salts, such as ferric chloride, diphenylpicrylhydrazine, diphenyamine, t-butylcatechol, dithiobenzyldisulfide, p•p'-ditolyltrisulfide, benzoquinone derivatives, nitro compounds, nitroso compounds, and the like. Among them, to use hydroquinone is particularly preferred.

The above radical scavenger may be used as a single material, or several types may be combined. Furthermore, it is also preferable to combine one or more of various antioxidant, hydrotalcite compound, antioxidant synergyst and age resistor.

The antioxidant synergyst prevents thermal degradation and thermal decomposition of resin and low molecular weight additives (lubricant, antistatic agent, organic nucleating agent, dripproofing agent, compatibilizing agent, etc.), degradation of physical strength, great variation of resin fluidity and generation of lumps, in combination with one or more of the antioxidant, the radical scavenger and the hydrotalcite compound. Furthermore, the generation of thermal decomposition product (aldehyde, etc.) which adversely affects photographic photosensitive materials. As the antioxidant synergist exhibiting such a function, there are phosphoric acid, citric acid, phosphate compounds, citrate compounds and the like. Phosphoric acid metal salts and citric acid metal salts are particularly preferred.

Representative examples of the light-shielding material are shown below.

Inorganic Compounds,
  Oxides . . . silica, diatomaceous earth, alumina, titanium oxide, iron oxide (iron black), zinc oxide, magnesium oxide, antimony oxide, barium ferrite, strontium ferrite, beryllium oxide, pumiice, pumice balloon, alumina fiber, etc.
  Hydroxides . . . aluminum hydroxides, magnesium hydroxides, basic magnesium carbonate, etc.
  Carbonates . . . calcium carbonate, magnesium carbonate, dolomite, dawsonite, etc.
  Sulfates, sulfites . . . calcium sulfate, barium sulfate, ammonium sulfate, calcium sulfite, etc.
  Silicates . . . talc, clay, mica, asbestos, glass fiber, glass baloon, glass bead, calcium silicate, montmorillonite, bentonite, zeolite, etc.
  Carbons . . . carbon black, graphite, carbon fiber, carbon hollow bead, etc.
  Others . . . lead powder, aluminum powder, boron fiber, silicon carbide fiber, potassium titanate, lead titanate zirconate, zinc borate, barium metaborate, calcium borate, sodium borate, aluminum paste, etc.

Organic Compounds:
  wood flour such as pine, oak and sawdust, hsk fiber such as almond, peanut and chaff, various fibers such as cotton, jute, paper piece, non wood fibers (straw, kenaf, bamboo, esparto, bagasse, etc.,), cellophane piece, nylon fiber, polypropyelen fiber, various starch (containing modified starch, surface-treated starch, etc.), aromatic polyamide fiber.

Preferable light-shielding materials are inorganic materials capable of opacifying even at a temperature of 150° C. or more due to its heat stability and rarely affecting photographic properties adversely. Particularly, carbon black, titanium nitride, graphite and iron black, which are light-absorptive, are preferable, because they are excellent in heat resistance and light-resistance and are relatively inactive materials.

Carbon blacks are divided into gas black, furnace black, channel black, anthracene black, acetylene black, Ketjen carbon black, thermal black, lump black, vegetable black and animal black according to their origin.

In the invention, furnace carbon black is preferable in terms of light-shielding character, low cost and improvement in physical strength. On the other hand, since acetylene black and Katzen carbon black which is modified by-produced carbon black have an antistatic character, they are also preferable, although they are expensive. Preferable one for photographic photosensitive materials having an ISO photographic speed of 100 or more is acetylene black having a free sulfur content of 0.01% or less which especially affects adversely photographic properties (increase of fog abnormal sensitivity, abnormal color development, etc.). They may be blended with furnace black in order to improve its character.

The form of blending light-shielding material is roughly divided as follows:
(1) Uniformly colored- pellets
  Most common form called color compound.
(2) Dispersible powder
  Also called dry color, treated with various surface treating agents, dispersing assistant is added, and then, pulverized into fine particles.
(3) Paste
  Dispersed in plasticizer, etc.
(4) liquid
  Also called liquid color, dispersed in surfactant, etc.
(5) Masterbatch pellets
  Light-shielding material is dispersed in a plastic to be colored in a high concentration.
(6) Wettable granule
  Light-shielding material is dispersed in a plastic in a high concentration, and then, processed in a form of granule.
(7) Dry powder
  Usual dry powder without treating.

Although, there are various blending method, as above the masterbatch method is preferred in view of cost and less contamination of the working place. The inventor also disclosed a resin composition for colored masterbatch wherein a light-shielding material is dispersed in a particular ethylene-ethylacrylate copolymer resin in Japanese Patent KOKAI 63-186740.

Particularly preferable carbon blacks for the packaging material for a photographic photosensitive material have a pH (JIS K 6221) of 6 to 9, a mean particle size (measured by an electron microscope) of 10 to 120 m$\mu$, preferably 10 to 80 m$\mu$, in view of no occurrence of fogging, rare occurrence of photosensitivity deviation, great light-shielding ability, and rare occurrence of matters generating pinholes, such as agglomerates (lumps of carbon black, microgels and fish eyes, upon adding to L-LDPE resin, homopolypropylene resin, propylene-α-olefin copolymer resin, homopolyethylene resin, homopolystyrene resin, rubber-containing polystyrene resin, polyacetal resin and polycarbonate resin which are the most preferable resins for the invention. Among them, the most preferred one is furnace carbon black having a volatile component content (JIS K 6221) of not more than 2.0%, and a DBP oil absorption value (ASTM D-2414) of not less than 50 ml/ 100 g, in view of the improvement in light-shielding ability and dispersibility and less degradation of physical properties.

Unless the sulfur content measured by ASTM D 1619-60 of the packaging material is 0.9% or less, preferably 0.7% or less, particularly preferably 0.5% or 1 less, photographic properties of photographic photosensitive materials are adversely affected, such as increase of fog, abnormal sensitivity and abnormal color development. Particularly, free sulfur component content, which adversely affects photographic properties of photographic photosensitive materials directly and greatly, is 0.1% or less, preferably 0.05% or less, particularly preferably 0.01% or less. The free sulfur component content is measured as follows: Each sample is cooled to solidify by liquid nitrogen, and ground. 100 g of the ground sample is put in a Soxhlet extractor, and extracted with chloroform at 60° C. for 8 hours followed by cooling. The total volume of the extract is made 100 ml. 10 ml of the extract solution is injected into a high speed liquid chromatograph, and sulfur is determined. As the separation conditions of the high speed liquid chromatograph are, column: ODS silica column (4.6 mmφ×150 mm), carrier solution:methanol:water is 95:5 containing 0.1% acetic acid and 0.1% triethylamine, flow rate:1 ml/min., detection wavelength:254 nm, determination:absolute calibration curve method.

In order not to affect photographic properties of photographic photosensitive materials, the sulfur content (ASTM D-1619) of carbon black is preferably 0.6 wt. % or less, more preferably 0.3 wt. % or less, particularly preferably 0.1 wt. % or less. For that purpose, selection of raw materials is important.

| Raw oil | Sulfur content of raw oil |
| --- | --- |
| creosote oil (raw material: coal) | 0.3–0.6% |
| Ethylene bottom oil (raw material: naphtha) | 0.05–0.1% |
| Ethylene bottom oil (raw material: light oil) | 0.2–1.5% |
| Fluidized catalysis residual oil | 0.2–4.0% |

Accordingly, preferable raw oils are creosote oil and ethylene bottom oil (raw material: naphtha), and the ethylene bottom oil (raw material:naphtha) is the most preferable, because the sulfur content of carbon black can be made 0.1 wt. % or less. Particularly, free sulfur content (JIS K 6350) of carbon black, which especially affects adversely photographic properties, is 100 ppm or less, preferably 50 ppm or less, more preferably 20 ppm or less, the most preferably 10 ppm or less.

Acetylene black having a sulfur content of 0.1% or less is preferable for photographic photosensitive materials having an ISO photographic speed of 100 or more because of keeping good photographic properties, although it is expensive. The cyanide content of carbon black which degrades photographic properties is 100 ppm or less, preferably 50 ppm or less, more preferably 20 ppm or less, particularly preferably 10 ppm or less, the most preferably 5 ppm or less. The cyanide content is determined as hydrogen cyanide by 4-phridine carboxylic acid—pyrazolone absorption spectrophotometry, and the hydrogen cyanide content is converted to ppm Unit per light-shielding material weight. The iodine adsorption amount (JIS K 6221) carbon black is 20 mg/g or more, preferably 30 mg/g or more, more preferably 50 mg/g or more, particularly preferably 80 mg/g or more, and a dibutylphthalate (DBP) oil absorption value (JIS K 6221) of carbon black is 50 ml/ 100 g or more, preferably 60 ml/ 100 g or more, particularly preferably 70 ml/ 100 g or more, the most preferably 100 ml/ 100 g or more. The aldehyde compound content by the iodine method is 0.1 wt. % or less, more preferably 0.05 wt. % or less, the most preferably 0.01 wt. % or less.

A suitable content of the light-shielding material such as carbon black varies according to the type and thickness of the packaging material, and, in general, is 0.01 to 50 wt. %, preferably 0.05 to 45 wt. %, more preferably 0.08 to 40 wt. %, the most preferably 0.1 to 35 wt. %, in order to ensure complete light-shielding, moldability and physical strength.

As the preferable light-shielding material, inorganic pigments having a refractive index measured by the Larsen oil immersion method of not less than 1.50, various metal powders, metal flakes, metal pastes, metal fibers, and carbon fiber are next to carbon black.

Representative examples are titanium oxide of the rutile type (2.76), titanium oxide of the anatase type (2.52), silicon carbide (2.67), zinc oxide (2.37), antimony oxide (2.35), lead white (2.09), zinc white (2.02), lithopone (1.84), zircon (1.80), corundum (1.77), spinel (1.73), apatite (1.64), baryta powder (1.64), calcium carbonate (1.58), talc (1.58), calcium sulfate (1.56), silicic anhydride (1.55), silica powder (1.54), magnesium hydroxide (1.54), basic magnesium carbonate (1.52), magnesite (1.62), dolomite (1.59), alumina (1.50), and the like. The number in parenthesis indicates refractive index. Particularly preferable light-shielding materials have a refractive index of not less than 1.56, more preferably not less than 1.60.

On the other hand, since calcium silicate (1.46), diatomaceous earth (1.45), hydrous silicate (1.44) and the like have a refractive index of less than 1.50, they are unsuitable, .because of a small light-shielding ability. As a result it is necessary to blend in quantity, and thereby, lump generation increases.

Recently, X-ray checking apparatus is used for baggage inspection at air port. When a high sensitivity photographic film having a sensitivity of ISO photographic speed 400 or more is passed through the X-ray checking apparatus, fogging is liable to occur on the photographic film by X-ray. To blend a light-shielding material having a specific gravity of not less than 3.1, preferably not less than 3.4 particularly preferably not less then 4.0, is preferable for preventing the occurrence of fogging by the X-ray. The light-shielding material having X-ray-shielding ability as well as light-shielding ability has a specific gravity of not less than 3.1, preferably not less than 3.4, particularly preferably not less than 4.0, and the form may be any form, such as pigment, powder, flake, whisker or fiber Examples of the light-shielding material having X-ray-shielding ability are silicon carbide, barium sulfate, molybdenum disulfide, lead oxide (lead white), iron oxide, titanium oxide, magnesium oxide, barium titanate, copper powder, iron powder, brass powder, nickel powder, silver powder, lead powder, steel powder, zinc powder, tungsten whisker, silicon nitride whisker, copper whisker, iron whisker, nickel whisker, chrominum whisker, stainless steel powder and whisker, magnesite, aptite, spinel, corundum, zircon, antimony trioxide, barium carbonate, zinc white, tin powder, their mixtures, etc.

Particularly preferable ones are zircon, corundum, barium sulfate, barium chloride, barium titanate, lead powder, lead oxide, zinc powder, zinc white, tin powder, stainless steel powder, stainless steel whisker, iron black, tungsten whisker, nickel whisker, etc. Preferable light-shielding materials have a refractive index of not less than 1.50 and a specific gravity of not less than 3.1, more preferably a refractive index of not less than 1.56 and a specific gravity of not less than 3.4.

A suitable content of the X-ray-shielding light-shielding material is 0,1 to 80 wt. %, preferably 0.3 to 70 wt. %, particularly preferably 0.5 to 60 wt. %, the most preferably 1.0 to 50 wt. %, although the suitable content varies according to layer thickness, type of resin, etc.

Refractive index and specific gravity of various light-shielding materials shown in Table 2.

TABLE 2

| Light-Shielding | Refractive Index (Oil Immersion of Larsen) | Specific Gravity (A Method of ASTM D-153) |
| --- | --- | --- |
| Rutyl tipe TiO$_2$ | 2.76 | 4.2 |
| Silicon carbide | 2.67 | 3.17~3.19 |
| Anatace type TiO$_2$ | 2.52 | 3.8 |
| Zirconium oxide | 2.40 | 5.5 |
| Antimony oxide | 2.35 | 4.6 |
| Lead white | 2.09 | 6.4~6.9 |
| Zinc white | 2.02 | 4.3 |
| Lithopone | 1.84 | 5.59 |
| Zircon | 1.80 | 3.9~4.1 |
| Corundum | 1.77 | 3.9~4.0 |
| Magnesium oxide | 1.74 | 3.2~3.4 |
| Spinel | 1.73 | 3.5~3.6 |
| Basic zinc carbonate | 1.70 | 3.3 |
| Asbestos | 1.70 | 2.4~2.6 |
| Apatite | 1.64 | 3.1~3.2 |
| Baryta powder | 1.64 | 4.5 |
| Barium sulfate | 1.64 | 4.3 |
| Magnesite | 1.62 | 3.0~3.1 |
| Carbon black | 1.61 | 1.7~2.1 |
| Anhydrous calcium sulfate | 1.59 | 2.9~3.0 |
| Dolomite | 1.59 | 2.8~2.9 |
| Calcium | 1.58 | 2.83 |
| Talc | 1.58 | 2.6~2.8 |
| Agalmetolite clay (phrophylite) | 1.57 | 2.7~2.9 |
| Magnesium hydroxide | 1.54 | 2.4 |
| Silica powder | 1.54 | 2.5~2.6 |
| Basic magnesium carbonate | 1.52 | 2.2~2.3 |
| Bentonite | 1.52 | 2.0~2.6 |
| Alumina | 1.50 | 3.75 |

A preferable X-ray-shielding light-shielding material content is 5 to 70 wt %, more preferably 10 to 60 wt. %/., the most preferably 20 to 50 wt. %. When the content is less than 5 wt. %, X-ray shielding is insufficient. When the content exceeds 80 wt. %, physical strength is inferior. In this case, it is preferable to incorporate 3 to 45 wt. % preferably 5 to 40 wt. % of synthetic rubber or ethylene-α-olefin copolymer resin having an α-olefin content of 10 mol. % or more for the purpose of ensuring physical strength.

In order not to affect adversely photographic photosensitive materials and not to degrade moldability (foaming, weldlines, short shot, the aforementioned various light-shielding material is used preferably in a state that weight loss on drying at 100° C. for 5 hours is not more than 2 wt. %, preferably not more than 1 wt. %, particularly preferably not more than 0.5 wt. %, the most preferably not more than 0.3 wt. %. The light-shielding material can be made in this state by heating, evacurating or combination thereof.

As oil-absoptive inorganic pigment having a function of adsorbing lubricant, antioxidant and organic nucleating agent, which are liable to bleed out, deodorant, agent imparting fragrance, oxygen scavenger, etc., there are zinc white (52), asbestine (50), clay (51), titanium dioxide (56), kaolin (60), talc (60), carbon black (not less than 60), activated carbon and the like. The number in parenthesis indicates oil absorption value (in/g) measured by JIS K 6221 A method.

The metal powder includes metal paste, and examples are aluminum powder, aluminum paste, stainless steel powder, nickel powder, silver powder, tin powder, zinc powder, steel powder and the like, As the aluminum powder including aluminum paste, aluminum powder of which the surface is coated with a surface-coating material and aluminum paste from which low volatile components are removed and then kneaded with a thermoplastic resin are preferred. In order to improve uniform dispersiblity, moldability, photographic properties, appearance and less odor, preferable aluminum powder has a mean particle size of 0.3 to 50 μm, preferably 0.5 to 45 μm, particularly preferably 0.8 to 40 μm, a mean thickness of 0.03 to 0.5 μm, preferably 0.05 to 0.4 μm, particularly preferably 0.08 to 0.35 μm, and a fatty acid content of 5 wt. % or less, preferably 4 wt. % or less, particularly preferably 3 wt. % or less.

The paste of aluminum powder is produced by adding a liquid medium such as mineral spirits or and a small amount of a higher fatty acid such as stearic acid or oleic acid to form a paste at the production of aluminum powder according to a known method such as using a ball mill, a stamp mill or an atomizer. The aluminum paste is kneaded together with a thermoplastic resin, such as an aromatic monovinyl resin, such as polystyrene resin or rubber-containing polystyrene resin, a polyolefin thermoplastic resin, such as various polypropylene resins, various polyethylene resins, acid-modified resins, EVA resin, EEA resin or EM resin, dispersing agent, such as low molecular weight polyolefin resin, paraffin wax, tackifier and metallic soap (fatty acid metal salt), etc. under heat, and volatile components mainly mineral spirits and white spirits are removed by heat, a vacuum pump or the like up to the low volatile component of not more than 3%, preferably not more than 1%, particularly preferably not more than 0.5% (weight loss on drying at 100° C. for 5 hours). This product is preferably used as aluminum paste compound resin or aluminum paste masterbatch resin.

The aluminum paste masterbatch resin is preferable because noxious odors and adverse influences upon the photographic photosensitive materials are eliminated. In order to eliminate noxious odor and adverse influences upon the photographic photosensitive materials, the content of mineral spirits should be less than 0.1 wt. %. When the aluminum paste content of the molded article is made 2 wt. 5 by using a masterbatch resin containing 40 wt. % of aluminum paste and 1.0 wt. % of mineral spirits, one part by weight of the masterbatch resin is blended with 19 parts by weight of the natural resin for dilution. Since part of the mineral spirits evaporates during molding, the final content of the mineral spirits is less than 0.05 wt. %.

The aluminum powder includes microflakes produced from aluminum foil which is crushed by a ball mill or a stamp mill, in addition to typical aluminum powder manufactured by atomization, dropping on a rotary disc or evaporation from melted aluminum. Since aluminum powder simplex is unstable, it is stabilized by a known treatment.

Particularly preferable aluminum powder has a mean particle size of 0.3 to 50 μm, a mean thickness of 0.03 to 0.5 μm and a fatty acid content of 5 wt. % or less which is manufactured by cutting using a shredder an aluminum foil which was rolled to a prescribed thickness (5 to 20 μm, preferably 6 to 15 μm, particularly preferably 7 to 10 μm), annealing and removing fatty acid, and then adding a fatty acid (including compound thereof having a number of carbon atoms of 8 or more in an amount of 5 wt. % or less per the cut aluminum foil and pulverizing using one or more grinders selected from a ball mill, a stamp mill, a vibratory mill or an attritor, because of being excellent in dispersibility, photographic properties, gloss, and small ordor.

A suitable content of the light-shielding material is 0.1 to 80 wt. % in total in order to ensure qualities as goods, physical strength, photographic properties, moldability and economical view point, of the packaging material for a photographic photosensitive material of the invention, but it varies according to light-shielding ability of the light-shielding material and the object of use (e.g. X-ray shielding ability, imparting conductivity). In the case of carbon black, titanium oxide and aluminum powder excellent in light-shielding ability, a suitable content is 0.1 to 60 wt. %, preferably 0.3 to 40 wt. %, particularly preferably 0.5 to 30 wt. %, the most preferably 1 to 20 wt. % in total. When the content is less than 0.01 wt. %, unless the thickness of the packaging material is increased greatly, fogging occurs due to insufficient light-shielding ability. The thickening of the packaging material results in the retardation of molding speed due to lengthening cooling time, and the cost increases by the increase of resin When the content exceeds 60 wt. %, dispersibility becomes worse to generate microgrits (lumps) which induces pressure marks and abrasion on photographic photosensitive materials. Moreover, a water content of the packaging material increases by the increase of water adsorbed on carbon black, and adversely affects photographic properties) such as fogging, sensitivity deviation and abnormal coloring, upon photographic photosensitive materials. Furthermore, moldability of the packaging material is degraded to induce the occurrence of foaming, silver streaks, pinholes short shot or the like, and physical strength decreases. In the case of the coextruded multilayer film, it is preferable to incorporate 0.1 to 40 wt. % of a light shielding material into at least one of the layers, in order to ensure light-shielding.

It is preferable to coat the surface of a light-shielding material, (carbon black, aluminum powder, inorganic pigment having a refractive index of not less than 1.50, inorganic pigment having a specific gravity of not less than 3.4 or inorganic pigment having an oil absorption value of not less than 50 ml/ 1 00 g are preferred.) by surface-coating material, in order to improve the dispersibility into resin and the resin fluidity to prevent the generation of lumps (agglomerates of foreign material) or microgrits which induce abrasion marks, pressure marks or abrasion on photographic photosensitive materials, to prevent the generation of volatile substances harmful to photographic properties, to decrease hygroscopicity, to prevent fouling of die lip, and the like.

Representative coatings by the surface-coating material are as follows:

(1) Using a coupling agent:
Coated with a coupling agent containing azidosilane compound (disclosed in Japanese Patent KOKAI No. 662-32125).
Coated with a silane coupling agent.
Coated with a titanate coupling agent.
(2) Coated by depositing silica followed by depositing alumina.
(3) Coated with higher fatty acid metal salt, such as zinc stearate, magnesium stearate or calcium stearate.
(4) Coated with surfactant, such as sodium stearate, potassium stearate or hydroxyethylene dodecylamine.
(5) Coated by reacting barium sulfide aqueous solution with sulfuric acid aqueous solution in the presence of an excess amount of barium ion to produce barium sulfate having a mean particle size of 0.1 to 2.5 µm, adding alkaline silicic acid solution thereto to deposit barium silicate on the surface of the barium sulfate, and depositing hydrous silica on the surface of the barium sulfate produced by the decomposition of the barium silicated by adding mineral acid to the slurry.
(6) Coated with a composition consisting of one or more of the oxides selected from hydrated oxides of metal, such as titanium, aluminum, cerium, zinc, cobalt or silicon, and oxides of metal, such as titanium, aluminum, cerium, zinc, cobalt or silicon.
(7) Coated with a polymer having one or more reactive groups selected from aziridine group, oxiazoling group and N-hydroxyalkylamide group.
(8) Coated with polyoxyalkylene amine compound.
(9) Coated with cerium, iron, selected acid amion and alumina.
(10) Coated with alkoxy titanium derivative having α-hydroxycarboxylic acid residue as substituent.
(11) Coated with polytetrafluoroethylene.
(12) Coated with polydimethylsiloxane or modified silicone.
(13) Coated with phosphate ester compound.
(14) Coated with divalent to tetravalent alcohol.
(15) Coated with olefin wax, such as polyethylene wax or polypropylene wax.
(16) Coated with hydrous aluminum oxide
(17) Coated with silica of zinc compound consisting of zinc chloride, zinc hydroxide, zinc oxide, zinc sulfate, zinc nitrate, zinc acetate or zinc citrate of a combination thereof.
(18) Coated with polyhydroxy saturated hydrocarbon.
(19) Coated with a surfactant (cationic, nonionic, ampholytic)
(20) Coated with an organic metal chelate compound (Particularly, β-diketone chelate compound is preferable, because of being excellent in photographic properties, improvement in dispersibility A preferable coating amount is 0.01 to 15 wt. % per light-shielding material.), etc.

Preferable coatings are the above (1), (3), (12), (14), (15), (16), (18), (19), etc., and various antistatic agents, lubricants and dripproofing agents, because of rare adverse effect upon photographic photosensitive materials, such as fogging, and being excellent in the improvement in the dispersibility of light-shielding material, in the decrease of lump generation, and in the improvement in resin fluidity.

Particularly suitable coatings are esters of an aliphatic monocarboxylic acid and a monovalent aliphatic alcohol in an amount of 0.001 to 2 wt. %, preferably 0.005 to 1 wt. %, particularly preferably 0.01 to 0.5 wt. %. The ester decreases motor load, and improves the dipersibility of light-shielding material and moldability to render the appearance of molded articles beautiful, as well as decreasing adverse effects on photographic properties. The ester is composed of an aliphatic monocarboxylic acid having a number of carbon atoms of 20 to 40, preferably 25 to 35 and a monovalentaliphatic alcohol having a number of carbon atoms of 20 to 40, preferably 25 to 35. Examples of the aliphatic monocarboxylic acid are montanic acid, melissic acid, cerotic acid, lacceric acid and the like. Examples of the monovalent aliphatic alcohol are montyl alcohol, melissyl alcohol, lacceryl alcohol, cetyl alcohol and the like. The above esters are also very excellent as the surface-coating material of the light-shielding material because of the improvement in the fluidity of thermoplastic resin and uniform blendability. Moreover, when they are used for coating the surface of inorganic or organic nucleating agent as the dispersing agent, various excellent effects are exercised, such as the prevention of dusting and bleeding out, and the improvement in dispersibility and resin fluidity and tie like.

A suitable coating amount is 0.001 to 10 wt. %, preferably 0.005 to 5 wt. %, more preferably 0.01 to 3 wt. %, particularly preferably 0.05 to 1.5 wt. %, against light-shielding material, such as carbon black, titanium oxide or aluminum powder. When the coating amount is less than 0.001 wt. %, the coating effect is insufficient. When the coating amount exceeds 10 wt. %, bleeding out with time increases. Moreover, screw slip occurs that results in a variation of the amount of ejected resin.

A suitable total sulfur content (ASTM D-1619) of the above composite light-shielding material is not more than 1%, preferably not more than 0.8%, particularly preferably not more than 0.5%. A suitable free sulfur component is not more than 150 ppm, preferably not more than 50 ppm, particularly preferably not more than 30 ppm, and an ash content according to ASTM D-1506 is not more than 0.5%, preferably not more than 0.4%, particularly preferably not more than 0.3%. A suitable aldehyde compound content is not more than 0.2%, preferably not more than 0.1%, particularly preferably not more than 0.05%, in order to avoid adverse effects upon photographic properties. Since cyanides also adversely affect photographic properties of photographic photosensitive materials, it is suitable that the hydrogen cyanide quantity determined by the 4-pyridinecarboxylic acid pyrazolone absorption photometry is not more than 20 ppm, preferably not more than 10 ppm, particularly preferably not more than 5 ppm, converted to the weight of light-shielding material.

The resin composition of the invention may be colored in a translucent or opaque state by adding a light-shielding material for coloring. The coloring is preferable, because of increasing rigidity, improving moldability, shielding coloring troubles and lumps, and improving commercial values as goods. Furthermore, in the case of unpigmented injection molded containers (e.g. containers for a photographic film), packaging bags for a film unit with a lens or packaging bags for an assembly packaging of photographic films, coloring can be utilized for discrimination of types of photographic photosensitive materials in the container or packaging bag. As the light-shielding materials for coloring, there are dyes, coloring pigments, white pigments, metal powders, metal fibers, metal flakes, carbon black, etc.

Representative light-shielding materials for coloring are as follows:

White . . . Titanium oxide, calcium carbonate, mica, zinc white, clay, barium sulfate, calcium sulfate, magnesium silicate, etc.

Yellow . . . Titanium Yellow, yellow iron oxide, Chromium Titanium Yellow, disazo dye, vat dye, quinophthalene pigment, isoindolinone, etc.

Red . . . iron oxide red, disazo pigment, perylene pigment, monoazolake pigment, condensed azo pigment, etc.

Blue . . . Cobalt Blue, Ultramarine Blue, Cyanine Blue, etc.

Green . . . Chromium Oxide Green, Titanium Green, Cyanine Green, etc.

Black . . . Carbon black, iron oxide black, etc.

Gold . . . Aluminum powder and aluminum paste with yellow coating, copper powder, etc.

Silver . . . Aluminum powder, aluminum paste, tin powder, etc.

For the purpose of the improvement in light-shielding ability, carbon black is preferable, because of inexpensiveness, inconspicuous spot-shaped coloring trouble of resin and lumps (agglomerates of foreign material), and antioxidant synergyst effects. When a container body is provided with color print, it is preferable that the container body is colored gold, white or silver by using titanium oxide or aluminum powder.

It is preferable to blend a lubricant in order to improve packaging ability, peeling resistance, antistatic ability, and moldability of thermoplastic resin film.

Examples of the lubricant are as follows:

(I) Fatty acid amide lubricants
(1) Saturated fatty acid amide lubricants:
① Behenic acid amide lubricants: "DIAMIDE KN" (Nippon Kasei Chemical Co., Ltd.)
② ( Stearic acid amide lubricants: "ARMIDE HT"0 (Lion), "ALFLOW S-10"(Nippon Oil and Fats Co., Ltd.), "FATTY AMIDE S" (Kao Corp.), "NEWTRON 2" (Nippoit Fizie Chemical Co., Ltd.), "DIAMID 200" and "DIAMIDE AP-1" (Nippon Kasei Chemical Co., Ltd.), "AMIDE S" and "AMIDE T" (Nitto Kagaku K. K.), et.
(2) Hydroxystearic acid amide lubricants:
① Palmitic acid amide lubricants: "NEWTRON S-18" (Nippon Fine Chemical Co., Ltd.), "AMIDE P" (Nitto Kagaku K. K.), etc.
② Lauric acid amide lubricants: "AMIDE C" (Lion Akzo Co., Ltd.), "DIAMID" (Nippon Kasei Chemical Co., Ltd.), etc.
(3) Unsaturated fatty acid made lubricants:
① Erucic acid amide lubricants: "ALFLOW P-10" (Nippon Oil and Fats Co., Ltd.), "NEWTRON-S" (Nippon Fine Chemical Co., Ltd .), "LUBROL" (I.C.I.), "DIAMID L-200" (Nippon Kasei Chemical Co., Ltd.), etc.
② Oleic acid amide lubricants: "ARMOSLIP-CP" (Lion Akzo Co., Ltd.), "NEWTRON" and "NEWTRON E-18" (Nippon Fine Chemical Co., Ltd.), "AMIDE-O" (Nitto Kagaku K. K.), "DIAMID O-200" and "DIAMID G-200" (Nippon Kasei Chemical Co., Ltd.), "ALFLOW E-10" (Nippon Oil and Fats Co., Ltd), "FATTY AMIDE O " (Kao Corp.), etc.
(4) Bisfatty acid amide lubricants
① Methylenebisbehenic acid amide lubricants: "DIAMID NK BIS" Nippon Kasei Chemical Co., Ltd.), etc.
② Methylenebisstearic acid amide lubricants: "DIAMID 200 BI S" (Nippon Kasei Chemical Co., Ltd.), "ARMO-WAX" (Lion Akzo Co., Ltd.), "BISAMIDE " (Nitto Kagaku K. K.), etc.
③ Methylenebisoleic acid amide lubricants: "LUBRON O" (Nippon Kasei Chemical Co, Ltd.), etc.
④ Ethylenebisstearic acid amide lubricants: "ARMOSLIP EBS" (Lion Akzo Co., Ltd.), etc.
① Hexamethylenebisstearic acid amide lubricants: "AMIDE 65" (Kawaken Fine Chemicals Co., Ltd.), etc.
① Hexamethylenebisoleic acid amide lubricants: "AMIDE 60" (kawaken Fine Chemicals Co., Ltd.), etc.
(11) Nonionic surfactant lubricants: "ELECTROSTRIPPER TS-2", "ELECTROSTRIPPER TS3" (Kao Corp.), etc.
(III) Hydrocarbon lubricants liquid paraffin, natural paraffin, microwax, synthetic paraffin, polyethylene wax (number average molecular weight less than 10,000, preferably less than 8,000, particularly preferably less than 6,000), polypropylene wax (number average molecular weight less than 10,000, preferably less than 8,000. particularly preferably less than 6,000), chlorinated hydrocarbon, fluorocarbon, etc.
(IV) Fatty acid lubricants: higher fatty acids preferably more than C 12, such as caproic acid stearic acid, oleic acid, erucic acid and palmitic acid, hydroxy fatty acids, etc.
(V) Ester lubricants: fatty acid lower alcohol esters, fatty acid polyol esters, fatty acid polyglycol esters, fatty acid fatty alcohol esters, etc.
(VI) Alcohol lubricants: polyols, polyglycols, polyglycerols, etc.
(VII) Fatty acid metal salts (metal soap): compounds of metal, such as Li, Na, Mg, Ca, Sr, Ba, Zn, Cd, Al, Sn, Pb with a fatty acid having a number of carbon atoms of 6 to 50 preferably 10 to 40, particularly preferably 10 to 30, such as caproic acid, caprylic acid, capric acid, myristic acid, lauric acid, stearic acid, succinic add, behenic acid, linolic acid, stearyl lactic acid, lactic acid, phthalic acid, benzoic acid, hydroxystearic acid, montanic acid, ricinoleic acid, naphthenic acid, oleic acid, palmitic acid or erucic acid. Preferred are magnesium stearate, calcium stearate, zinc stearate, magnesium oleate, etc.

(VIII) Particularly saponified montanate esters:

As suitable blending amount of the lubricant is different according to the type of the lubricant In the case of the lubricants having a small lubricity used so as not to degrade photo)graphic performance of photographic photosensitive materials, such as fatty acid metal salt (metallic soap), a suitable blending amount is 0.01 to 5 wt. 5, preferably 0.05 to 3 wt. %, particularly preferably 0.1 to 1.5 wt. %. The blending amount of less than 0.01 wt. % results in insufficient blending effect. The blending amount of more than 5 wt. % brings slip between the molten resin and the screw of an extruder, and discharge of resin varies. Moreover, greasiness and bleedout with tune are liable to occur. In the case of the lubricants having a great lubricity, tending to bleedout, affecting photographic photosensitive materials, a suitable blending amount is 0.01 to 1 wt. %, preferably 0.03 to 0.5 wt. %, particularly preferably 0.05 to 0.3 wt. %. The blending amount of less than 0.01 wt. % results in insufficient blending effect. The blending amount of more than 1 wt. % brings slip between the molten resin and the screw of an extruder, and discharge of resin varies. Moreover, greasiness and bleedout with tune are liable to occur. The lubricant bled out is transferred to the photographic photosensitive layer to inhibit development, and quality troubles, such as uneven development and uneven coloring occur.

Silicone lubricant may be added in order to improve lubricity, light-shielding ability, coloring ability, etc.

Examples of silicones and modified versions thereof are those having modified siloxane bonds such as polydimethylsiloxane and polymethylphenyisiloxane, olefin-modified silicone, amide-modified silicone, amino-modified silicone, dimethylpolysiloxane, amino-modified silicone, carboxyl-modified silicone, α-mehylstyrene-modified silicone, polyether-modified silicone modified with polyethylene glycol, polypropylene glycol, etc., olefin/polyether-modified silicone, epoxy-modified silicone, alcohol-modified silicone, etc. Among them, olefin-modified silicone, polyether-modified silicone dimethylpolysiloxane, amide-modified silicone, carboxyl-modified silicone, and olefin/polyether-modified silicone are preferable for packaging materials for a photographic photosensitive material because of rare adverse affects upon photographic properties and a great lubricating and light-shielding effects.

The silicone oil improves friction coefficient of a molding material, such as a resin sheet in heated conditions, decreases sliding resistance generated during hot plate sealing in an automatic packaging machine an prevents the occurrence of wrinkling. Thereby, the silicone oil provides a resin film which has a beautiful appearance, a high sealability, and adhesion to an article to be packaged without sagging. It also prevents the degradation of gloss by sliding to form a fine sealed portion. In the case of using silicone oil, friction coefficient at high temperature can be not more than 1.4 for sliding heat seal.

The above silicone oil has preferably a viscosity at ordinary temperature (25° C.) of 1,000 to 100,000 centistokes, preferably 3,000 to 60,000 centistokes, more preferably 5,000 to 30,000. A suitable content is 0.01 to 5 wt. %, preferably 0.03 to 3 wt. %, particularly preferably 0.05 to 1.5 wt. %, although it varies is according to the type of silicone oil and the object of use.

The silicone lubricant may be used as a sole or a combination of two or more lubricants or may be combined with other lubricant or plasticizer. The blending effects of the silicone lubricant are:

①Improvement in resin fluidity, decrease of motor load for screw, prevention of melt fracture.

②Ensuring of lubricity without fatty acid amide which bleeds out to generate white powder.

The resin composition of the invention may be blended with nucleating agent. By adding one or more of inorganic or organic nucleating agents, rigidity, Izod impact strength, wear resistance and the like can be improved. In the case of blending in crystalline polyolefin resin, particularly, homopolyethylene resin, ethylene-α-olefin copolymer resin, homopolypropyelen resin and propylene-α-olefin copolymer resin, transparency and moldability (shortening of molding cycle, decrease of molding troubles) can be improved as well as the above improvement.

A suitable content of the nucleating agent is 0.001 to 10 wt. %, preferably 0.005 to 8 wt. %, more preferably 0.01 to 5 wt. % (in the total upon using two or more nucleating agents). When the blending amount is less than 0.001 wt. %, blending effects are insufficient When the blending amount exceeds 10 wt. %, effects by the excess amount are small. Moreover, in the case of organic nucleating agent, various troubles occur, such as increase of fuming upon molding, bleeding out with time not only to degrade appearance but also to adhere on the photosensitive layer of a photographic photosensitive material to induce development troubles.

The organic nucleating agent includes carboxylic acids, dicarboxylic acids, their salt3 and anhydrides, salts and esters of aromatic sulfonic acids, aromatic phosphoric acids, aromatic phosphonic acids, aromatic carboxylic acids and their aluminum salts, metal salts of aromatic phosphoric acids, alkyl alcohols having a number of carbon atoms of 8 to 30, condensation products of a polyhydric alcohol and an aldehyde, and alkylamines. Examples are aluminum p-t-butylbenzoate, 1,3,2,4-dibenzylidenesorbitol, the di-substituted benzylidene-sorbitol represented by the following formula;

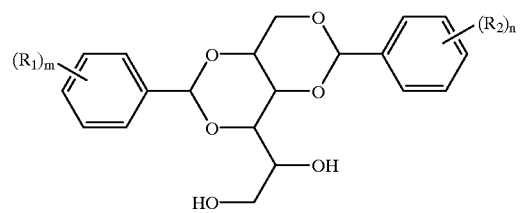

In the formula, $R_1$ and $R_2$ indicate an alky group or an alkoxy group having a number of carbon atoms of 1 to 8 or a halogen, and m and n are 0 to 3 and $m+n \geq 1$.

metal salts, such as calcium salt and magnesium salt, of stearyl lactic acid, the compounds, such as N-(2-hydroxyethyl)-stearylamine, represented by the following formula;

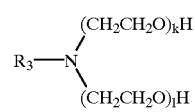

In the formula, $R_3$ indicates an alkyl group having a number of carbon atoms of 8 to 30, and k and 1 are 0 to 10 and $k+1 \geq 1$.

metal salts, such as lithium salt, sodium salt, potassium salt, calcium salt and magnesium salt, of 1,2-dihydroxystearic acid, stearyl alcohol, lauryl alcohol, sodium benzoate, benzoic acid, and sebacic acid.

Examples of the sorbitol compound are as follows:
di-(o-methylbenzylidene)sorbitol
o-methylbenzylidene-p-methylbenzylidene sorbitol
di-(m-mechylbenzylidene)sorbitol
m-methylbenzylidene o-methylbenzlidene sorbitol
di-(p-methylbenzylidene)sorbitol
m-methylbenzylidene-p-methylbenzylidene sorbitol
1•3-heptanylidenesorbitol
1•3,2•4-diheptanylidenesorbitol
1•3,2•4-di(3-nonyl-3-pentenylidene)sorbitol
1•3-cyclohexanecarbylidenesorbitol
1•3,2•4-dicyclohexanecarbylidenesorbitol
1•3,2•4-di(p-methylcyclohexanecarbylidene)sorbitol
Aromatic hydrocarbon groups and derivatives thereof
1•3-benzylidenesorbitol
1•3,2•4-dibenzylidene-D-sorbitol
1•3,2•4-di(m-methylbenzylidene)sorbitol
1•3,2•4-di(p-methylbenzylidene)sorbitol
1•3,2•4-di(p-hexylbenzylidene)sorbitol
1•3,2•4-di(1-naphthalenecarbylidene)sorbitol
1•3,2•4-di(phenylaceylidene)sorbitol
1•3,2•4-di(methylbenzylidene)sorbitol
1•3,2•4-di(ethylbenzylidene)sorbitol
1•3,2•4-di(propylbenzyledene)sorbitol
1•3,2•4-di(methoxybenzylidene)sorbitol
1•3,2•4-di(ethoxybenzylidene)sorbitol
1•3,2•4-di(p-methylbenzylidene)sorbitol
1•3,2•4-di(p-chlorobenzylidene)sorbitol
1•3,2•4-di(p-methoxydenylidene)sorbitol
1•3,2•4-di(alkyldenzylidene)sorbitol
1•3,2•4-di(methylbenzylidene)sorbitol aluminum benzoate, etc.

A suitable molecular weight distribution (weight average molecular weight/number average molecular weight) of the thermoplastic resin, such as polyolefin resin, polystyrene resin, polyamide resin and polyacetal resin, which are particularly preferable in view of the improvement of various properties by adding the above dibenzlidenesorbitol compound, is 1.1 to 30, preferably 1.3 to 20, more preferably 1.5 to 15, most preferably 1.7 to 10, in view of polymerizability, economical view point, and the balance between to ensure physical strength and to ensure moldability. Particularly, in the case of the polyolefin resin and polystyrene resin produced by using the high active polymerization catalyst of single site catalyst, such as metallocene catalyst, a suitable molecular weight distribution is 1.1 or more and 10 or less, preferably 8 or less, more preferably 6 or less, the most preferably 5 or less. It was found that the blending effect of the organic nucleating agent having a less molecular weight distribution is exhibited more effective. The molecular weight distribution is determined by the molecular weight measured by the GPC method. When the molecular weight distribution is less than 1.1, physical strength is very excellent, and in the case of injection-molded articles, dimensional accuracy is excellent. However, moldability is degraded, and polymerization is not easy. When the molecular weight distribution exceeds 30, matters opposite to the above occurs.

By incorporating the above di-substitute benzylidensorbitol compound, various excellent properties can be obtained, particularly in the case of injection molded articles. For example, packaging materials for a photographic photosensitive material excellent in physical strength, rigidity, rare bleeding out, odorless property, transparency, photographic properties, injection moldability, dimensional stability, and wear resistance etc. can be provided.

Although the reason why the di-substituted benzylidenesorbitol composition exhibits the above excellent effects is not clear, it can be considered that benzaldehyde, which is a raw material of conventional dibenzlidenesorbitol, and benzaldehyde derivatives such a p-substituted benzaldehyde which are raw materials of the dibenzylidene sorbitol derivative of the invention, have odor, and a trace amount thereof unavoidably remains in dibenzlidenesorbitol or its derivative after purification to cause foreign odor of clear or light-shielding polyolefin resin, and that a small amount of dibenzylidenesorbitol or its derivative is decomposed during molding the injection-molded article or the thermoplastic resin film to cause foreign odor.

Various organic nucleating agent may be used as a single material or combined with inorganic nucleating agent or with one or more other organic nucleating agent. The surface of organic and/or inorganic nucleating agent may be coated with various surface-coating materials, such as lubricant, e.g. fatty acid, fatty acid compound or silicone, coupling agent, plasticizer, dispersing agent such as surfactant, wetting agent or the like. Particularly preferable organic nucleating agents are dibenzylidenesorbitole compounds of which the surface is coated with at least one of a higher fatty acid, a higher fatty acid compound (preferably higher fatty acid metal salt) or plasticizer.

The inorganic nucleating agent usable in the invention includes clays, such as talc, clay, mica, montmorillonite and bentonite, inorganic salts, such as calcium silicate, magnesium silicate, calcium sulfate, barium sulfate, lithium carbonate, sodium carbonate, sodium hydrogen carbonate, potassioum hydrogen carbonate, calcium carbonate, magnesium carbonate, lithium hydroxide, sodium hydroxide, potassium hydroxide, calcium hydroxide, magnesium hydroxide and barium hydroxide, metal oxides, such as sodium oxide, calcium oxide, magnesium oxide, alumina, titanium oxide, iron oxide and zinc oxide.

A suitable blending amount of the organic and inorganic nucleating agents is 0.01 to 5 wt. % preferably 0.03 to 3.5 wt. %, more preferably 0.06 to 2 wt. %, the most preferably 0.1 to 1 wt. %. When the blending amount is less than 0.01 wt. %, the improvement in rigidity, heat resistance and hardness is insufficient. On the other hand, when the blending amount exceeds 5 wt. %, the improvement in rigidity, etc. by the excess amount is small.

In the case of the coextruded multilayer film, it is preferable to incorporate nonionic surfactant having antistatic effect and dripproof effect into one or more layers. A suitable content of the nonionic surfactant is 0.01 to 6 wt. %, preferably 0.05 to 3 wt. %. Thereby, it is possible to ensure antistatic ability, dripproofing, prevention of bleedout, and improvement in transparency and film moldability As the nonionic surfactant, there are polyoxyethylene alkyl other, polyoxyethylene alkylphenol ether, polyoxyethylene allylamine, N,N-bis-2-hydroxyethyl cocoamine, glycerine fatty acid ester, polyethylene glycol fatty acid ester, etc.

Furthermore it is preferable to add an antistatic agent in an amount which does not affect adversely photographic photosensitive materials, for molded articles composed of a thermoplastic resin liable to generate static marks on photographic photosensitive materials by electrification. Such an antistatic agent can be selected from those disclosed in "Compounding Ingredients; for Rubber and Plastics, Second Reversed Edition", pp 381–388, Rubber Digest Co., 1993, "Enlarged Edition Antistatic Agent-Surface Modification of Polymers", pp 64–104, 236–266, Saiwai Shobo, 1972, "Plastic Additives Data Collection, Chemical Industry, Separate Volume,"pp 117–158, Kagaku Kogyo, 1968.

Moreover to combine one or more of cationic surfactant, anionic surfactant and ampholytic surfactant with the non-ionic surfactant is particularly preferable because of exhibiting excellent properties It is preferable that inner surface layer of the coextruded multilayer film contains one or more of hydrotalcite compound and zeolite. A suitable content is 0.01 to 20 wt. %, preferably 0.05 to 15 wt. % as the total amount. Thereby, photographic properties, moisture conditioning and fungus proofing can be improved. Furthermore, degradation and adhesion trouble of gelatin layer which is the principal member of photographic photosensitive materials can be prevented.

As the antiblocking agent, there are silica including natural silica and synthetic silica, calcium carbonate, talc (magnesium silicate), aluminum silicate, calcium silicate, fatty acid amide lubricant, higher fatty acid polyvinyl ester, n-octadecylurea, N,N'-dioleyloxamide, N-ethanolstearic amide, dicarboxylic acid ester amide, etc., and silica is preferred. Preferable silica has a mean particle size of 0.3 to 20 $\mu$m, more preferable 0.5 to 15 $\mu$m. When the mean particle size is less than 0.3 $\mu$m, aggregation is liable to occur to generate lumps frequently, and antiblocking effect is small. When the mean particle size is more than 20 $\mu$m, the film surface is rough by exposing silica particles, and abrasion is liable to occur on the surface of photographic photosensitive materials. A suitable blending amount is 0.01 to 5 wt. %, preferably 0.05 to 3.5 wt. %, particularly preferably 0.1 to 2 wt. %. When the blending amount is less than 0,01 wt. % antiblocking effect is insufficient. When the blending amount exceeds 5 wt. %, not only lump-formed unevenness trouble occurs, but also physical strength and heat sealing properties of the resin film degrade.

As the fluorine-containing compound there are polytetrafluoroethylene resin, polytrifluorochloroethylene resin, tetrafluoroethylene-hexafluoropropylene copolymer resin, ethylene-tetrafluoroethylene copolymer resin, fluorovinylidene resin, fluoroethylene-propylene copolymer resin, tetrafluoroethylene-perfluoroalkyl vinyl ether copolymer resin, silicon fluoride, etc. A suitable content of the fluorine-containing compound is 0.01 to 30 wt. %.

It is preferable to add 0.01 to 2 wt. % of a hindered amine compound to respective layers, at least the outer surface layer, in order to prevent decrease of physical strength, degradation of sealability, discoloration or decoloration (in the case of containing light-shielding material), even using the packaging material for a photographic photosensitive material for a long period under the sunlight containing ultra violet rays. Examples of the hindered amine compound are 4-hydroxy-2,2,6,6-tetramethylpiperidine, poly {[6-morpholino-1,3,5-triazine-2,4-diyl][(2,2,6,6-tetramethyl-4-piperidyl)imino]hexamethylene[(2,2,6,6-tetramethyl-4-piperidyl)imino]}, poly{ethylene [(2,2,6,6-tetramethyl-4-piperidyl)imino]hexamethylene[(2,2,6,6-tetramethyl-4-piperidyl)imino]}, and dimethylsuccinate-2-(4-hydroxy-2,2,6,6-tetramethylpiperidyl)ethanol condensate, etc.

Representative examples of the packaging material for a photographic photosensitive materials of the invention are as follows:

1. Film Molded Articles:
Single layer film; Japanese Patent KOKOKU No. 2-2700, etc. FIG. 1

Coextruded multilayer films (FIGS. 2–6).

Figure 7:
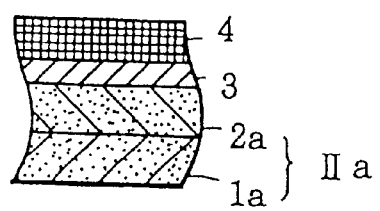
Figure 8:
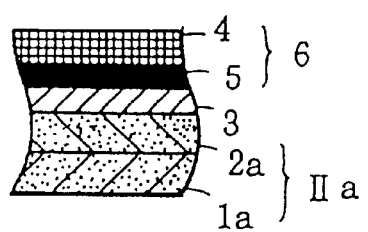
Figure 9:
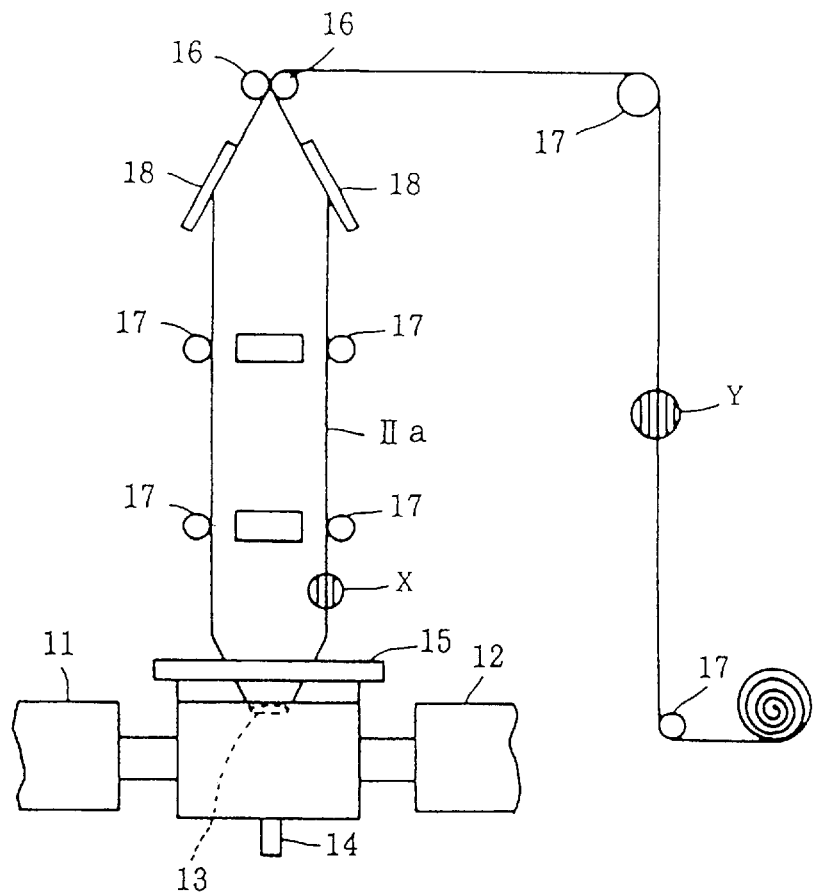
FIG. 9 is a schematic illustration of an apparatus of manufacturing a light-shielding film for a photographic photosensitive material embodying the invention.

Laminated films using a single layer film or a coextruded multilayer film: Japanese Patent KOKOKU Nos. 63-26697, 2-2701, 2-13774, 2-19225, etc. (FIGS. 7–9)

Packaging materials using the above flexible sheet of the single layer film, coextruded multilayer film or laminated film; packaging bags (unipack hag, single sheet flat bag, double sheet flat bag, single sheet gusset bag, double sheet gusset bag, etc.), shrink packaging, bulk packaging (Japanese Patent KOKAI No. 3-53243, Japanese Utility Model KOKAI No. 3-71346, etc.), assembly packaging, and the like and package for lightroom loading of a band form photosensitive material Japanese Utility Model KOKAI Nos. 55-113543, 60-13386, 60-167796, 2-72347, 3-47547, 3-54937, 3-86358, 3-96648, etc.

Injection-Molded Articles: Cartridges for photographic disc films, spools for a photographic film, photographic film units with a lens, containers for a photographic film cartridge, light-shielding containers, cartridges for a photographic film made of plastic, light-shielding magazines for light room loading of sheets or a roll of photographic photosensitive material, cores, photographic film cartridges, packs for an instant film, processing equipment of photographic photosensitive materials, etc.

Cartridge for disc film: Japanese Utility Model KOKAI No. 60-21743, etc.

Photographic film unit with lens: Japanese Patent KOKAI No. 63-226643, 6-11798, Japanese patent KOKOKU No. 2-32615, Japanese Utility Model KOKOKU No. 5-2919, etc.

Spool for photographic film: Japanese patent KOKAI Nos. 1-251030, 57-196218, 59-15049, 58-203436, 58-82237, 58-82236, 62-240957, 4-335638, Japanese Utility Model KOKAI Nos. 63-73742, 54-120931, 58-178139-178145, 63-73742, Japanese Utility Model KOKOKU Nos. 55-31541, 44-16777, U.S. Pat. No. 1,930,144, GB 2199805A (FIG. 13) Cartridge for photographic film made of resin (e.g. cartridge for new photographic film system (APS)): Japanese Patent KOKAI Nos. 54-111822, 50-33831, 56-87039, 1-312538, 57-190948, Japanese Patent KOKOKU Nos. 45-6991, 55-21089, Japanese Utility Model KOKAI No. 55-97738, U.S. Pat. No. 4,846, 418, U.S. Pat. No. 4,848,693, U.S. Pat. No. 4,887,776, etc.

Container for photographic film cartridge: Japanese Patent KOKAI Nos. 61-250639, 61-73947, 63-121047, 62-291639, Japanese Utility Model KOKAI Nos. 60-163451, 1-88940, 1-113235, 1-152337, Japanese Utility Model KOKOKU Nos. 2-33236, 3-48581, Japanese Patent KOKOKU No.2-38939, U.S. Pat. No. 4,801,011, U.S. Pat. No. 4,979,351, EP 02370562A2, EP 0280065A1, EP 0298375A2, etc.

Core, Reel: Japanese Utility Model KOKAI No. 60 107848, U.S. Pat. No. 4,809,923, GB 2,033,873 B, etc.

Magazine for sheet films: Japanese Utility Model KOKA1 No. 56-5141, etc.

Photographic film cartridge: Japanese Patent KOKAI No.1-312537, Japanese Utility Model KOKAI Nos. 2-24846. 2-29041, 60-120448, Japanese Utility Model KOKOKU No. 56-16610, etc.

Photographic film case: Japanese Utility Model KOKAI No. 54-100617, 64-32343, 1-94258, 2-56139, Japanese Patent KOKOKU No. 2-54934, U.S. Pat. No. 4,779,756, EP 0242905A1, etc.

Pack for instant film; Japanese Utility Model KOKAI No. 61-41248, Japanese Patent KOKAI No.62-240961, etc.

Holder for sheets of photographic film U.S. Pat. No. 4,725, 865, U.S. Pat. No. 4,821,055, Japanese Patent KOKAI Nos. 5-341378, 5 -341379, 5-341380, 5-341381, 6-75291, 6-75292, 6-75293, etc.

The resin composition of the invention is particularly preferable for camera bodies, camera member s (internal rail, pushing plate, film passage, guide members, cap member, film cartridge. etc.), film units with a leas, spools for photographic film, processing equipment of photographic photosensitive materials, holders for sheets of photographic film, cartridges for photographic film made of resin (cartridges for APS, etc), which are used under severe conditions for a long period and are contacted directly with photographic photosensitive material (representative examples are disclosed in U.S. Pat. No. 4,725,865, U.S. Pat. No. 4,821,055, Japanese Patent KOKAI Nos. 2-272538, 4-251841, 7-5635, 7-20613, 8-146561, 8-146562, 8-227123, 8-254795, 8-262559, 8-262560, 8-272046, 8-278603, 9-34064, 9-61930, etc.

Examples of the use of the coextruded multilayer film:

① Moistureproof sealing bag for packaging a film unit with a lens: Clear, colored or with print (FIG. 15 of Japanese Patent KOKAI No. 8-254793, etc.)

② Moistureproof sealing bag for assembly packaging 2 or more of photographic films (JIS 135 film, APS film, microfilm, etc.) put in a plastic container: Clear, colored or with print (FIGS. 16–18 of Japanese Patent KOKAI No. 8-254793, etc.)

③ Moistureproof•sealing•light-shielding bag for sheet-shaped photographic photosensitive materials, such as photographic papers, films for printing, cut films for photographing, X-ray films, PS plates, etc. (FIGS. 2–3 of Japanese Patent KOKAI No. 8-254793, FIG. 1 of Japanese Patent KOKAI No. 5-5972, etc.)

④ Light-shielding film for a package of a photographic photosensitive web material (Japanese Patent KOKAI Nos. 2-72347, 6-214350, Japanese Utility Model KOKOKU Nos. 7-50743, 6-8583, 8-10812, etc.)

⑤ Moistureproof•sealing•light-shielding bag for a roll of photographic photosensitive material, such as printing paper, movie film, positive microfilm film for printing or heat development diffusion transfer paper (Japanese Patent KOKAI No. 6-67358)

⑥ Moistureproof•light-shielding film for packaging bulk roll of photographic photosensitive material.

The method of forming the packaging material for a photographic photosensitive material may be selected from inflation film molding, extrusion laminating, injection molding, injection blow molding, vacuum molding, vacuum pressure forming, press molding, sheet forming, T die flat film molding, pressure forming, rotational molding, inter-mold vacuum injection molding and the like, according to the form of each article to be molded.

The packaging material of the invention may be a pair of a coextruded multilayer inflation film of which the innermost layers are joined by blocking. The blocking is achieved by pressing in a manufacturing process of inflation film without using an adhesive or heating. As the pressing wears, a nip roll composed of an elastic roll, such as a rubber roll or a cotton roll, and a metal roll. The outermost layers contains a polyolefin copolymer resin manufactured by using the single site catalyst in an amount of 20 wt. % or more, preferably 40 wt. % or more, more preferably 50 wt. % or more, particularly preferably 70 wt. % or more, the most preferably 90 wt. % or more.

It is preferable to form a packaging material for a photographic photosensitive material having a halogen content of 60 ppm or less, preferably 50 ppm or less, more preferably 40 ppm or less the most preferably 30 ppm or less and 4 ppm or more, by using a thermoplastic resin composition containing 50 wt. % or more of a halogen component-containing thermoplastic resin manufactured by using a catalyst of which transition metal component and/or organic metal component contain halogen component as a principal component, heating at a temperature of 60° C. or more, prerably 70° C. or more, particularly preferably 80° C. or more for 1 hour or more, and then, being melted to mold at a temperature of 150° C. or more, preferably 160° C. or more, more preferably 170° C. or more, the most preferably 180° C. or more.

By the constitution, rusting of mold and molding machine can be prevented, and adverse effects on photographic properties can be removed Moreover, in the case of film molded articles, thickness variation, longitudinal streaks, lumps and foaming troubles are sharply decreased. In the case of injection molded articles, dimensional stability and appearance are improved, and short shot and weldlines are decreased.

It is also preferable to form a packaging material for a photographic photosensitive material by using a metal component-containing thermoplastic resin manufactured by using a catalyst of which the principal components are transition metal component and organic metal component, extracting catalyst residues by using a catalyst deactivator to decrease the residual halogen component content of the metal component-containing thermoplastic resin to 60 ppm or less, preferably 50 ppm or less, more preferably 40 ppm or less, the most preferably 30 ppm or less and 4 ppm or more, and then, being melted to mold at a temperature of 150° C. or more, preferably 160° C. or more, more preferably 170° C. or more, the most preferably 180° C. or more.

In the above molding method of the molded articles for a photographic material, heating to melt up to 150° C. or more is preferably carried out twice or more. By the repeating, residual halogen component content of the molded article can be made 60 ppm or less.

By the constitution, rusting of a mold and an molding machine is prevented, and adverse effects on photographic properties are removed. In the case of film molded articles, thickness variation, longitudinal streaks, lumps and foaming troubles are sharply decreased. In the case of injection molded articles, dimensional stability and appearance are improved, and short shot and weldlines are decreased.

Figure 18:
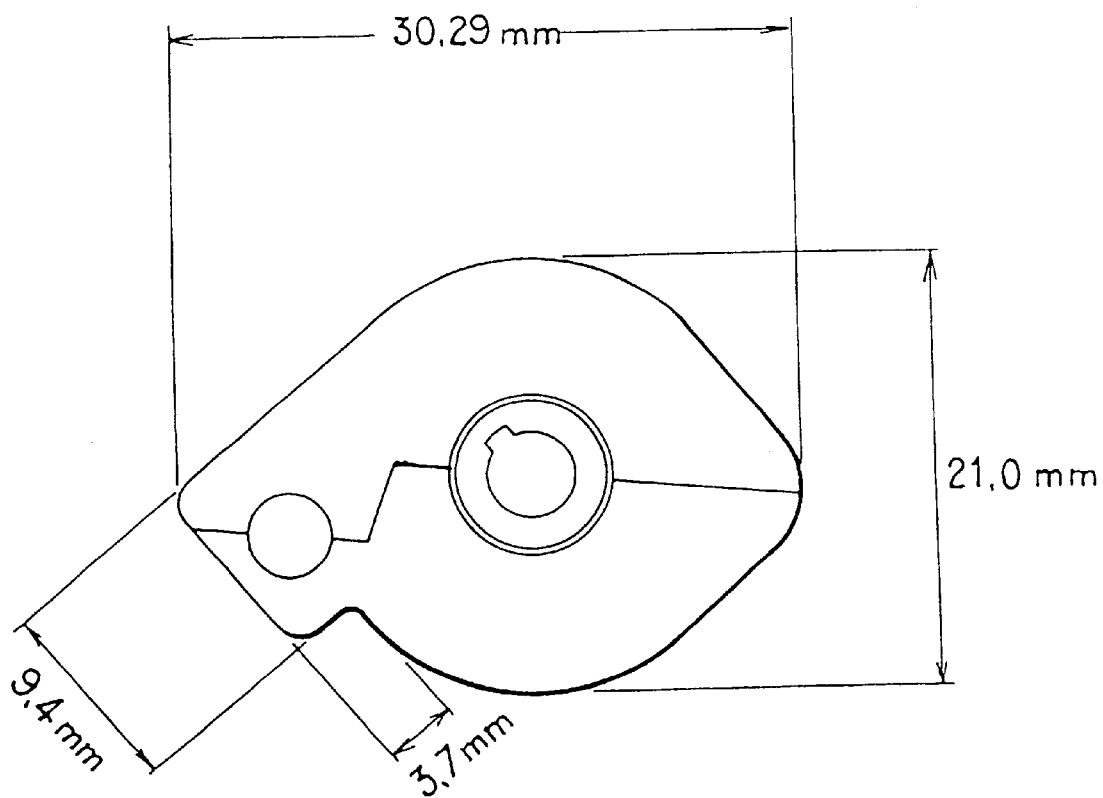
FIG. 18 is a side view.

As a method of molding the packaging material for a photographic photosensitive material of the invention, for example, the cartridge for APS shown in FIG. 18, which is an injection molded article made of noncrystalline rubber-containing polystyrene resin as the principal component, is molded by charging a resin composition containing rubber-containing polystyrene resin as the principal component heated to 150° C. or more into a mold of which the wall temperature of the core/cavity portion is 70 to 200° C., and then taking out the injection molded articles when the wall temperature of the core/cavity portion is lower than the glass transition temperature of the styrene resin portion of the resin composition.

In an another example of injection molding the packaging material for a photographic photosensitive material of the invention using a polystyrene-based resin, the w-all temperature of the core/cavity portion is made 70 to 200° C., and then, a melted rubber-containing polystyrene resin at 150° C. or more is injected. When the mold wall temperature is lower than 70° C., short shot and weldlines tend to occur due to inferiority of resin fluidity. The impact strength of injection molded articles is also degraded. When the wall temperature exceeds 200° C., molding cycle is lengthened due to extension of cooling time. Thermal deterioration of resin increases to generate materials adversely affecting photographic properties of photographic photosensitive materials, lumps, fouling of mold surface, etc. which render long period continuous injection molding difficult.

A suitable wall temperature of the core/cavity portion for taking out the injection molded articles for a photographic photosensitive material is the glass transition temperature of rubber-containing polystyrene resin or lower, preferably 70° C. or less, more preferably 60° C. or less, the most preferably 50° C. or less. When the molded articles are taken out at a temperature higher than the glass transition temperature, deformation of the molded articles occur, and dimensional stability is degraded.

The packaging material for a photographic photosensitive material is, in common, manufactured from resin pellets. The shape of the pellet is preferably selected from one or two of shere, oval, circular column, square column, plate, square, and rectangle, for the purpose of ensuring uniform melting ability of resin pellets (effective for the prevention of lump generation) and uniform mixing of two or more resins (e.g. masterbatch and resin for dilution). Particularly preferable shapes are shere, oval and circular column in view of the pneumatic transportation of pellets and the prevention of fine powder generation. A suitable diameter or side length of the pellet is 0.5 to 10 mm, preferably 1 to 8 mm, more preferably 2 to 7 mm, the most preferably 3 to 6 mm. The volume of pellet is preferably almost equal in order to ensure uniform melting ability, and the difference in the volume must be within three times.

The packaging material for a photographic photosensitive material of the invention may be provided with letters and marks which are required on the functional viewpoint such as CAS codes (camera automatic detection code), bar code, CI mark, trade name, instructions discrimination marks for goods, colors for discriminating goods, or with print in order to improve the value as commercial goods. Moreover, a shrinkable film at least stretched in longitudinal direction or label is adhered or attached by thermal shrinking to the package of a photographic photosensitive material. The ink used for printing them can be selected from harmless inks to photographic photosensitive materials among conventional inks for offset printing, inks for gravure printing or UV inks.

Representative synthetic resins used for the inks are vinyl chloride copolymer resins, vinyl-amino resin, alkyd-vinyl resin, oil-free alkyd resin, vinyl chloride-vinyl acetate copolymer resins, nitrocellulose, polyester, polyamide-urethane resin, polyacrylic resin, rosin-modified maleic acid resin, ethylene-vinyl acetate resins vinyl ether resin, urethane vinyl acetate resin, vinylchloride-vinylacetate copolymer urethane resin, modified alkyd resin, modified phenol resin, high molecular weight polyester-amino resin, low molecular weight polyester-amino resin, alkali-soluble resins (rosin-modified maleic acid resin, styrene-maleic acid resin, styrene-acrylic acid resin, acrylate ester-acrylic acid resin, methacrylate ester-acrylic acid resin), hydrosol type resins (styrene-maleic acid resin, styrene-acrylic acid resin, α-methylstyrene-acrylic acid resin, acrylate ester-acrylic acid resin, methacrylate ester-acrylic acid resin), emulsion type resins (styrene resin, styrene-acrylate ester resin, acrylate ester copolymer resins, methacylate ester copolymer resin so, and the like. As the resins used for UV ink, polymers having acrylic unsaturated groups are, in general, used, and representative examples are polyester/acrylate ester, polyester/urethane resin/acrylate ester, epoxy resin/acrylate ester, pentaerythritol triacrylate, trimethylol propane triacrylate, hexanediol diacrylate, neopentylglycol diacrylate, triethylene glycol diacrylate, hydroxyethyl methacrylate, etc.

The film thickness of UV ink affects photographic photosensitive materials, such as fogging, abnormal sensitivity or abnormal coloring, and a suitable thickness is 0.1 to 10 $\mu$m, preferably 0.5 to 8 $\mu$m, particularly preferably 1 to 5 $\mu$m. In order to improve adhesive strength to the molded article, it is preferable to provide anchor coating or corona discharge onto the surface of the molded article or heating the surface of the molded article at 40° C. or more, preferably 50° C. or more, prior to printing.

Coloring pigments generally known are used for the above inks. The coloring pigments its include various pigments disclosed in Japanese Patent KOKAI No. 63-44653, Japanese Patent KOHYO 1-502758, etc., azo pigments, (Azo Lake, Carmine 6B, Red 2B, insoluble azo pigments, Monoazo Yellow (PY-1,-3), Disazo Yellow (PY-12,-13,-14,-17,-83), Pyrazolo Orange (PO-B-34), Vulcan Orange (PO-16), condensed azo pigments, Chromophthal Yellow (PY-93,-95), Chromophthal Red (PR-144,-166)), polycyclic pigments (phthalocyanine pigments, Copper Phthalocyanine Blue (PB-15,-15•1,-15•3), Copper Phthalocyanine Green (PG-7)), dioxazine pigments (Dioxazine Violet (PV-23)), isoindolinone pigments (Isoindolinone Yellow (PY-109,-110)), durene pigments, perillene, perinone, flavanthrone, thoindigo, lake pigments, (Malachite Green, Rhodamine B, Rhodamine G, Victoria Blue B), inorganic pigments, such as oxides (titanium dioxide, red iron oxide), sulfates (precipitated barium sulfate), carbonates (precipitated calcium carbonate), silicates (hydrous silicates, anhydrous silicates,), metal powders (aluminum powder, bronze powder, zinc powder), carbon black, lead yellow, Ultramarine blue, Berlin blue, and the like. In addition, oil-soluble dyes, disperse dyes, and the like are also usable. Representative dyes are roughly divided into azo dyes, anthraquinone dyes, indigo dyes, phthalocyanine dyes, carbonyl dyes, etc. Other raw materials composing the ink which are optional are various solvent, dispersing agent, wetting agent, antifoamer, leveling agent, thickener, stabilizer, crosslinking agent wax and the like.

It is also preferable that the above synthetic resins and coloring pigments used as ink compositions are applied as paint onto the surface of the molded article for the purpose of the improvement in commercial values as goods, wear resistance, light-shielding ability, photographic properties and the like. Various paints for forming coating layer may be coated as the base coating or the top coating in order to improve the value as commercial goods, to made the print of the printing ink fine and sharp. The resin and pigment for the paint may be selected from the aforementioned ones for printing ink, and UV paints, melamine alkyd paints, urethane paints and melamine paints are preferable. As the top coating, it is preferable to coat a clear lacquer, a silicone paint, an urethane paint or an acrylic lacquer paint in a thickness of 0.1 to 30 $\mu$m preferably 0.3 to 20 $\mu$m, particularly preferably 0.5 to 10 $\mu$m.

The packaging material for a photographic photosensitive material of the invention is applicable to the following photosensitive materials.

Silver halide photographic photosensitive materials: films for printing, color and monochromatic photographic papers, color and monochromatic negative films, master papers for printing, DTR (diffusion transfer process) photosensitive materials, films and papers for computerized type-setting system, color and monochromatic positive films, color reversal films, microfilms, films for movie, self-developing type photographic photosensitive materials, direct positive films and papers, etc.

Heat developing photosensitive materials: heat developing color photosensitive materials, heat developing monorhromatic photosensitive materials, e.g. disclosed in Japanese Patent KOKOKU Nos. 43A4921, 43-4924, "Shashinkogaku-no Kiso (Fundamentals of Photographic Engineering), Vol. Silver Salt Photograph", pp 553–555, Corona, 1979, "Research Disclosure", pp 9–15 (RD-17029), June, 1978, transfer-type heat developing color photosensitive materials disclosed in Japanese Patent KOKAI Nos. 59-12431, 60-2950, 61-52343, U.S. Pat. No. 4,584,267, multicolor heat sensitive recording materials using a diazo compound, e.g. disclosed in Japanese Patent KOKAI Nos. 59-190886, 61-40192, 61-40193, 3-288688, 4-28588, etc.

Photosensitive heatsensitive recording materials: recording materials using photothermography (photosensitive heat-sensitive image forming method) disclosed in Japanese Patent KOKAI No 3-72358.

Diazonium photographic photosensitive materials: 4-morpholinobenzene diazonium microfilms, microfilms, copying films, form plates for printing, etc.

Azide, diazide photographic photosensitive materials: photosensitive materials containing paraazidobenzoate, 4,4'-diazidostilbene, etc., such as copying films and form plates for pringing etc.

Quinone diazide photographic photosensitive materials: photosensitive materials containing ortho-quinone diazide compounds or ortho-naphthoquinone diazido compounds such as benzoquinone-(1,2)-diazido-(2)-4-sulfonic acid phenyl ether, such as form plates for printing, copying films and contact printing film, etc.

Photo polymers: photosensitive materials, form plates for printing, contact printing films, containing vinyl compound monomer, etc.

Polyvinyl cinnamate esters: printing films, photoresists for IC, etc.

Moreover, the packaging materials of the invention is also applicable to photographic developing agent, photographic fixing agent, and the like photosensitive materials degraded or denatured by light, oxygen, sulfur dioxide gas or the like.

A package made by using the packaging material for a photographic photosensitive material of the invention is preferably a seal package having a moisture permeability (JIS Z 0208, conditions B) of 10 g/m$^2$·24 hours or less, preferably 5 g/m$^2$·24 hours or less, particularly preferably 2 g/m$^2$·24 hours or less, and an oxygen permeability (Mocon method) of 50 cc/m$^2$·24 hours·1 atm·20° C. or less, preferably 35 cc/m$^2$·24 hours 1 atm·20° C. or less, particularly preferably 20 cc/m$^2$·24 hours·1 atm·20° C. or less, in order to keep photographic properties of the photographic photosensitive material packaged therein good condition for a long period (6 months or more).

When the moisture permeability exceeds 10 g/m$^2$·24 hours, photographic properties of photographic photosensitive materials containing photosensitive dyes, couplers, dyes for antihalation and various additives, which are degraded by moisture, cannot be kept good conditions for a long period (6 months or more). Furthermore, in the case of photographic photosensitive materials having a gelatin layer which is liable to be blocked by moistening on one or both sides of a support, blocking is liable to occur.

When the oxygen permeability exceeds 50 cc/m$^2$·24 hours ·1 atm·20° C., photosensitive dyes, dyes for antihalation, couplers and other additives, which are degraded by oxygen, in an emulsion coating layer of photographic photosensitive materials are degraded. Particularly, color photographic photosensitive materials (negative films, positive films, photographic papers, reversal films, autopositive films, instant films, etc.) are rendered impractical.

It is preferable to package a photographic photosensitive material together with a halogen component absorber by using the packaging material of the invention in a sealed moistureproof state. The halogen component absorber is inorganic lead salt stabilizer, fatty acid metal salt, liquid stabilizer (barium-cadmium based, barium-based, zinc-based, etc.), organic tin stabilizer, organic phosphorous acid compound, etc. Particularly, fatty acid metal salt, organic tin stabilizer and organic phosphorous acid compound are preferable, and organic tin compound stabilizer is the most preferable. A suitable blending amount is 0.01 to 5 wt. %, preferably 0.05 to 3 wt. % of the molded article.

A suitable formaldehyde component content of the molded article measured by the acetylacetone method of the package of the photographic photosensitive material is 500 ppm or less, preferably 300 ppm or less, more preferably 150 ppm, the most preferably 75 ppm or less, in order to maintain photographic properties in good conditions. It is preferable to use a thermoplastic resin which has been sterilized or added with 0.001 to 1 wt. % of fungicide disclosed from page 6, left lower column, line 8 to page 8, left lower column, line 6 of Japanese Patent KOKAI No. 4-149542, in order to prevent the generation of fungi on a photographic photosensitive material containing gelatin as a principal component and on the packaging material during storing for 6 months or more.

The packaging material for a photographic photosensitive material of the invention can be used as moistureproof packaging material in a form of packaging bag, shrinkable package, overwrapping, etc. As such a packaging material, there are single layer thermoplastic resin films, laminate films comprising of the thermoplastic resin film of the invention and a flexible sheet (paper, cellophane, metal foil, thermoplastic rein film, nonwoven fabric, synthetic paper, inorganic material deposited film of silicon oxide (SiOx), e.g. silicon monoxide (SiO), silica or the like, metal deposited film or paper of aluminum oxide, aluminum or the like) laminated through an adhesive layer, coextruded multilayer films consisting of two or more thermoplastic resin layers, laminate films consisting of a coextruded multilayer inflation film which is deflated to join the inner surfaces faced each other. The thermoplastic resin film of the invention and flexible sheet may be unstretched, uniaxially stretched or biaxially stretched.

In the case of packaging a high speed photographic photosensitive material having an ISO photographic speed of 100 or more, the moisture permeability (JIS Z 0208, condition B) of the moistureproof packaging material is 5 g/m$^2$·24 hours, preferably 3 g/m$^2$·24 hours, more preferably 1.5 g/m$^2$·24 hours. When the moisture permeability exceeds 5 g/m$^2$·24 hours, the photosensitive layer, protection layer and back layer of a photographic photosensitive material containing a hydrophilic polymer of gelatin becomes adhesive by absorbing moisture. As a result, adhesion trouble occurs, and adverse effects on photographic properties also occur, such as the reduction of sensitivity and the increase of fog due to the degradation of various dyes in the photosensitive layer. Particularly, in the case of high speed (ISO photographic speed of 100 or more) photographic photosensitive materials, the above troubles tend to occur, and accordingly, to ensure moistureproofness is important.

Some packaging materials for a photographic photosensitive material embodying the invention are illustrated in drawings.

FIGS. 1 through 4 illustrate packaging films for a photographic photosensitive material which belong to the packaging material for a photographic photosensitive material of the invention.

The packaging film for a photographic photosensitive material of FIG. 1 is a single layer film consisting of a light-shielding thermoplastic resin film layer 1a.

Figure 2:
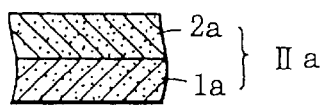

The packaging film for a photographic photosensitive material of FIG. 2 is a coextruded double layer film IIa consisting of a light-shielding thermoplastic resin film layer 1a as the packaging material for a photographic photosensitive material of the invention and a thermoplastic resin film layer 2a containing a light-shielding material.

Figure 3:
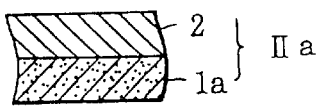

The packaging film for a photographic photosensitive material of FIG. 3 is the same as the film of FIG. 2, except that the thermoplastic resin film layer 2 does not contain a light-shielding material.

Figure 4:
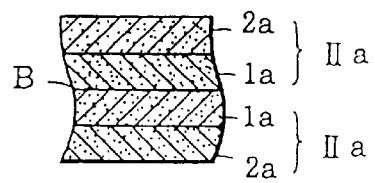

The packaging film for a photographic photosensitive material of FIG. 4 is a laminated film consisting of two coextruded double layer films IIa of FIG. 2 joined by blocking B between the light-shielding thermoplastic resin film layers 1a, 1a.

Figure 5:
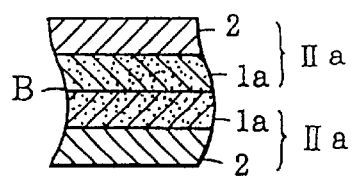

The packaging film for a photographic photosensitive material of FIG. 5 is a laminated film consisting of two coextruded double layer films IIa of FIG. 3 joined by blocking B between the light-shielding thermoplastic resin film layers 1a, 1a.

Figure 6:
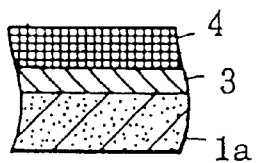

The packaging film for a photographic photosensitive material of FIG. 6 is a laminated film consisting of the above light-shielding thermoplastic resin film layer 1a and a flexible sheet layer 4 laminated through an adhesive layer 3.

The packaging film for a photographic photosensitive material of FIG. 7 is a laminated film consisting of the above coextruded double layer film IIa of FIG. 2 and a flexible sheet 4 laminated on the thermoplastic resin film layer 2a through an adhesive layer 3.

The packaging film for a photographic photosensitive material of FIG. 8 is the same as the film of FIG. 7, except that the flexile sheet 4 is a metallized flexible sheet 6 having a metal membrane 5 located on the side of the adhesive layer 3.

The laminated film of FIG. 4 is manufactured as shown in FIG. 9.

Figure 10:
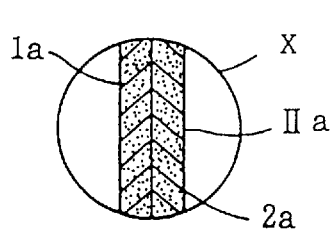
FIG. 10 is an enlarged section at part a of FIG. 9.
Figure 11:
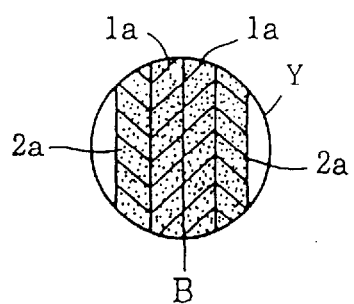
FIG. 11 is an enlarged section at part b of FIG. 9.

The resin for the light-shielding thermoplastic resin film layer 1a is charged in the extruder 11 and the resin for the thermoplastic resin film layer 2a is charged in the extruder 12, and then heated to be melted. The molten resin for the light-shielding thermoplastic resin film layer 1a is extruded from the inside slit of the ring die 13, and the molten resin for the thermoplastic resin film layer 2a is extruded from the out side slit to from the coextruded double layer film IIa. The tubular film IIa is inflated by blowing compressed air from the blast pipe 14, and cooled by the cooling air blown from the air ring 15. An enlarged section of the coextruded double layer film IIa at the position X is shown in FIG. 10.

The coextruded double layer tubular film IIa is drawn to ascend by a pair of squeeze roll (also called nip roll or pinch roll, in general, a combination of a heat-resistant elastic roll and a metal roll), and guided by the side roll 17 and guide plate 18. Then, the tubular film IIa is deflated and pressed by the squeeze roll 16. At that time, the inner layer 1a of the coextruded double layer inflation film 9a is joined by blocking B as shown in circle Y. The laminated film further travels with guiding by the guide rollers 17, 17 and is wound into a roll.

Figure 12:
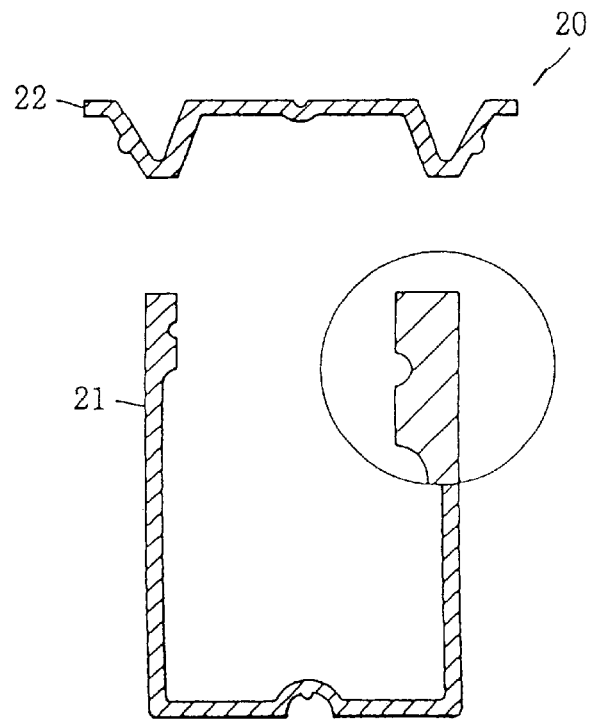
FIG. 12 is a sectional view of a container for a photographic film embodying the invention.

The container 20 for a photographic film cartridge of FIG. 12 consists of a container body 21 and a cap 22. Both of the container body 21 and the cap 22 are the packaging material of the invention.

Figure 13:
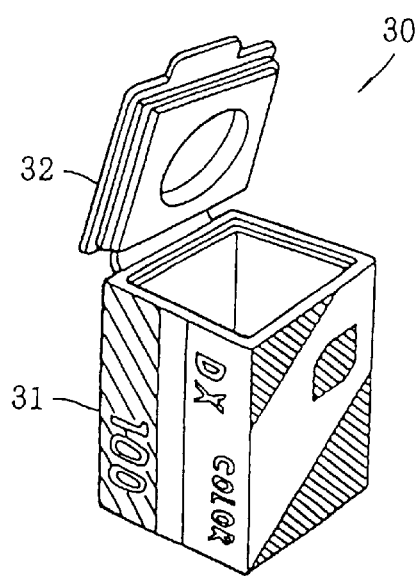
FIG. 13 is a perspective view of a cap-body integrated type square container for a photographic film embodying the invention.

The container 30 for a photographic film cartridge of FIG. 13, which is the packaging material of the invention, is a cap-body integrated type consisting of a container body 31 portion and a cap 32 portion, and is formed of the light-shielding thermoplastic resin composition of the invention.

Figure 14:
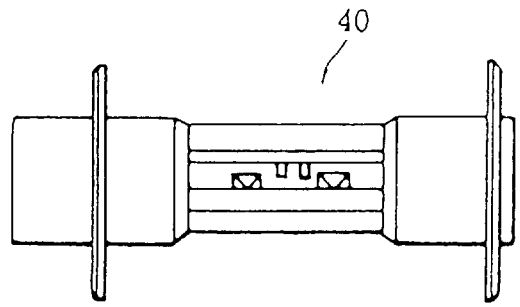
FIG. 14 is a front view of a photographic film spool embodying the invention.

FIG. 14 illustrates a spool 40 for a photographic film which is the packaging material of the invention, the whole body of the spool is formed of the light-shielding thermoplastic resin composition of the invention.

Figure 15:
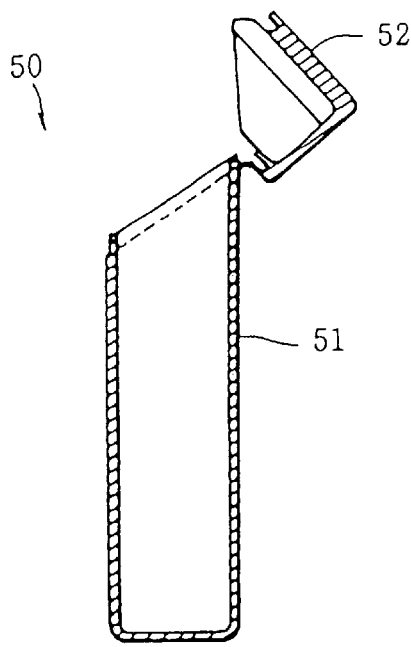
FIG. 15 is a sectional view of a cap-body integrated type photographic film square case embodying the invention.

FIG. 15 illustrates a cap-body integrated type light-shielding case. 50 for a photographic film which is the packaging material of the invention, consisting of a container body 51 portion and a cap 52 portion.

Figure 16:
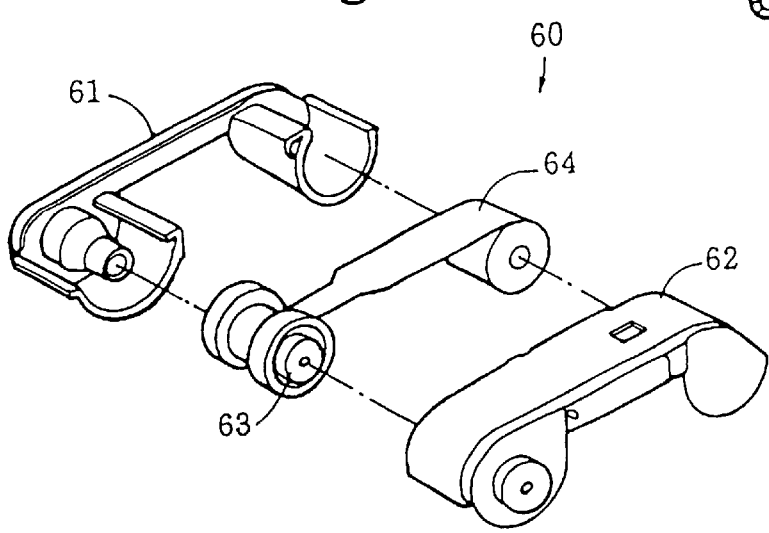
FIG. 16 is an exploded perspective view of a photographic film cartridge embodying the invention.
Figure 17:
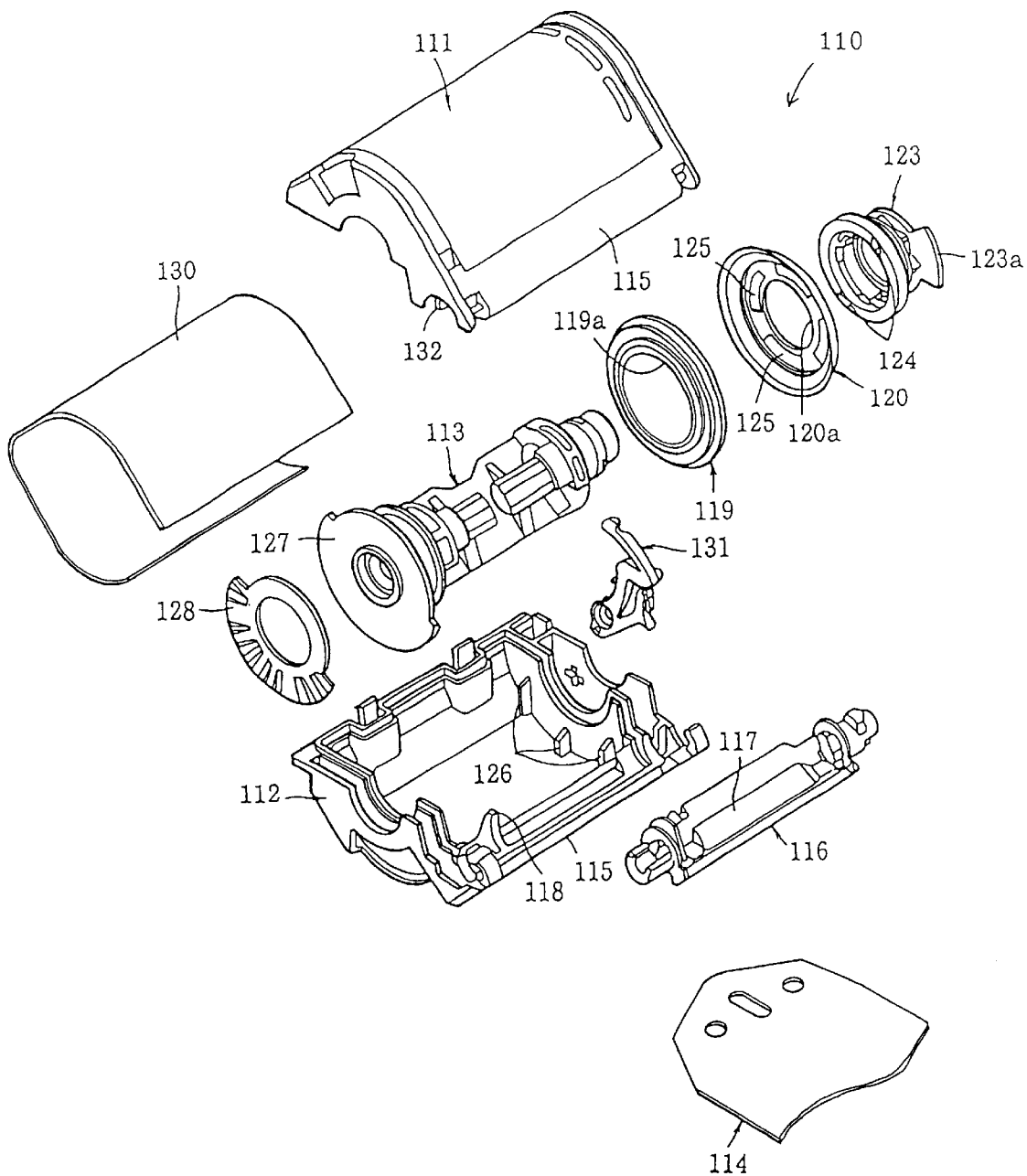
FIG. 17 is an exploded perspective view of a photographic film cartridge made of resin embodying the invention.

FIG. 16 illustrates an exploded state of a photographic film cartridge 60, which is the packaging material of the invention, consisting of a lower casing 61, an upper casing 62 and a spool 63 loaded therein, and the lower casing 61 and the upper casing 62 are formed of the light-shielding thermoplastic resin composition of the invention. Numeral 64 indicates a light-shielding paper.

A photographic film cartridge which uses the packaging material for a photographic photosensitive material of the invention is illustrated in FIGS. 17 to 20. The cartridge body 110 is composed of an upper casing 111 and a lower casing 112. A spool 113 is ratatably placed in the container body 110, and a photographic film 114 is wound around the spool 113.

The upper casing 111 and the lower casing 112 have almost a half cylindrical form, and a port portion 115 is projected, respectively. A light-shielding cap 116 is rotatably embedded in the port portion 115 upon fitting the upper casing 111 to the lower casing 112. The light-shielding cap 116 has a flat film passage 117 which passes the photographic film 114 delivered from the inside of the cartridge body 110 upon turning the light-shielding cap 116 at the opening position. Upon turning the light-shielding cap 116 at the closing position, the opening (exit of photographic film) formed on the top of the port portion 115 is closed completely, and the inside of the cartridge body 110 becomes in a light-shielding state.

A projection 118 is formed on the back of the port portion 115 of the lower casing 112. The projection 118 is a guide for scooping to lead the leading end of the photographic film wound around the spool 113 toward the film passage 117.

Discs 119, 120 provided with an opening 119a, 120a arc rotatably fitted into a prescribed portion of the spool 113 by inserting the spool 113 into each opening 119a, 120a. Lips 121 are formed so as to face each other on the periphery of the discs 119, 120, and embrace partly the outermost periphery of the photographic film 114 wound around the spool 113 from both end portions.

A use indicator 123 is fitted into the spool 113. The clutch claw 124 engages the engaging hole 125 of the disc 120 upon rotating the spool 113 in he direction of delivering the film, and the disc 120 is forced to be rotated. When the spool 113 is rotated in the direction of winding the film, the clutch claw 124 does not engage the engaging hole 125 of the disc 120. As a result, the disc 120 is freely rotatable. The other disc 119 is Sways freely rotatable against the spool 113. A sector-shaped indicator plate 123a is integrated with the use indicator 123, and service conditions of the photographic film cartridge can be seen by confirming the position of the indicator plate 123a through the indication window provided on the cartridge body 110.

A side rib 126 is formed on the side inner wall of the upper casing 111 and the lower casing 112, and restricts so as not to broaden the space between the discs 119, 120. A sector-shaped plate 127 is fixed to the spool 113, and a data flange label 128 is stuck on the surface of the plate 127. Bar code is printed radially on the label 128, and the bar code is detected by a photoelectric means through the window 129 formed on a side of the cartridge body 110 upon rotating the spool 113. Thereby, information of the type of the photographic film 114 loaded in the cartridge body 110, the number of photographs already taken, etc. can be detected electrically. The type of photographic film, a proper number of the cartridge and the like are indicated on the label 130 attached to the cartridge body.

The spool lock member 131 locks the spool 113 so as not to rotate, when the light-shielding cap 116 is turned to the closing position. The locking is released upon moving the light-shielding cap 116 to the opening position. The numeral 132 indicates a lock pole 132 integrally formed on the upper casing 111, and the light-shielding cap 116 is locked by the lock pole 132 upon turning to the closing position. The locking is released by the release mechanism of the light-shielding cap 116 provided on an apparatus, such as a camera or a display apparatus, upon loading the photographic film cartridge into the apparatus. It is also possible to keep the inside of the cartridge body 110 in a light-shielding state by forming a film passage on the inner wall of the port portion 115 and attaching a plush to the film passage, instead of using the light-shielding cap 116.

Figure 19:
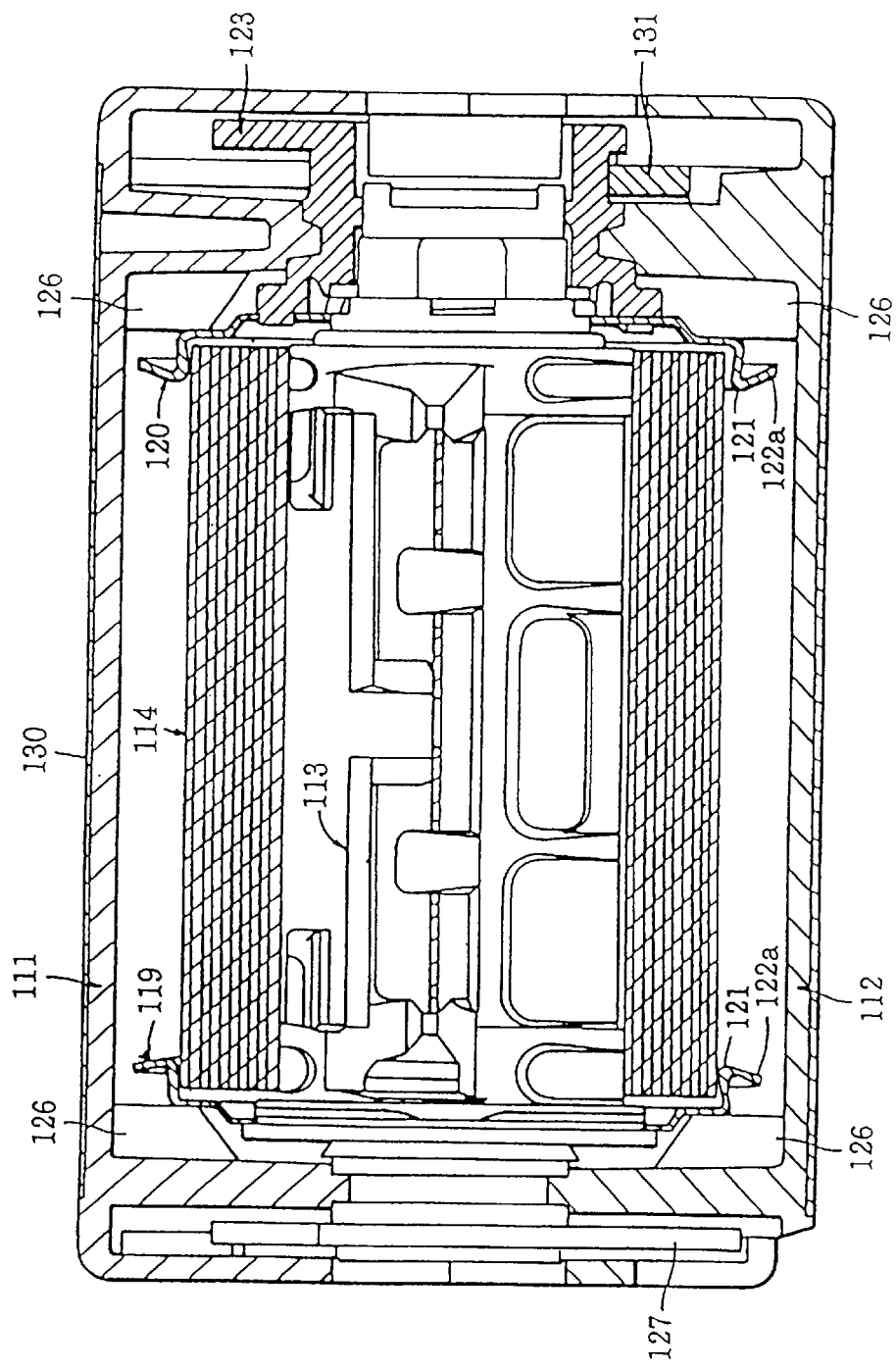
FIG. 19 is a sectional view thereof.

As shown in FIG. 19, in the state of being wound the photographic film 114 into the cartridge body 110 entirely, the outermost peripheries of the photographic film are party embraced by the lips 121, 121 of the discs 119, 120, and loosening of the wound film from the spool is inhibited. Thereby, when the spool 113 rotates in the direction of delivering the photographic film 114, the photographic film 114 rotates together with the spool 113.

Although the side ribs 126 provided on the side inner wall of the upper and lower casing 111, 112 restrict the discs 119, 120 so as not to broaden the space therebeween, the space between the side ribs 126 faced each other is broaden so as to release the restriction at the back of the port portion 115. Therefore, when the leading end of the photographic film 114 is scooped by the projection 118 and advanced to the film passage, the space between the discs 119, 120 is slightly broadened toward the outside. The photographic film 114 is delivered in a form of trough through the space between the lips 121, 121.

Even providing the side rib 126 on one side, similar effects can be obtained. As the means of releasing restriction of the wound film by the lips 121, a pair of separation claims are provided on both ends in the width direction, the pair of lips is always deformed partly in the direction of separating each other by the outer sides of the pair of the separation claims.

Upon loading the above photographic film cartridge into a camera, the engaging of the light-shielding cap 116 by the lock pole 132 is released by the mechanism on the side of the camera, and the light-shielding cap 116 is turned in the opening direction. Thereafter, the spool 113 is driven in the delivery direction, and the delivery of the photographic film 114 begins. Since the lips 121, 121 formed on the peripheries of the discs 119, 120 prevent loosening of the photographic film 114, the photographic film rotates together with the spool 113. During the rotating, the leading end of the photographic film 114 is scooped by the projection 118, and guided toward the film passage 117.

When the leading end of the photographic film 114 is led to the film passage 117, embracing of the photographic film 114 at the back of the film passage 117 is released by pushing of the photographic film 114 to widen the distance between the lips 121, 121 toward both sides. Since one disc 120 is forced to rotate in the delivery direction by the engage of the clutch claw 124 with the engaging hole 125, the force delivering the photographic film 114 is strengthened. Thus, the photographic film 114 is delivered out of the cartridge body 111.

Upon winding the spool 113 is rotated in the opposite direction. Since the trailing end of the photographic film 114 is engaged with the spool 113, the photographic film is wound into the cartridge body by the reverse rotation of the spool 113. At that time, the space between the discs 119, 120 is broadened at the back of the film passage 117, and the photographic film 114 is retracted through between the discs 119, 120 and wound around the spool 113.

Figure 20:
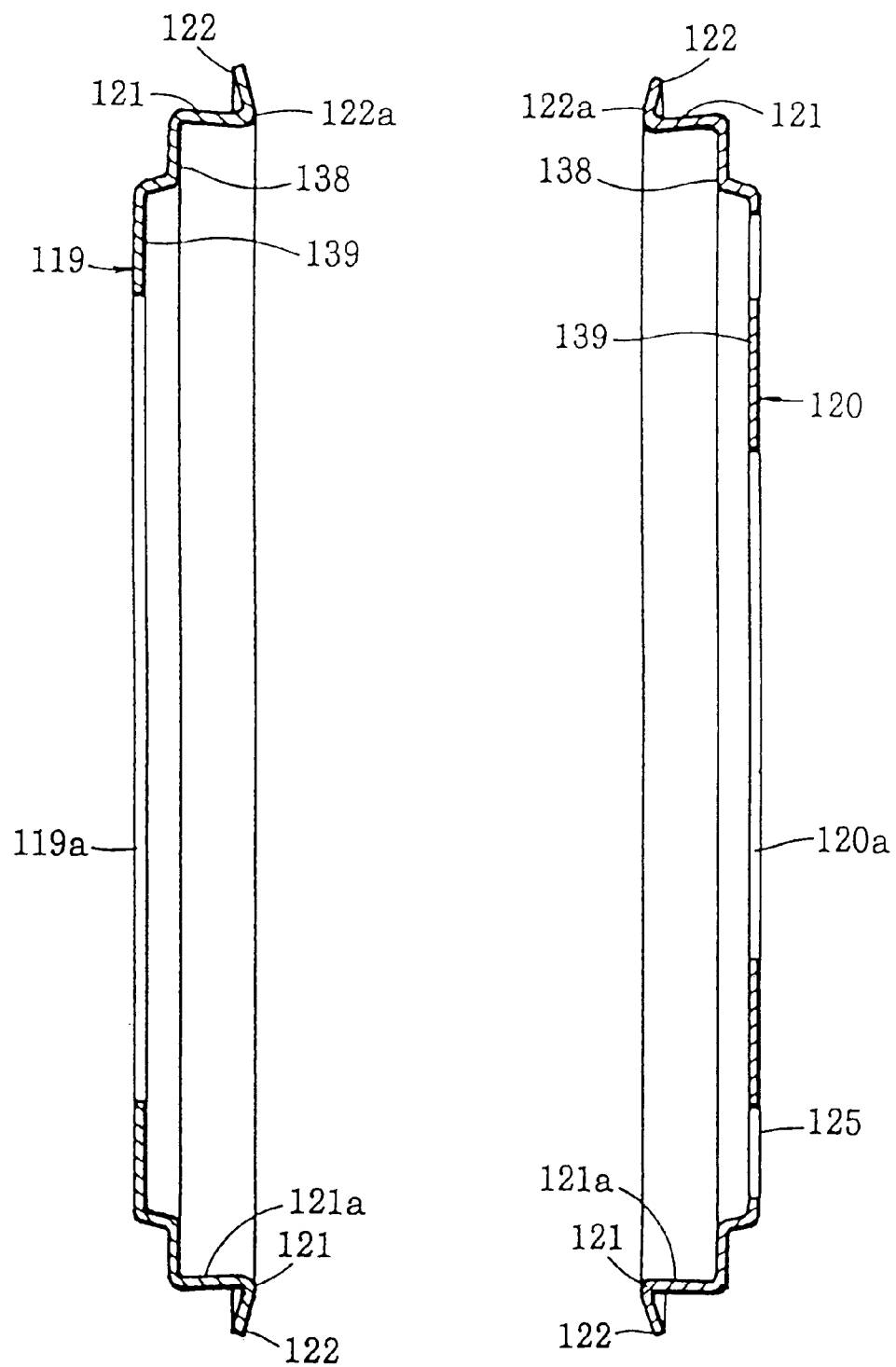
FIG. 20 is a sectional view of dises of the photographic film cartridge.

As shown in FIG. 20, the profile of the discs 119, 120 are identical. The openings 119a, 120a are formed on the face 139 indented by one step from the face 138 of arranging both ends of the photographic film 114. The lips 121 are projected so as to face the other disc 119, 120 from the periphery of the face 138, and embrace partly the outermost peripheries of the photographic film 114 wound around the spool 113 from the sides of both ends.

A flange 122 is formed on the periphery of the lips 121. The flange 122 reinforces so as not to broaden the space between the lips 121. The flanges 122 are inclined in :section to be apart each other, and guide the photographic film 114 so as to facilitate entering into the lips 121 upon winding the film.

The web 140 is polystyrene-modified polyphenylene ether blended with elastomer component, and the ratio of polystyrene:polyphenylene ether is 3:7. The elastomer component is 12 parts by weight per 100 parts by weight of polystyrene-modified polyphenylene ether. Silicon or antistatic agent is optionally added. Polycarbonate film, polyethylene film or the like may be used. The thickness of the web 140 is 0.15 mm±30%, preferably 0.15 mm±20%, particularly preferably 0.15 mm±10%. The width of the web is 200 to 300 mm.

Figure 21:
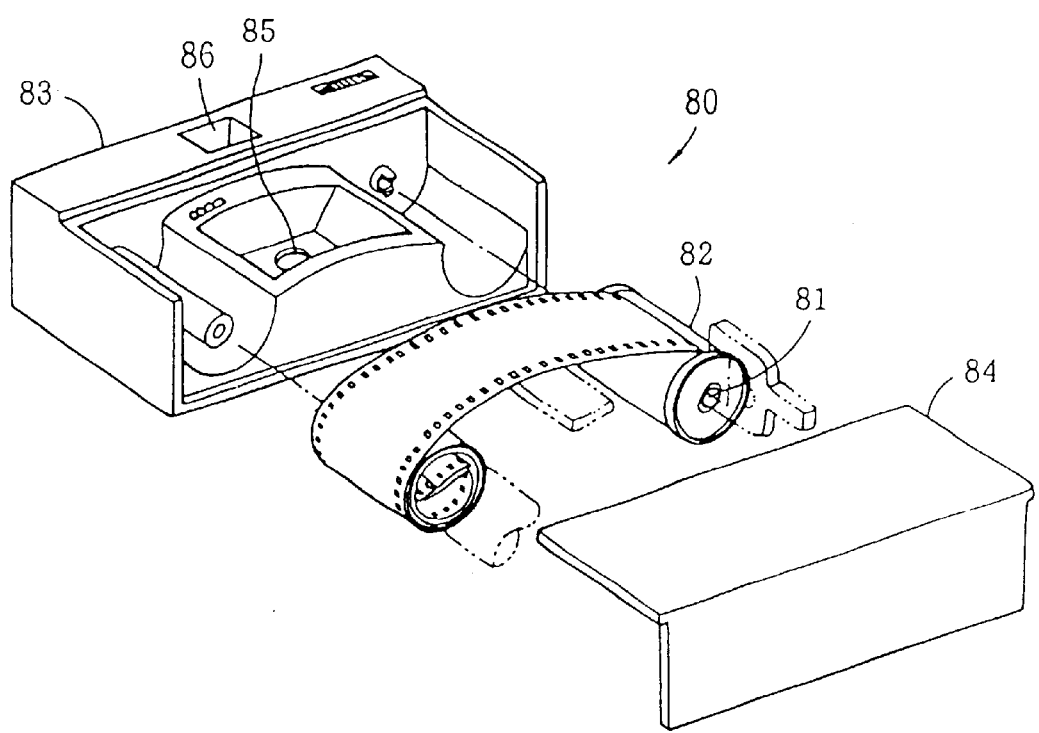
FIG. 21 is an exploded perspective view of a photographic film unit with a lens embodying the invention.
Figure 22:
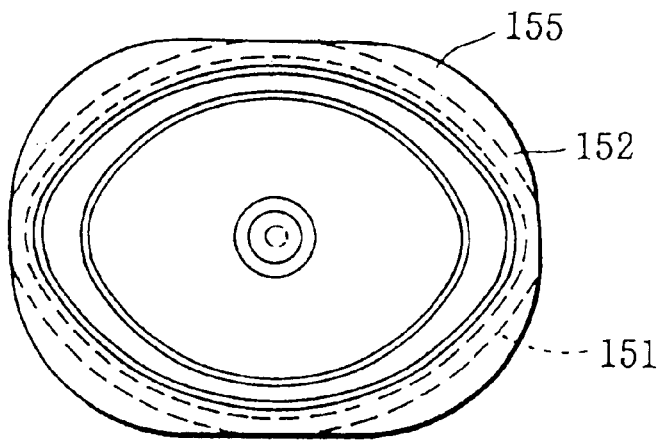
FIG. 22 is a plan view of a container for a photographic film cartridge embodying the invention.
Figure 23:
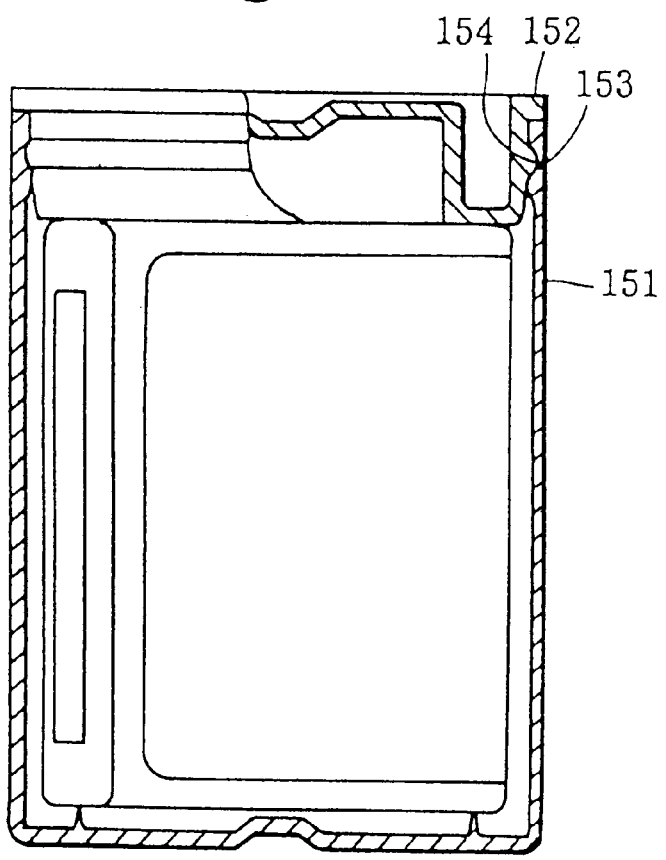
FIG. 23 is a partial cutaway side view thereof.
Figure 24:
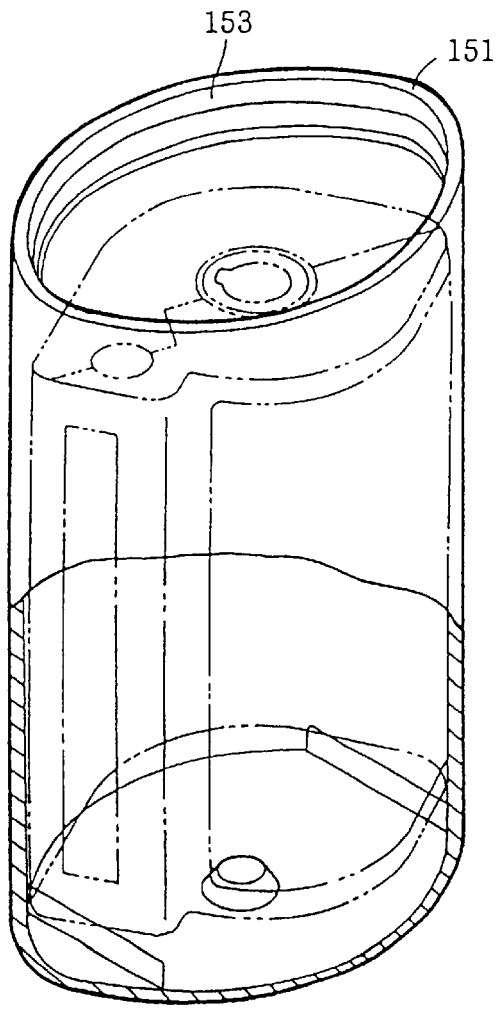
FIG. 24 is a perspective view thereof in a state that the cap has been taken out.
Figure 25:
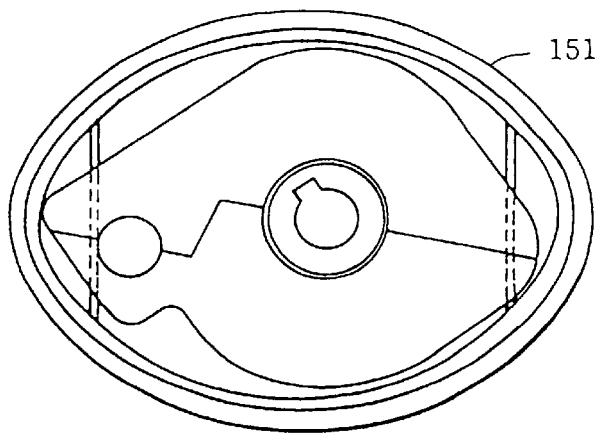
FIG. 25 is a plan view thereof.

FIG. 21 illustrates an exploded state of a photographic film unit 80 with a lens, which is the packaging material of the invention, consisting of a lower casing 83 in which a, light-shielding photographic film cartridge 82 containing a photographic film wound around a spool 81 is set in a state shielded from light and an upper casing 84 which seals the lower casing 83 so as to form a light-shielding condition. The lower casing 83 and the upper casing 84 are formed of polyolefin resin composition of the invention containing carbon black and/or aluminum powder, etc. On the other hand, conventional lower casing and upper casing are formed of a light-shielding resin composition, such as polystyrene resin, polymethyl methacrylate resin or polycarbonate resin. The lens 85 and the finder 86 is formed of a clear thermoplastic resin composition, such as unpigmented polycarbonate (PC) resin, polystyrene (PS) resin or polymethyl methacrylate (PMMA) resin.

A container for a photographic film cartridge in the same type as shown in Japanese Patent KOKAI Nos. 7-168321, 8-286326 is illustrated in FIGS. 22 to 25.

The container for a phtographic film cartridge is composed of a container body 151 and a cap 152. A groove 153 is formed on the container body 151, and a rib 154 fitted to the groove 153 is formed on the cap 152. A flange 155 projected outside of the container body 151 is formed on the cap.

Figure 26:
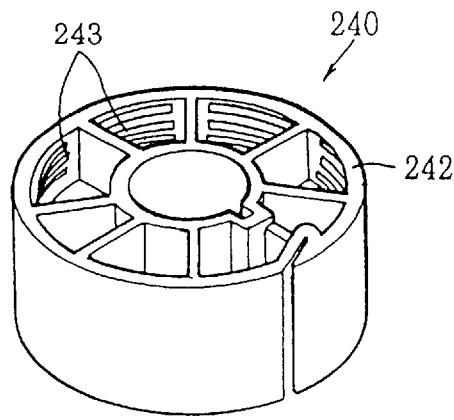
FIG. 26 is a perspective view of a core for a photosensitive web material embodying the invention.

A core for a photosensitive material web is illustrated in FIG. 26, as the packaging material for a photographic photosensitive material of the invention, and the whole body of the core 240 is formed of the resin composition of the invention. Plural ring-shaped ribs 243 0.0001 to 0.07 mm in height are formed on the inner surface of the outer cylinder 242, and improve injection moldability, physical strength and appearance of the core for a photosensitive material web.

Figure 27:
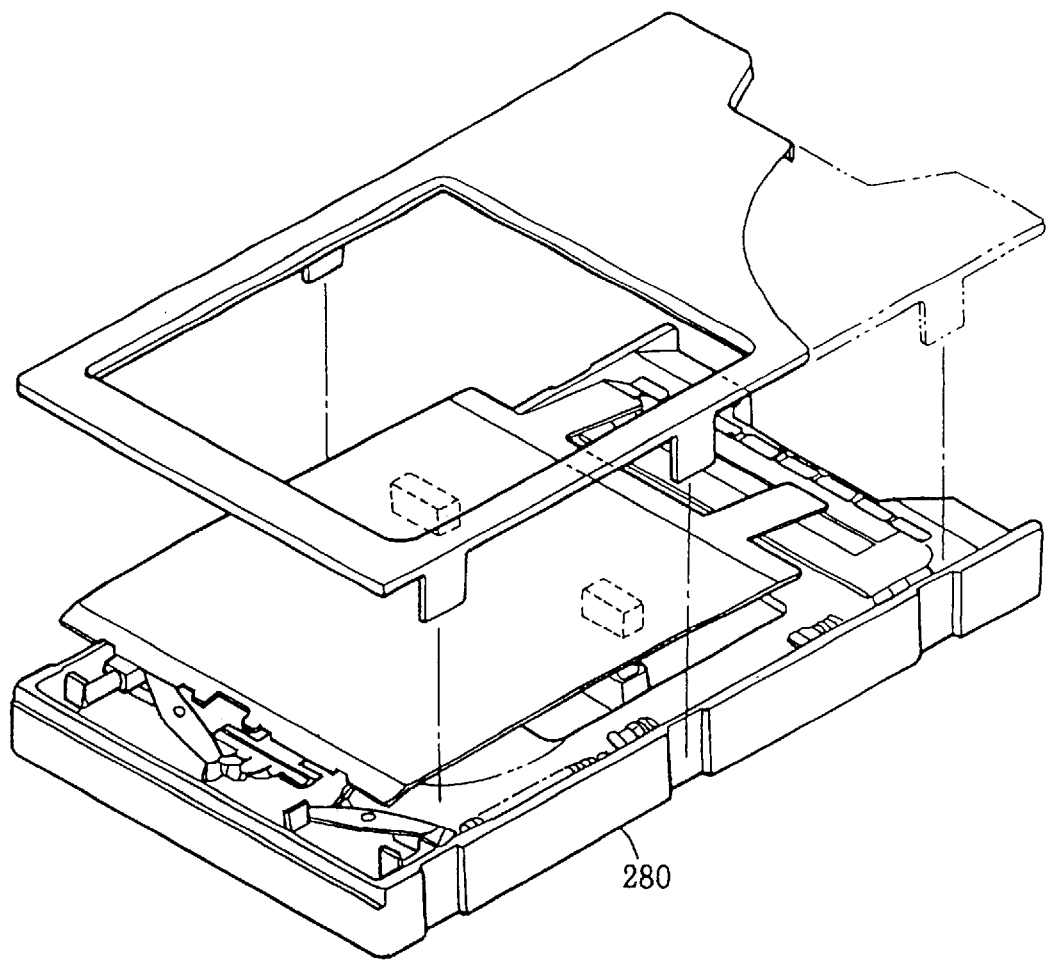
FIG. 27 is a partially exploded perspective view of a holder for sheet films put in a bag embodying the invention.

A holder for sheet films packaged in a bag in illustrated in FIG. 27 as the packaging material for a photographic photosensitive material of the invention, and the holder 280 for sheet films is loaded on the back of a camera, and the photographic film placed in the bag is taken out or put in the holder.

Figure 28:
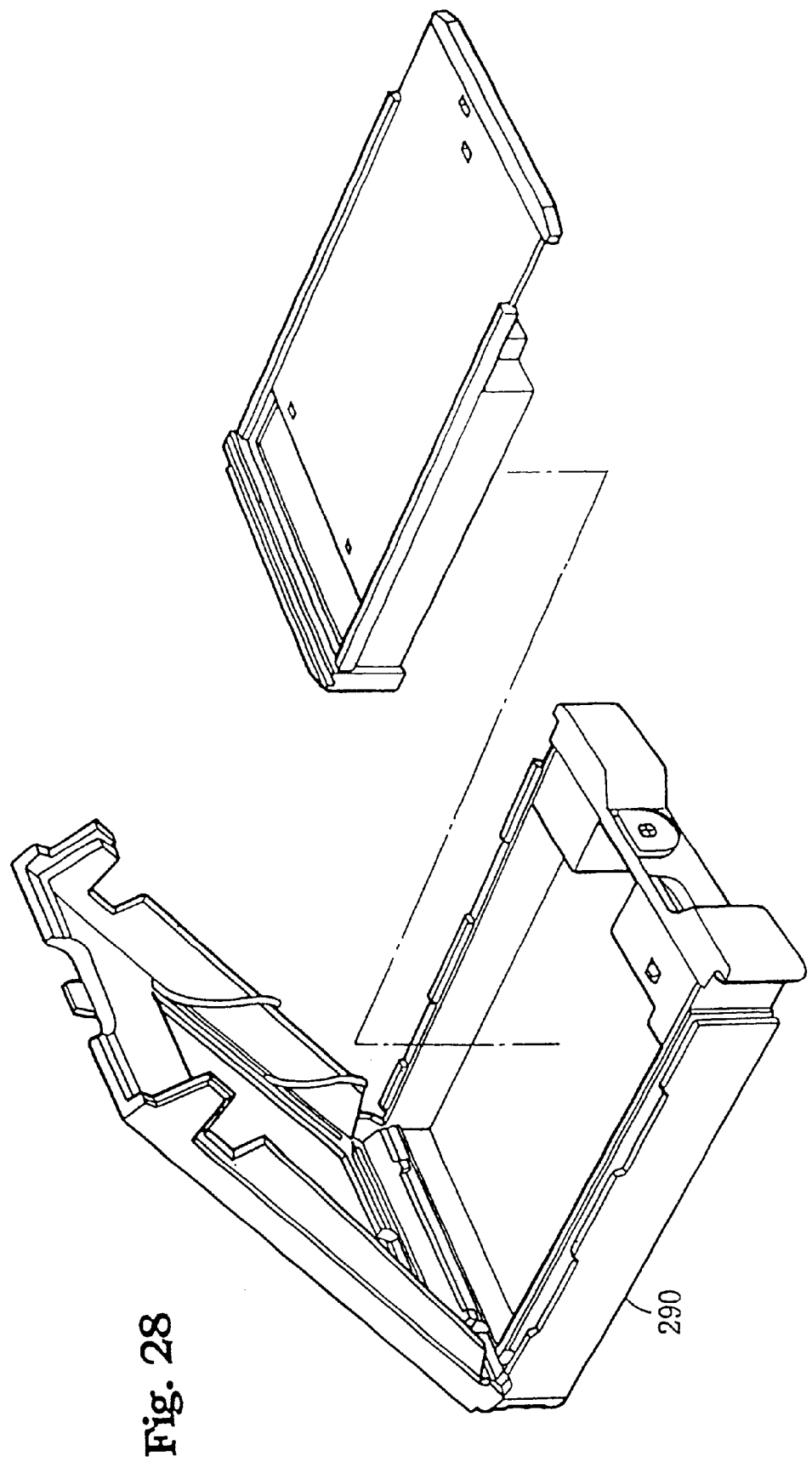
FIG. 28 is a perspective view of a holder for sheet photographic films put in a pack embodying the invention.

Another holder for sheet films put in a pack disclosed in Japanese Patent KOKAI Nos. 8-262557 and 9-22060 is illustrated in FIG. 28. The holder 290 for photographic sheet films is loaded on the back of a camera, and the photographic film put in a pack is taken out or put in the holder.

Figure 29:
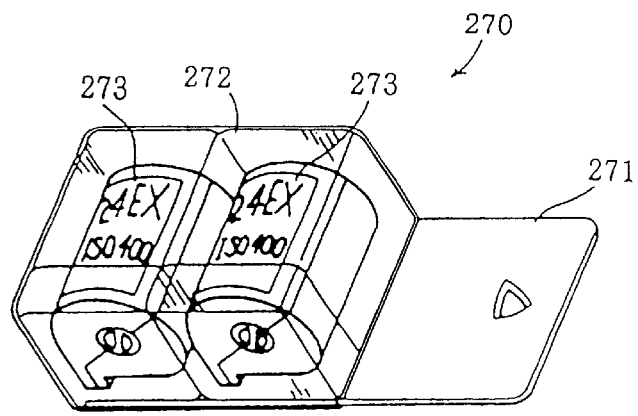
FIG. 29 is a perspective view of a transparent plastic case for photographic films put in a cartridge embodying the invention.

An assembly package of 35 mm photographic films put in a cartridge is illustrated in FIG. 29. The assembly package 270 is composed of a clear plastic case 272 blended with a moistureproof agent as the packing material for a photographic photosensitive material of the invention is mounted to the base plate 271, mid 35 mm photographic films 273 put in a cartridge are placed therein.

Figure 30:
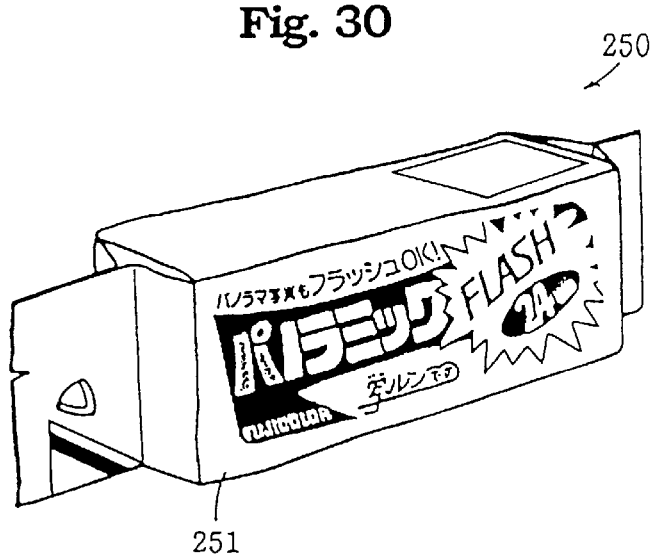
FIG. 30 is a perspective view of a package of a photographic film unit with a lens embodying the invention.

The package of FIG. 30 is a package of a film unit with a lens 250 is manufactured by packaging the film unit with a lens 221 shown in FIG. 12 by a packaging bag 251 as the packaging material for a photographic photosensitive material of the invention in a sealed state.

Figure 31:
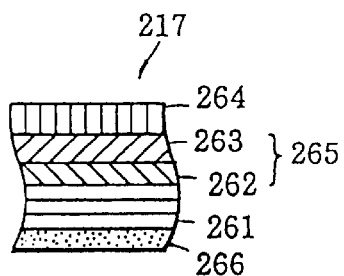
FIG. 31 is a partial section of a body of a photographic film cartridge embodying the invention.

A section of a cartridge body 217 as the packaging material for a photographic photosensitive material of the invention is shown in FIG. 31. The cartridge body 217 is composed of a metal base 261 (preferably tin-free steel 0.15 to 0.35 mm in thickness), a coloring layer 265 consisting of an undercoat layer 262 containing white pigment applied to the outer surface of the metal base 261 and a coloring ink layer 263 printing brand name, C1 mark, patterns, bar code, etc. on the surface of the undercoat layer 262, and a transparent or translucent protective layer 264 provided on the outer surface of the (coloring layer 265. Optionally, the protective layer 264 is provided on the surface of a black color coating layer 266. The caps sealing both ends of the cartridge body 260 and the spool 220 in a form of FIG. 14, etc. contained therein are formed of the thermoplastic resin composition of the invention. A photographic film is wound around the spool, and packaged in the container, such as FIGS. 12, 13, in a sealed states.

FIGS. 32 to 35 is partial sections of the coextruded multilayer films comprising the single site L-LDPE resin layer and the multisite L-LDPE resin layer.

Figure 32:
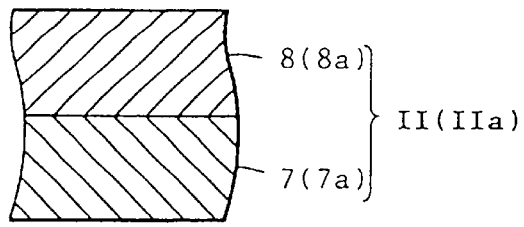
FIGS. 32 through 35 are partial sections illustrating layer constructions of packaging materials for photographic photosensitive materials embodying the invention, respectively.

The packaging material for a photographic photosensitive material shown in FIG. 32 is a coextruded double layer film II or IIa consisting of the single site L-LDPE resin layer 7 or 7a (containing light-shielding material) located on the inner surface side (underside in the figure, and so forth) and the multisite L-LDPE resin layer 8 or 8a (containing light-shielding material) located on the outer surface side (upper side in the figure, and so forth).

Figure 33:
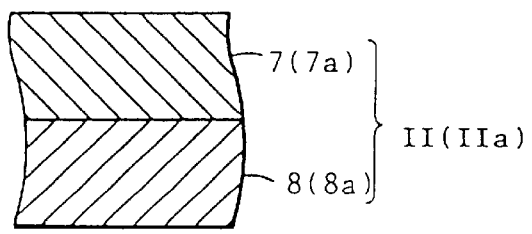

The packaging material shown in FIG. 33 is the same as FIG. 32 wherein the layer construction is reversed.

Figure 34:
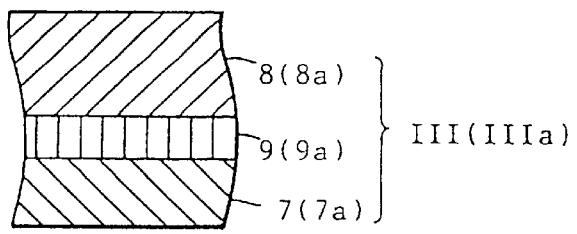

The packaging material shown in FIG. 34 is a coextruded triple layer film III (or IIIa) consisting of the single site L-LDPE resin layer 7 or 7a containing light-shielding material) located on the inner surface side, the multisite L-LDPE resin layer 8 or 8a (containing light-shielding material) located on the outer surface side and an intermediate layer 9 or 9a (Containing light-shielding material) interposed therebetween.

Figure 35:
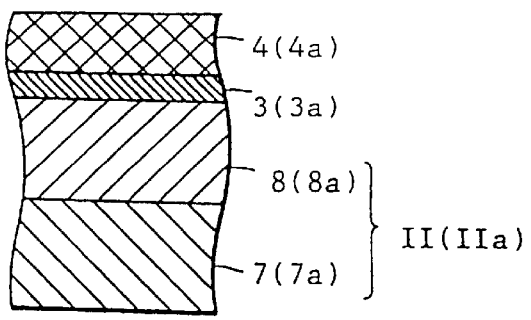

The packaging material shown in FIG. 35 consists of the coextruded double layer film of FIG. 32, a flexible sheet layer 4 or 4a (containing light-shielding material), and an adhesive layer 3 or 3a (containing light-shielding material) laminating the flexible sheet.

Figure 36:
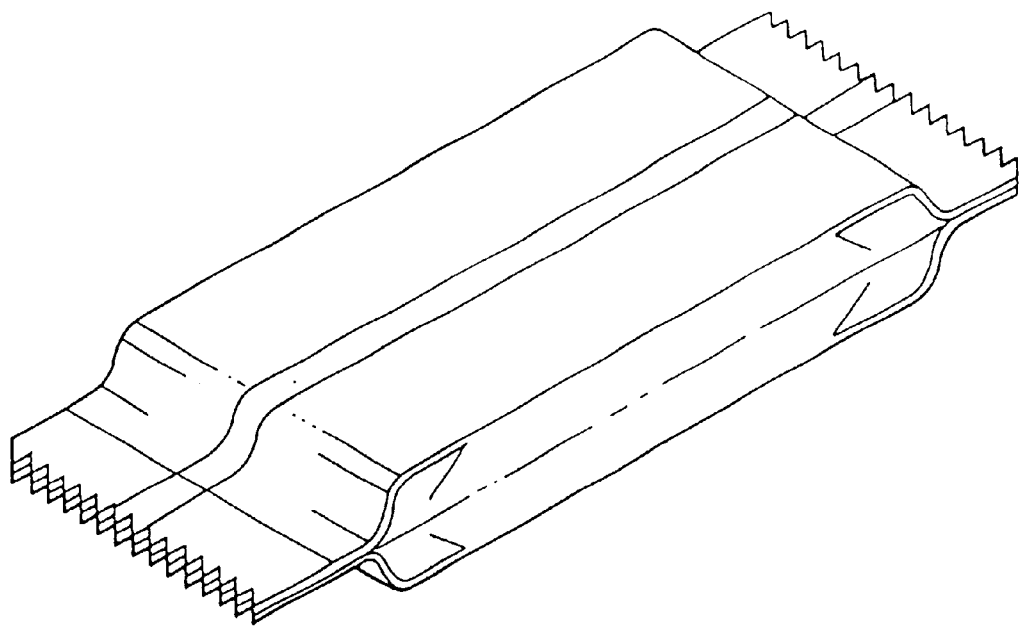
FIG. 36 Is a perspective view of a packaging bag for assembly packaging of two or more photographic films embodying the invention.

The package shown in FIG. 36 is an assembly package of two or more photographic films. Both end portions of the bag is jagged so as to facilitate tearing.

Figure 37:
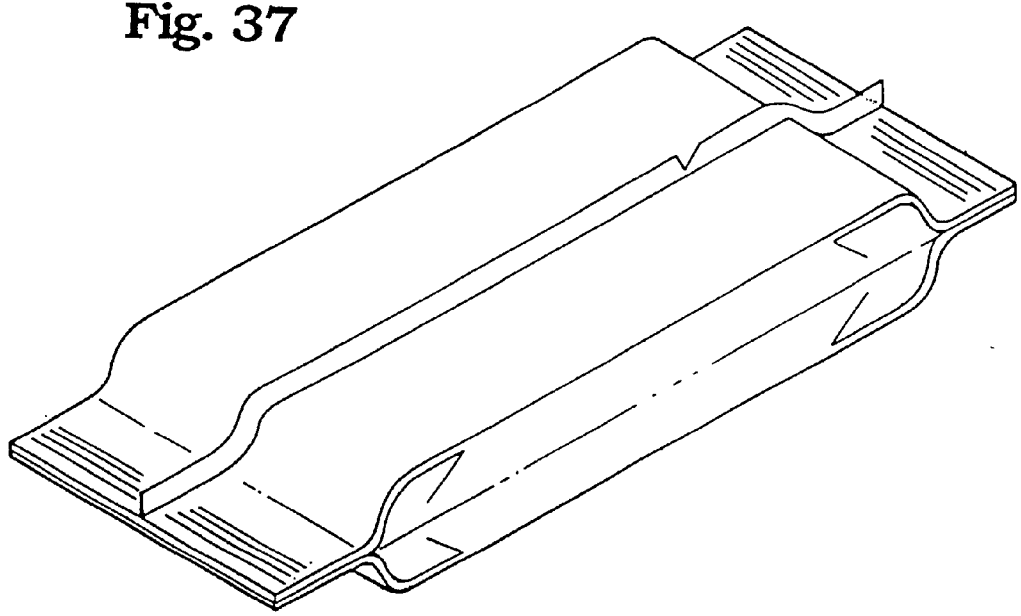
FIG. 37 is perspective view of another packaging bag for assembly packaging of two or more photographic films embodying the invention.

The package shown in FIG. 37 is another assembly package of two or more photographic films. A notch for tearing is provided on the center seal portion.

Figure 38:
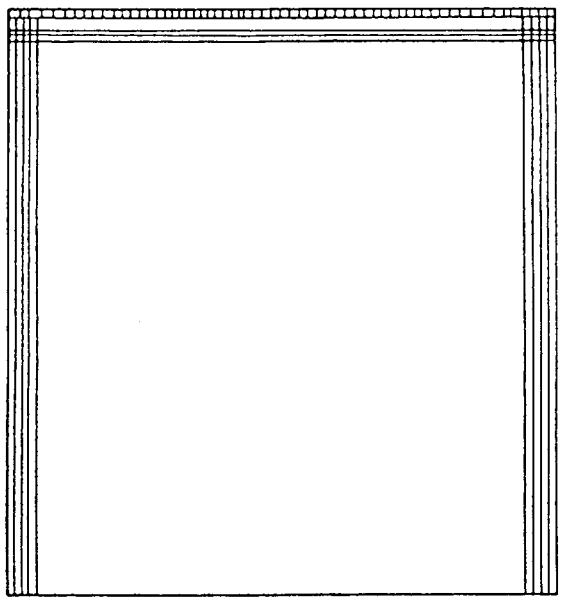
FIG. 38 is a plan view of a packaging bag for packages of sheet photographic photosensitive materials embodying the invention.

The package shown in FIG. 38 is of sheet-shaped photographic photosensitive materials, and the packaging bag is formed of the packaging material of the invention. A tearing facilitating means is provided on the upper side of the bag.

Figure 39:
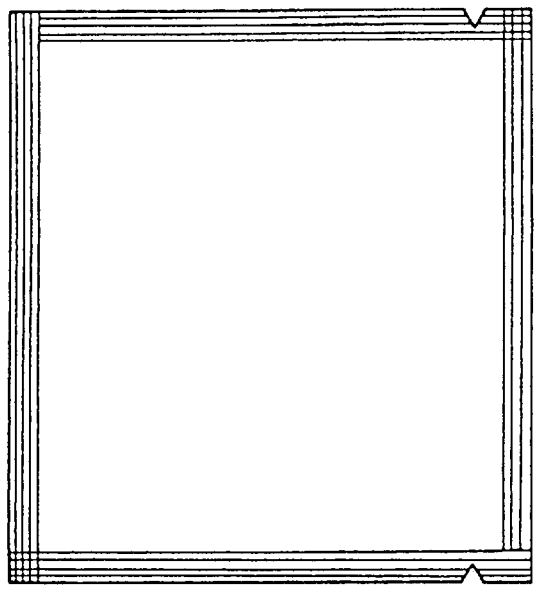
FIG. 39 is a plan view of another packages of sheet photographic photosensitive materials embodying the invention.

The package shown in FIG. 39 is also of sheet-shaped photographic photosensitive materials, and the packaging bag is formed of the packaging material of the invention. Each one notch for tearing is provided on the upper side and underside of the bag.

EXAMPLES

Inventive Examples 1–6, Comparative Examples 1–3

Propylene-ethylene copolymer resins (ethylene content: 2.8 wt. %) were produced using titanium tetrachloride ($TiCl_4$) as the transition metal component and organic aluminum compound as the organic metal component different in catalyst efficiency.

Container bodies for a photographic film cartridge were injection molded using each propylene-ethylene copolymer resin.

The residual chlorine content of each propylene-ethylene copolymer resin and effects on photographic properties (total evaluation of fog abnormal sensitivity, abnormal tone, abnormal coloring and density unevenness) were examined as to color negative photographic films having an ISO photographic speed of 400 containing sensitizing dye, and the results are shown in Table 3.

TABLE 3

|  | Catalyst Efficiency (g/g) | Residual Chlorine Content (ppm) | Photographic Properties |
| --- | --- | --- | --- |
| Invention 1 | 10,300 | 58 | ● |
| Invention 2 | 15,300 | 37 | ○ |
| Invention 3 | 21,610 | 27 | ○ |
| Invention 4 | 28,150 | 21 | ○ |
| Invention 5 | 33,030 | 17 | ◉ |
| Invention 6 | 45,400 | 12 | ◉ |
| Comparative 1 | 9,159 | 65 | ▲ |
| Comparative 2 | 8,210 | 71 | ▲ |
| Comparative 3 | 7,500 | 84 | x |

Catalyst efficiency: Production (gram) of propylene-ethylene random copolymer resin per 1 g solid catalyst component in the catalyst.

Photographic properties:

◉: Very excellent

○: Excellent

●: Practical limit

▲: A Having a problem (improvement is necessary)

X : Impractical

Inventive Examples 7–14, Comparative Example 4

A prepared resin composition consisted of 100 parts by weight of propylene-ethylene random copolymer resin, 0.2 part by weight of zinc stearate as the fatty acid metal salt, 0.05 part by weight of oleic amide functioning as lubricant, shortening molding cycle and decrease of molding troubles, 0.1 part by weight of calcium stearate as lubricant and photographic property-improving agent, 0.05 part by weight of hindered phenolic antioxidant ("Irganox 1010", Ciba-Geigy AG) functioning to prevent the generation of photographic property-degrading materials and lumps caused by the thermal degradation or thermal decomposition of low molecular weight polymer and additives, 0.10 part by weight of bis(p-methylbenzylidene)sorbitol ("Gel All MD", New Japan Chemical Co., Ltd.) as the organic nucleating agent functioning to shorten molding cycle and to decrease molding troubles caused by the improvement in crystallization rate and to improve transparency caused by uniform fine dispersion of crystal particles, 0.1 part by weight of hydrotalcite compound as halogen component neutralizer, 0.1 part by weight of organic tin stabilizer as the halogen component absorber and 0.10 part by weight of glycerin fatty acid ester of the nonionic antistatic agent functioning also as lubricant and to prevent the generation of white powder.

The resin composition was prepared by mixing using a ribbon blender, a tumbler or a Ilenschel mixer, then, melt kneading by a single screw extruder, a double screw extruder (L/D=15~70 is preferred.), a Banbury mixer, a twin roll or a kneader. The molten resin was palletized experienced heat history at 150° C. or more.

The pellets were dried up to the moisture content of not more than 0.5 wt. %, and then subjected to molding. As a result, various advantages were obtained, such as the improvement in photographic properties from ● to ◎, shortening of molding cycle one half or less, no occurrence of critical defect in multicavity molding (24 cavities or more) resulting in rendering practical unmanned continuous molding no inspection possible. The results are summarized in Table 4.

TABLE 4

|  | Catalyst Efficiency (g/g) | Residual Chlorine Content (ppm) | Photographic Properties |
|---|---|---|---|
| Invention 7 | 9,150 | 68 | ○ |
| Invention 8 | 10,300 | 58 | ○ |
| Invention 9 | 15,300 | 37 | ◉ |
| Invention 10 | 21,610 | 27 | ◉ |
| Invention 11 | 28,150 | 21 | ◉ |
| Invention 12 | 33,030 | 17 | ◉ |
| Invention 13 | 45,400 | 12 | ◉ |
| Invention 14 | 8,210 | 71 | ● |
| Comparative 4 | 7,500 | 84 | ▲ |

The influence of polymerization catalyst on photographic properties has been found, and the influence can be eliminated by not only removing the catalyst from the polymer but also using particular additives. As a result, inspection of photographic properties is not necessary. Similar effects were also obtained in the case of homopolyethylene resins with various density, ethylene-butene-1 copolymer resin, rubber-containing polystyrene resin and crystalline syndiotactic polystyrene resin, etc.

Example 15

A coextruded double layer inflation film 50 μm in thickness shown in FIG. 32 was mold.

The single site L-LDPE resin layer 1a containing light-shielding material was composed of 100 pats by weight of ethylene-hexene-1 copolymer resin having a MFR of 2.0 g/10 minutes, a density of 0.920 g/cm$^3$, a Vicat softening point of 102° C., a melting point of 116° C. and a molecular weight distribution of 2.5 manufactured by the vapor phase method using single site catalyst, 0.06 part by weight of hindered phenolic antioxidant ("Irganox 1010") as the antioxidant, 0.05 part by weight of erucic amide and 0.1 part by weight of calcium stearate as the lubricant, 1.0 part by weight of sorbitanmonostearate and 1.0 part by weight of diglycerine distearate which are nonionic surfactant as the antistatic agent, 0.25 part by weight of synthetic silica and 0.05 part by weight of talc as the antiblocking agent, 5 parts by weight of furnace carbon black having a pH of 8.4, a mean particle size of 21 mμ, a DBP oil absorption value of 125 cc/100 g, a total sulfur content of 0.4%, a free sulfur content of 82 ppm and a cyanide content of 8 ppm, as the light-shielding material, and 10 parts by weight of homopolyethylene resin having a MFR of 3.2 g/10 minutes, a density of 0.920 g/cm$^3$, a Vicat softening point of 95° C., a melting point of 113° C. and a molecular weight distribution of 9.1 manufactured by the high pressure radical process, and the thickness was 25μ.

The multisite L-LDPE resin layer 2a containing light-shielding material was composed of 100 parts by weight of ethylene-octene-1 copolymer resin having a MFK of 2.0 g/10 minutes, a density of 0.920 g/cm$^3$, a Vicat softening point of 110° C., a melting point of 123° C. and a molecular weight distribution of 3.5 manufactured by the solution method using multisite catalyst (Ziegler catalyst), 0.05 part by weight of hindered phenolic antioxidant ("Irganox 1010") and 0.05 part by weight of vitamin E as the antioxidant, 0.05 part by weight of oleic amide and 0.2 part by weight of zinc stearate as the lubricant, 1.0 part by weight of a glycerine monostearate and 1.0 part by weight of diglycerine distearate as the antistatic agent and the drip-proofing agent, 0.3 part by weight of synthetic zeolite as the antiblocking agent and the harmful gas absorber for photographic properties, 0.2 part by weight of synthetic silica as the antiblocking agent, 10 parts by weight of acetylene carbon black having a pH of 6.5, a mean particle size of 42 m μ, a DBP oil absorption value of 115 cc/100 g and a total rulfur content of 0.02% as the light-shielding material, and 10 parts by weight of homopolyethylene resin having a MFR of 4 g/10 minutes, a density of 0.925 g/cm$^3$, a Vicat softening point of 93° C., a melting point of 111° C. and a molecular weight distribution of 6.8 manufactured by the high pressure radical process, and the thickness was 25 μ.

Inventive Example 16

The molded article of this example was a coextruded double layer inflation film which was the same as Inventive Example 15, except that the thickness of the single site L-LDPE resin layer 7a was 40 μm and the thickness of the multisite L-LDPE resin layer 8a was 10 μm.

Inventive example 17

The molded article of this example was a coextruded double layer inflation film which was the same as Inventive Example 15, except that the thickness of the single site L-LDPE resin layer 7a was 30 μm and the thickness of the multisite L-LDPE resin layer 8a was 20 μm.

Inventive Example 18

The molded article of this example was a coextruded double layer inflation film which was the same as Inventive Example 15, except that the thickness of the single site L-LDPE resin layer 7a was 20 μm and the thickness of the multisite L-LDPE resin layer 8a was 30 μm

Inventive Example 19

The molded article of this example was a coextruded double layer inflation film which was the same as Inventive Example 15, except that the thickness of the single site L-LDPE resin layer 7a was 10 μm and the thickness of the multisite L-LDPE resin layer 8a was 40 μm.

Inventive Example 20

The molded article of this example was a coextruded double layer inflation film of FIG. 33 50 μm in thickness consisting of the multisite L-LDPE resin layer 8a located on the outer surface side and the single site L-LDPE resin layer 7a located on the inner surface side. The other constructions were the same as Example 16.

Inventive Example 21

The molded article of this example was a coextruded double layer inflation film which was the sane as Inventive Example 15, except that other additives than furnace carbon black was not added to the single site L-LDPE resin layer 7a, and other additives than acetylene carbon black was not added to the multisite L-LDPE resin layer 8a.

Inventive Example 22

The molded article of this example was a coextruded double layer inflation film which was the same as Inventive Example 20, except that except that other additives than furnace carbon black was not added to the single site L-LDPE resin layer 7a, and other additives than acetylene carbon black was not added to the multisite L-LDPE resin layer 8a.

Comparative Example 5

The molded article of this example was a single layer film 50 μm in thickness consisting of the single site L-LDPE resin layer 7a of Inventive Example 15.

Comparative Example 6

The molded article of this example was a single layer film 50 μm in thickness consisting of the multisite L-LDPE resin layer 8a of Inventive Example 15

Comparative Example 1

The molded article of this example was a multisite L-LDPE resin layer 1a containing light-shielding material 50 μm in thickness was composed of 100 parts by weight of L-LDPE resin having a MFR of 2.0 g/10 minutes and a density of 0.921 g/cm$^3$ produced by polymerizing ethylene and octene-1 by the solution method using a multisite catalyst of Ziegler catalyst, 5 parts by weight of furnace carbon black (manufactured by Mitsubishi Chemical Industries Co. Ltd.) having a mean particle size of 21 mμ, and 10 parts by weight of low density homopolyethylene resin ("DFD 0111", Nippon Unicar Co., Ltd.) having a MFR of 2.4 g/10 minutes and a density of 0.923 g/cm$^3$ manufactured by the high pressure radical process.

Conventional Example 2

The molded article of this example was a LDPE resin film 8a composed of 100 5 parts by weight of furnace carbon black (manufactured by Mitsubishi Chemical Industries Co. Ltd.) having a mean particle size of 21 mμ using a radical catalyst, and by weight of low density homopolyethylene resin ("DFD 0111", Nippon Unicar Co., Ltd.) having a MFR of 2.4 g/10 minutes and a density of 0.923 g/cm$^3$ manufactured by the high pressure radical process.

Film moldability, photographic proper ties, antiblocking ability, appearance, tear strength, heat sealing properties, antistatic ability, recycling ability, and incineration ability of Inventive Examples 15 to 22, Comparative Examples 5 to 6 aid Conventional Examples 1 to 2 were measured, and shown in Table 5.

TABLE 5

| | Unit | Inventive | | | | | | | |
|---|---|---|---|---|---|---|---|---|---|
| | | 15 | 16 | 17 | 18 | 19 | 20 | 21 | 22 |
| Thickness of L-LDPE resin layer (S) | μm | 25 | 40 | 30 | 20 | 10 | 25 | 25 | 25 |
| Thickness of L-LDPE resin layer (M) | μm | 25 | 20 | 30 | 40 | 25 | 25 | 25 | |
| Layer Construction | — | FIG. 1 (S) layer x (M) layer coextruded double layer film | FIG. 1 (S) layer x (M) layer coextruded double layer film | FIG. 1 (S) layer x (M) layer coextruded double layer film | FIG. 1 (S) layer x (M) layer coextruded double layer film | FIG. 1 (S) layer x (M) layer coextruded double layer film | FIG. 1 (S) layer x (M) layer coextruded double layer film | FIG. 1 (S) layer x (M) layer coextruded double layer film | FIG. 1 (S) layer x (M) layer coextruded double layer film |
| Film Moldability | — | ◎ | ● | ○ | ○ | ● | ◎ | ○ | ○ |
| Photographic Properties | — | ◎ | ◎ | ◎ | ◎ | ◎ | ◎ | ● | ◎ |
| Antiblocking Ability | — | ◎ | ◎ | ◎ | ◎ | ◎ | ◎ | ◎ | ● |
| Tear Strength MD | g | 1347 | 1523 | 1418 | 1287 | 923 | 1385 | 1152 | 1217 |
| Tear Strength CD | g | 1493 | Not cut 1600 | 1548 | 1413 | 1208 | 1527 | 1328 | 1396 |
| Heat Sealing Properties | — | ◎ | ◎ | ◎ | ◎ | ◎ | ○ | ◎ | ○ |
| Antiblocking Ability | — | ○ | ○ | ○ | ○ | ○ | ◎ | ● | ● |

TABLE 5-continued

| | | | | | very excellent dripproofing | | | | | |
|---|---|---|---|---|---|---|---|---|---|---|
| Appearance | — | ◉ | ○ | ◉ | ◉ | ○ | ◉ | ● | ● |
| Recycling Ability | | ◉ | ◉ | ◉ | ◉ | ◉ | ◉ | ● | ● |
| Incineration Ability | | ○ | ○ | ○ | ○ | ○ | ○ | ○ | ○ |

| | | | Comparative | | Conventional | |
|---|---|---|---|---|---|---|
| | | Unit | 5 | 6 | 1 | 2 |
| Thickness of L-LDPE resin layer (S) | | μm | 50 | — | — | — |
| Thickness of L-LDPE resin layer (M) | | μm | - | 50 | 50 | — |
| Layer Construction | | — | Single layer film (S) | Single layer film (M) | L-LDPE layer film | L-LDPE layer film |
| Film Moldability | | — | Δ | Δ | Δ | ● |
| Photographic Properties | | — | ◉ | ◉ | ● | ◉ |
| Antiblocking Ability | | — | ◉ | ◉ | Δ | Δ |
| Tear Strength | MD | g | 1425 | 796 | 752 | 73 |
| | CD | g | Not cut 1600 | 1098 | 987 | 268 |
| Heat Sealing Properties | | — | ○ | Δ | Δ | x |
| Antiblocking Ability | | — | ○ | ◉ | ● | ● |
| Appearance | | — | Δ | ● | Δ | ○ |
| Recycling Ability | | | ◉ | ◉ | ● | ● |
| Incineration Ability | | | ○ | ○ | ○ | ○ |

Evaluations were carried out as follows:
- ◉: Very excellent
- ○: Excellent
- ●: Practiced limit
- ▲: Having problem, in provement is necessary
- X: Impractical Film moldability:
 Total evaluation of bubble stability upon molding the coextruded multilayer film, melt facture, longitudinal streaks, lumps, microgrits, heat build-up upon extrusion, electrical loading, etc.

Photographic properties:
 A color photographic paper was put in a moistureproof light-shielding bag prepared using each film, and sealed by heat sealing. The bag was allowed to stand in an air conditioned room at 40° C. at a relative humidity of 80% for 3 days, and the photographic paper was developed by conventional manner. The evaluation was carried out by a comparison was carried out by a comparison of each photographic paper with a type one (blank) in the variation degree of photographic properties, such as fog, sensitivity tone and coloring.

Antiblocking ability:
 Each film was molded using an inflation film molding machine as shown in FIG. 9, and nip linear pressure was adjusted to 2.8 kg/cm. The antiblocking ability was evaluated by the peeling strength between the inner surface layers. One of the nip rolls was a rubber roll having a surface of ethylene-propylene terpolymer, and the other nip roll was a chrome-plated metal roll.

Tear strength:
 According to JIS P 8116

Heat sealing properties:
 Evaluated by the total of heat seal strength, elapsed heat seal strength, heat sealability with other materials, and hot tack properties.

Antistatic ability:
 An endless belt 35 mm in width 1350 mm in length was prepared of each film to be tested, and the belt was traveled at a speed of 12 m/min between SUS rolls with a load of 500 g, and frictional electrification was measured by a volt meter (manufactured by Shinto Kagaku).

Appearance:
 Evaluated by visual observation of the film surface (unevenness, longitudinal streaks, etc.) under a white light.

Recycling ability:
 Evaluated by the recycling ability after use.

Incineration ability:
 Evaluated by the degree of problems upon incineration after use.

Inventive example A

The molded article of this example was a coextruded triple layer inflation film IIIa 50 μm in thickness shown in FIG. 34 consisting of the multisite L-LDPE resin layer 8a containing light-shielding material located on the outer surface side, the single site L-LDPE resin layer 7a containing light-shielding material located on the inner surface side, and an intermediate layer 9a.

The multisite L-LDPE resin layer 8a had the sane resin composition as Example 15, and the single site L-LDPE resin layer 7a had also the same resin composition as Example 15. The thickness of the multisite L-LDPE resin layer 8a was 10 μm, and the thickness of the single site L-LDPE resin layer 7a was 30 μm.

The intermediate layer 9a had the same resin composition as the single site L-LDPE resin layer 7a, and the thickness was 10 μm.

Inventive Example B

The molded article of this example was the same as Inventive Example A, except that the thickness of the multisite L-LDPE resin layer 8a was 30 μmm, and the thickness of the single site L-LDPE resin layer 7a was 10 μm.

Inventive Example C

The molded article of this example was the same as Inventive Example A, except that the thickness of the multisite L-LDPE resin layer 8a was 20 μm, and the thickness of the single site L-LDPE resin layer 7a was 20 μm.

Inventive Example D

The molded article of this example was the same as Inventive Example C, except that the resin composition of the intermediate layer 9a was the same as the multisite L-LDPE resin layer 8a of Inventive Example 15.

Inventive Example E

The molded article of this example was the same as Inventive Example C, except that the resin composition of the intermediate layer 9a was composed of 100 parts by weight of homopolyethylene resin having a molecular weight distribution of 9.1, 5 parts by weight the same furnace carbon black as Inventive Example 15, 1.0 part by weight of sorbitan monostearate and 1.0 part by weight of diglycerine distearate which are nonionic surfactants, 0,05 part by weight of hindered phenolic antioxidant ("Irganox 1010") as the antioxidant, and 0.1 part by weight of calcium stearate as to lubricant.

Inventive, Example F

The molded article of this example was the same as Inventive Example E, except that the single site L-LDPE resin layer further contained 0.10 wt. % of phosphorus containing antioxidant of tris (2,4-di-t-butyl-phenyl) phosphite and 0.08 wt. % of hydrotalcite compound.

The above molded articles were excellent in film moldability, photographic properties, antiblocking ability, appearance, tear strength, heat sealing properties, antistatic ability, recycling ability, and incineration ability.

The molded article of Inventive Example F was further excellent than Inventive Example E in less occurrence of lumps and very good photographic properties. However, in the case of not adding hydrotalcite compound, the occurrence of fog was frequent, and the blending amount of 0.01 wt. % was the practical limit.

Inventive Example 23

Laminated films were prepared of coextruded double layer inflation films of which the innermost layers were joined by blocking.

The resins used for each layer were as follows: Ethylene-α-olefin copolymer resin A manufactured using single site catalyst:

A1: Ethylene-hexene-1 random copolymer resin having a MFR of4 g/10 minutes, a density of 0.920 g/cm$^3$, a Vicat softening point of 99° C., a melting point of 115° C., a Shore hardness of 56 D, a molecular weight distribution (Mw/Mn) of 2.2 manufactured by the vapor method.

A2: Ethylene-hexene-1 random copolymer resin having a MFR of 3 g/10 minutes, a density of 0.910 g/cm$^3$, a Vicat softening point of 97° C., a melting point of 112° C., a Shore hardness of 53 D, a molecular weight distribution (Mw/Mn) of 1.8 is manufactured by the vapor method.

A3: Ethylene-hexene-1 random copolymer resin having a MFR of 2.5 g/10 minutes, a density of 0.930 g/cm$^3$, a Vicat softening point of 104° C., a melting point of 120° C., a Shore hardness of 59 D, a molecular weight distribution (Mw/Mn) of 2.0 manufactured by the vapor method.

Polyolefin resin B manufacture using not a single site catalyst:

B1: Ethylene-octene-1 random copolymer resin having a MFR of 2 g/10 minutes, a density of 0.920 g/cm$^3$, a Vicat softening point of 112° C., a melting point of 123° C., a Shore hardness of 55 D, a molecular weight distribution (Mw/Mn) of 3.5 manufactured by the solution method.

B2: Ethylene-butene-1 random copolymer resin having a MFR of 2 g/10 minutes, a density of 0.900 g/cm$^3$, a Vicat softening point of 80° C., a melting point of 113° C., a Shore hardness of 46 D, a molecular weight distribution (Mw/Mn) of 2.8 manufactured by the vapor method.

B3: Homopolyethylene resin having a MFR of 2.5 g/10 minutes, a density of 0.920 g/cm$^3$, a Vicat softening point of 93° C., a melting point of 112° C., a Shore hardness of 50 D, a molecular weight distribution (Mw/Mn) of 5.8 manufactured by the high pressure ion polymerization method.

B4: Homopolyethylene resin having a MFR of 0.8 g/10 minutes, a density of 0.955 g/cm$^3$, a Vicat softening point of 126° C., a melting point of 137° C., a Shore hardness of 67 D, a molecular weight distribution (Mw/Mn) of 4.6 manufactured by the low pressure method using a titanium-based Ziegler catalyst.

B5: Ethylene-Vinylacetate copolymer resin having a VA content of 15 wt. %.

Homopolyethylene resin C manufactured using a single site catalyst:

C1: Homopolyethylene resin having a MFR of 1.6 g/10 minutes, a density of 0.956 g/cm$^3$, a Vicat softening point of 127° C., a melting point of 139° C., a Shore hardness of 66 D, a molecular weight distribution (Mw/Mn) of 2.6 manufactured by the low pressure method using a zirconium-based metallocene catalyst.

TABLE 6

| | | Unit | Inventive 23 | | | | | | | | |
|---|---|---|---|---|---|---|---|---|---|---|---|
| | | | 1 | 2 | 3 | 4 | 5 | 6 | 7 | 8 | 9 |
| Outermost Layer | | | | | | | | | | | |
| Single site | A1 | wt. part | 100 | 100 | 100 | 100 | 100 | 100 | — | — | 100 |
| catalyst | A2 | wt. part | — | — | — | — | — | — | 100 | — | — |
| resin | A3 | wt. part | — | — | — | — | — | — | — | 100 | — |
| Erucic amide | | wt. part | 0.05 | 0.05 | 0.05 | 0.05 | — | 0.05 | 0.05 | 0.05 | 0.05 |
| Zn stearate | | wt. part | 0.10 | 0.10 | 0.10 | 0.10 | 0.10 | 0.10 | 0.10 | 0.10 | 0.10 |
| Phenolic antioxidant *1 | | wt. part | 0.05 | 0.05 | 0.05 | 0.05 | 0.05 | 0.05 | 0.05 | 0.05 | 0.05 |
| α-tocopherol | | wt. part | 0.05 | — | — | — | — | — | — | — | — |
| Non-ionic anti-static agent *2 | | wt. part | 1.0 | 1.0 | 1.0 | 1.0 | — | 1.0 | 1.0 | 1.0 | 1.0 |
| Synthetic zeolite | | wt. part | 0.05 | 0.05 | 0.05 | 0.05 | — | 0.05 | 0.05 | 0.05 | — |
| Furnace black | | wt. part | 3.0 | 3.0 | 3.0 | 3.0 | 3.0 | — | 3.0 | 3.0 | 3.0 |
| Acetylene black | | wt. part | — | — | — | — | — | 20 | — | — | — |
| Multisite | B1 | wt. part | — | — | — | 30 | 30 | — | — | — | — |
| catalyst | B2 | wt. part | — | — | — | — | — | 30 | — | — | — |
| resin | B3 | wt. part | — | 30 | — | — | — | — | — | — | 30 |
| | B4 | wt. part | 30 | — | — | — | — | — | 30 | 30 | — |
| Single site catalyst resin | C1 | wt. part | — | — | 30 | — | — | — | — | — | — |
| Thickness of outermost layer | | μm | 20 | 20 | 20 | 20 | 20 | 20 | 20 | 20 | 20 |

| | | Unit | Comparative 7 | | | | |
|---|---|---|---|---|---|---|---|
| | | | 1 | 2 | 3 | 4 | 5 |
| Single site | A1 | wt. part | — | — | — | 10 | 10 |
| catalyst | A2 | wt. part | — | — | — | — | — |
| resin | A3 | wt. part | — | — | — | — | — |
| Erucic amide | | wt. part | — | — | — | — | — |
| Zn stearate | | wt. part | 0.10 | 0.10 | 0.10 | 0.10 | — |
| Phenolic antioxidant *1 | | wt. part | 0.05 | 0.05 | 0.05 | 0.05 | — |
| α-tocopherol | | wt. part | — | — | — | — | — |
| Non-ionic anti-static agent *2 | | wt. part | — | — | — | — | — |
| Synthetic zeolite | | wt. part | 0.05 | 0.05 | 0.05 | — | — |
| Furnace black | | wt. part | 3.0 | 3.0 | 3.0 | 3.0 | 3.0 |
| Acetylene black | | wt. part | — | — | — | — | — |
| Multisite | B1 | wt. part | — | — | 100 | — | — |
| catalyst | B2 | wt. part | — | — | — | — | — |
| resin | B3 | wt. part | — | 30 | 30 | 100 | 100 |
| | B4 | wt. part | — | — | — | — | — |
| Single site catalyst resin | C1 | wt. part | 100 | 100 | — | — | — |
| Thickness of outermost layer | | μm | 20 | 20 | 20 | 20 | 20 |

*1: tetrakis-[methylene-3(3',5'-di-butyl-4'-hydroxyphenyl)propionate]methane
*2: Electro stripper TS-7B (Kao Corp.)

TABLE 7

| | | Unit | Inventive 23 | | | | | | | | |
|---|---|---|---|---|---|---|---|---|---|---|---|
| | | | 1 | 2 | 3 | 4 | 5 | 6 | 7 | 8 | 9 |
| Innermost layer | | | | | | | | | | | |
| Single site catalyst resin | A3 | wt. part | — | — | — | — | — | — | — | — | 20 |
| Multisite | B2 | wt. part | 100 | 100 | 100 | 100 | 100 | 100 | 100 | 100 | — |
| catalyst | B3 | wt. part | 30 | 30 | 30 | 30 | 30 | 30 | 30 | 30 | 10 |
| resin | B5 | wt. part | — | — | — | — | — | — | — | — | 100 |
| Single site catalyst resin | C1 | wt. part | — | — | — | — | — | — | — | — | — |
| Zn stearate | | wt. part | 0.10 | 0.10 | 0.10 | 0.10 | 0.10 | 0.10 | 0.10 | 0.10 | 0.10 |
| Furnace black | | wt. part | 2.0 | 2.0 | 2.0 | 2.0 | 2.0 | 2.0 | 2.0 | 2.0 | 2.0 |
| α-tocopherol | | wt. part | 0.05 | — | — | — | — | — | — | — | — |

TABLE 7-continued

| | | | | | | | | | | |
|---|---|---|---|---|---|---|---|---|---|---|
| Phenolic antioxidant *1 | wt. part | 0.05 | 0.05 | 0.05 | 0.05 | 0.05 | 0.05 | 0.05 | 0.05 | 0.05 |
| Thickness of innermost layer | μm | 10 | 10 | 10 | 10 | 10 | 10 | 10 | 10 | 10 |
| Properties of laminated film | | | | | | | | | | |
| Blocking trouble | — | ⊙ | ⊙ | ⊙ | ⊙ | ● | ⊙ | ○ | ⊙ | ○ |
| Adhesion by blocking | — | ⊙ | ⊙ | ⊙ | ⊙ | ⊙ | ⊙ | ⊙ | ⊙ | ⊙ |
| Photographic properties | — | ⊙ | ⊙ | ⊙ | ⊙ | ○ | ○ | ⊙ | ⊙ | ○ |
| Inflation film moldability | — | ○ | ⊙ | ● | ○ | ● | ● | ● | ● | ⊙ |
| Heat sealing properties | — | ⊙ | ⊙ | ⊙ | ⊙ | ⊙ | ○ | ⊙ | ⊙ | ⊙ |
| Antistatic ability | — | ○ | ○ | ○ | ○ | ● | ⊙ | ○ | ○ | ○ |
| Physical strength | — | ⊙ | ○ | ⊙ | ⊙ | ⊙ | ○ | ⊙ | ⊙ | ○ |
| Light-shielding ability | — | ⊙ | ○ | ○ | ○ | ○ | ⊙ | ○ | ○ | ○ |

| | | | | Comparative 7 | | | | |
|---|---|---|---|---|---|---|---|---|
| | | | Unit | 1 | 2 | 3 | 4 | 5 |
| Single site catalyst resin | A3 | wt. part | — | — | 100 | 60 | — |
| Multisite catalyst resin | B2 | wt. part | 100 | 100 | — | — | — |
| | B3 | wt. part | 30 | 30 | — | 30 | 30 |
| | B5 | wt. part | — | — | — | — | — |
| Single site catalyst resin | C1 | wt. part | — | — | — | — | 100 |
| Zn stearate | | wt. part | 0.10 | 0.10 | 0.10 | 0.10 | 0.10 |
| Furnace black | | wt. part | 2.0 | 2.0 | 2.0 | 2.0 | 2.0 |
| α-tocopherol | | wt. part | — | — | — | — | — |
| Phenolic antioxidant *1 | | wt. part | 0.05 | 0.05 | 0.05 | 0.05 | 0.05 |
| Thickness of innermost layer | | μm | 10 | 10 | 10 | 10 | 10 |
| Properties of laminated film | | | | | | | |
| Blocking trouble | | — | ⊙ | ⊙ | ⊙ | Δ | ● |
| Adhesion by blocking | | — | ⊙ | ⊙ | x | Δ | x |
| Photographic properties | | — | ⊙ | ⊙ | ⊙ | ● | Δ |
| Inflation film moldability | | — | Δ | ○ | Δ | ● | Δ |
| Heat sealing properties | | — | Δ | Δ | ⊙ | ● | ○ |
| Antistatic ability | | — | Δ | Δ | Δ | Δ | Δ |
| Physical strength | | — | ● | ● | ○ | ● | ● |
| Light-shielding ability | | — | ○ | ○ | ○ | ○ | ○ |

What is claimed is:

1. A packaging material for a photographic photosensitive material formed of a thermoplastic resin composition containing 50 wt. % or more of a thermoplastic resin manufactured using a Ziegler-Natta catalyst capable of producing 10,000 g or more of the thermoplastic resin per 1 g of solid catalyst component,
wherein residual halogen component content of the thermoplastic resin is 4 to 60 ppm as halogen.

2. The packaging material for a photographic photosensitive material of claim 1, wherein said thermoplastic resin composition contains at least one hydrotalcite compound in an amount of 0.001 to 5 wt %.

3. The packaging material for a photographic photosensitive material of claim 1, wherein said thermoplastic resin composition has a halogen component content of 4 to 60 ppm by heating the thermoplastic resin composition at least at 60° C. for 1 hour, and then molding at a resin temperature of 150° C., or more.

4. The packaging material for a photographic photosensitive material of claim 1, wherein said thermoplastic resin composition has a halogen component content of 4 to 60 ppm by extracting catalyst residues using a catalyst deactivator, and then molding at a resin temperature of 150° C. or more.

5. The packaging material for a photographic photosensitive material of claim 1, wherein said thermoplastic resin composition contains at least one member selected from the group consisting of zeolite, silica and alumina in an amount of 0.01 to 5 wt %.

6. The packaging material for a photographic photosensitive material of claim 5, wherein said thermoplastic resin composition contains at least one hydrotalcite compound in an amount of 0.001 to 5 wt %.

7. The packaging material for a photographic photosensitive material of claim 1, wherein said thermoplastic resin composition contains at least one fatty acid metal salt in an amount of 0.01 to 10 wt %.

8. The packaging material for a photographic photosensitive material of claim 1, wherein said thermoplastic resin composition contains carbon black having a free sulfur content of 50 ppm or less manufactured from ethylene bottom oil using naphtha as a raw material.

9. A packaging material for a photographic photosensitive material comprising a thermoplastic resin composition containing 50 wt. % or more of thermoplastic resin manufactured using a catalyst capable of producing 10,000 g or more of the thermoplastic resin per 1 g of solid catalyst component,
wherein residual halogen component content of the thermoplastic resin is 4 to 60 ppm as halogen,
wherein said catalyst is a single site catalyst comprising at least one member selected from the group consisting of zirconium based metallocene, hafnium based metallocene, titanium based metallocene and vanadium based metallocene and an aluminoxane, wherein said packaging material is a coextruded multilayer film comprising a single site catalyzed L-LDPE resin layer formed of the thermoplastic resin composition wherein the thermoplastic resin is L-LDPE resin located as a surface layer and a multisite catalyzed L-LDPE resin layer comprising ethylene-α-olefin copolymer resin as a principal component manufactured using a multisite catalyst located as the other surface layer.

10. The packaging material for a photographic photosensitive material of claim 9, wherein the inner surface layer contains at least a hydrotalcite or zeolite in a content of 0.01 to 20 wt. % as the total amount.

11. The packaging material for a photographic photosensitive material of claim 10, wherein the single site catalyzed L-LDPE: resin layer and the multisite catalyzed L-LDPE resin layer have a residual metal component content of 300 ppm or less.

12. The packaging material for a photographic photosensitive material of claim 11, wherein the single site catalyzed L-LDPE resin layer is formed of a copolymer resin of ethylene and an α-olefin having 3 to 12 carbon atoms having a molecular weight distribution of 1.5 to 10 manufactured using a single site catalyst comprising at least one of zirconium-based, titanium-based, hafnium-base or vanadium-based metallocene complex.

13. The packaging material for a photographic photosensitive material of claim 9, wherein the single site catalyzed L-LDPE resin layer and the multisite catalyzed L-LDPE resin layer have a residual halogen component content of 60 ppm or less.

14. The packaging material for a photographic photosensitive material of claim 13, it wherein the single site catalyzed L-LDPE resin layer is located as the inner surface layer and contains at least one member selected from the group consisting of carbon black, antiblocking agent, lubricant, oxidation inhibition material, fluorine-containing compound and nonionic surfactant.

15. The packaging material for a photographic photosensitive material of claim 13, wherein the multisite catalyzed L-LDPE resin layer is located as the inner surface layer and contains at least one member selected from the group consisting of carbon black, antiblocking agent, lubricant, oxidation inhibition maternal, fluorine-containing compound and nonionic surfactant.

16. The packaging material for a photographic photosensitive material of claim 9, wherein said thermoplastic resin composition contains carbon black having a free sulfur content of 50 ppm or less manufactured from ethylene bottom oil using naphtha as a raw material.

* * * * *